United States Patent
Li et al.

(10) Patent No.: US 8,451,963 B2
(45) Date of Patent: May 28, 2013

(54) METHOD AND SYSTEM FOR INTERFERENCE CANCELLATION

(75) Inventors: Wenjun Li, San Diego, CA (US);
Farrokh Abrishamkar, San Diego, CA (US); Yingqun Yu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 818 days.

(21) Appl. No.: 12/481,203

(22) Filed: Jun. 9, 2009

(65) Prior Publication Data
US 2010/0309956 A1    Dec. 9, 2010

(51) Int. Cl.
*H03D 1/04* (2006.01)
*H03D 1/06* (2006.01)
*H03K 5/01* (2006.01)
*H03K 6/04* (2006.01)
*H04B 1/10* (2006.01)
*H04L 1/00* (2006.01)
*H04L 25/08* (2006.01)

(52) U.S. Cl.
USPC ............................ 375/346; 375/285; 375/316

(58) Field of Classification Search
USPC .......................................................... 375/346
See application file for complete search history.

(56) References Cited

U.S. PATENT DOCUMENTS

| | | |
|---|---|---|
| 6,501,788 B1 | 12/2002 | Wang et al. |
| 6,574,270 B1 | 6/2003 | Madkour et al. |
| 6,618,433 B1 | 9/2003 | Yellin |
| 6,714,585 B1 | 3/2004 | Wang et al. |
| 7,426,680 B2 | 9/2008 | Hwang et al. |
| 7,551,664 B2 * | 6/2009 | Zhang et al. .................. 375/147 |
| 7,706,430 B2 | 4/2010 | Guo et al. |
| 8,331,504 B2 | 12/2012 | Yu et al. |
| 2002/0027957 A1 | 3/2002 | Paulraj et al. |
| 2004/0066766 A1 * | 4/2004 | Shiu et al. ...................... 370/335 |
| 2004/0090906 A1 | 5/2004 | Moshavi et al. |
| 2004/0246927 A1 | 12/2004 | Wei et al. |
| 2005/0009531 A1 * | 1/2005 | Lindquist et al. .......... 455/452.2 |
| 2006/0013289 A1 | 1/2006 | Hwang |
| 2006/0045170 A1 | 3/2006 | Van Rensburg et al. |
| 2006/0062283 A1 * | 3/2006 | Zhang et al. .................. 375/147 |
| 2007/0110136 A1 | 5/2007 | Guess et al. |
| 2007/0263704 A1 | 11/2007 | Nagarajan et al. |

(Continued)

FOREIGN PATENT DOCUMENTS

| | | |
|---|---|---|
| EP | 1926217 A2 | 5/2008 |
| KR | 2008050205 A | 6/2008 |

(Continued)

OTHER PUBLICATIONS

Agashe P., et al., "Analysis of Interference Cancellation for a Multicellular CDMA Environment," IEEE, 1995, vol. 2, pp. 747-752.

(Continued)

*Primary Examiner* — Erin File
(74) *Attorney, Agent, or Firm* — Kenneth Vu; Ashish L. Patel

(57) ABSTRACT

Systems and methods for interference cancellation at a receiver in a wireless communication system are provided. In one aspect, a method for interference cancellation is provided. The method comprises providing total received chips received from a plurality of cells. The method also comprises successively estimating received chips for each of the plurality of cells in a plurality of iterations, wherein each of the plurality of iterations after a first iteration comprises canceling previously estimated received chips for one or more of the plurality of cells from the total received chips, and estimating received chips for one of the plurality of cells using the total received chips with the previously estimated received chips for the one or more of the plurality of cells cancelled out.

50 Claims, 32 Drawing Sheets

U.S. PATENT DOCUMENTS

| | | | |
|---|---|---|---|
| 2008/0240304 A1 | 10/2008 | Oh et al. | |
| 2010/0034110 A1 | 2/2010 | Kim et al. | |
| 2010/0278216 A1 | 11/2010 | Abrishamkar et al. | |
| 2010/0278217 A1 | 11/2010 | Abrishamkar et al. | |
| 2010/0278219 A1 | 11/2010 | Yu et al. | |
| 2010/0278284 A1* | 11/2010 | Abrishamkar et al. | 375/320 |
| 2011/0307846 A1* | 12/2011 | Culp et al. | 716/56 |

FOREIGN PATENT DOCUMENTS

| | | |
|---|---|---|
| WO | 9606487 A1 | 2/1996 |
| WO | 2007058770 | 5/2007 |
| WO | 2007058791 A2 | 5/2007 |

OTHER PUBLICATIONS

International Search Report and Written Opinion PCT/US2010/037853, International Search Authority—European Patent Office—Sep. 20, 2010.

Wang C.L. "A Soft-Input Soft-Output Decorrelating Block Decision—Feedback Multiuser Detector for Turbo-Coded DS-CDMA Systems" Wireless Personal Communications, Springer, Dordrecht, NL LNKDDOI: 10.1023/A:1008934007003, vol. 17, No. 1, Apr. 1, 2001, pp. 85-101.

* cited by examiner

METHOD AND SYSTEM FOR INTERFERENCE CANCELLATION

FIELD

The present application relates generally to wireless communication systems, and particularly to methods and systems for interference cancellation in a multiple access system.

BACKGROUND

In wireless communication systems, many users communicate over a wireless channel. For example, code division multiple access (CDMA) modulation technique is one of several techniques for facilitating communications in which a large number of system users are present. Other multiple access communication system techniques, such as time division multiple access (TDMA) and frequency division multiple access (FDMA) may be used as well.

A wireless communication system may provide communication for a number of cells, in which each cell supports multiple users and is serviced by a corresponding base station. Users receive wireless service from the wireless communication system using mobile stations, which may, for example, refer to cellular phones, user equipment (UE), wireless communication devices, or wireless terminals.

A mobile station in the wireless communication system may be subject to intra-cell interference and inter-cell interference. Intra-cell interference is caused by other users in the same cell serving the mobile station while inter-cell interference is caused by other users in neighboring cells. A mobile station typically becomes more susceptible to inter-cell interference when the mobile station is located near the edge of the serving cell where interference from neighboring cells is stronger. Because intra-cell interference and inter-cell interference negatively impact the data throughput and voice capability of a mobile station, methods and systems for cancelling both types of interference are desirable.

SUMMARY

According to one aspect of the disclosure, a method for interference cancellation at a receiver in a wireless communication system is provided. The method comprises providing total received chips received from a plurality of cells. The method further comprises successively estimating received chips for each of the plurality of cells in a plurality of iterations, wherein each of the plurality of iterations after a first iteration comprises canceling previously estimated received chips for one or more of the plurality of cells from the total received chips, and estimating received chips for one of the plurality of cells using the total received chips with the previously estimated received chips for the one or more of the plurality of cells cancelled out.

According to another aspect of the disclosure, a system for interference cancellation at a receiver in a wireless communication system is provided, in which the system receives total received chips received from a plurality of cells. The system comprises a cell computation unit configured to successively estimate received chips for each of the plurality of cells in a plurality of iterations, and a subtraction unit, wherein in each of the plurality of iterations after a first iteration, the subtraction unit is configured to cancel previously estimated received chips for one or more of the plurality of cells from the total received chips, and wherein in each of the plurality of iterations after the first iteration, the cell computation unit is configured to estimate received chips for one of plurality of cells using the total received chips with the previously estimated received chips for the one or more of the plurality of cells canceled out.

According to another aspect of the disclosure, an apparatus for interference cancellation at a receiver in a wireless communication system is provided. The apparatus comprises means for providing total received chips received from a plurality of cells. The apparatus further comprises means for successively estimating received chips for each of the plurality of cells in a plurality of iterations, wherein for each of the plurality of iterations after a first iteration, the means for successively estimating received chips comprises means for canceling previously estimated received chips for one or more of the plurality of cells from the total received chips and means for estimating received chips for one of the plurality of cells using the total received chips with the previously estimated received chips for the one or more of the plurality of cells cancelled out.

According to another aspect of the disclosure, a machine-readable medium storing instructions for interference cancellation at a receiver in a wireless communication system is provided. The instructions comprises code for providing total received chips received from a plurality of cells. The instructions also comprise code for successively estimating received chips for each of the plurality of cells in a plurality of iterations, wherein for each of the plurality of iterations after a first iteration, the code for successively estimating received chips further comprises code for canceling previously estimated received chips for one or more of the plurality of cells from the total received chips, and estimating received chips for one of the plurality of cells using the total received chips with the previously estimated received chips for the one or more of the plurality of cells cancelled out.

According to another aspect of the disclosure, an apparatus for interference cancellation at a receiver in a wireless communication system is provided, in which the system receives total received chips received from a plurality of cells. The apparatus comprises at least one processor configured to successively estimate received chips for each of the plurality of cells in a plurality of iterations. For each of the plurality of iterations after a first iteration, the at least one processor is configured to cancel previously estimated received chips for one or more of the plurality of cells from the total received chips, and to estimate received chips for one of the plurality of cells using the total received chips with the previously estimated received chips for the one or more of the plurality of cells cancelled out.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1:
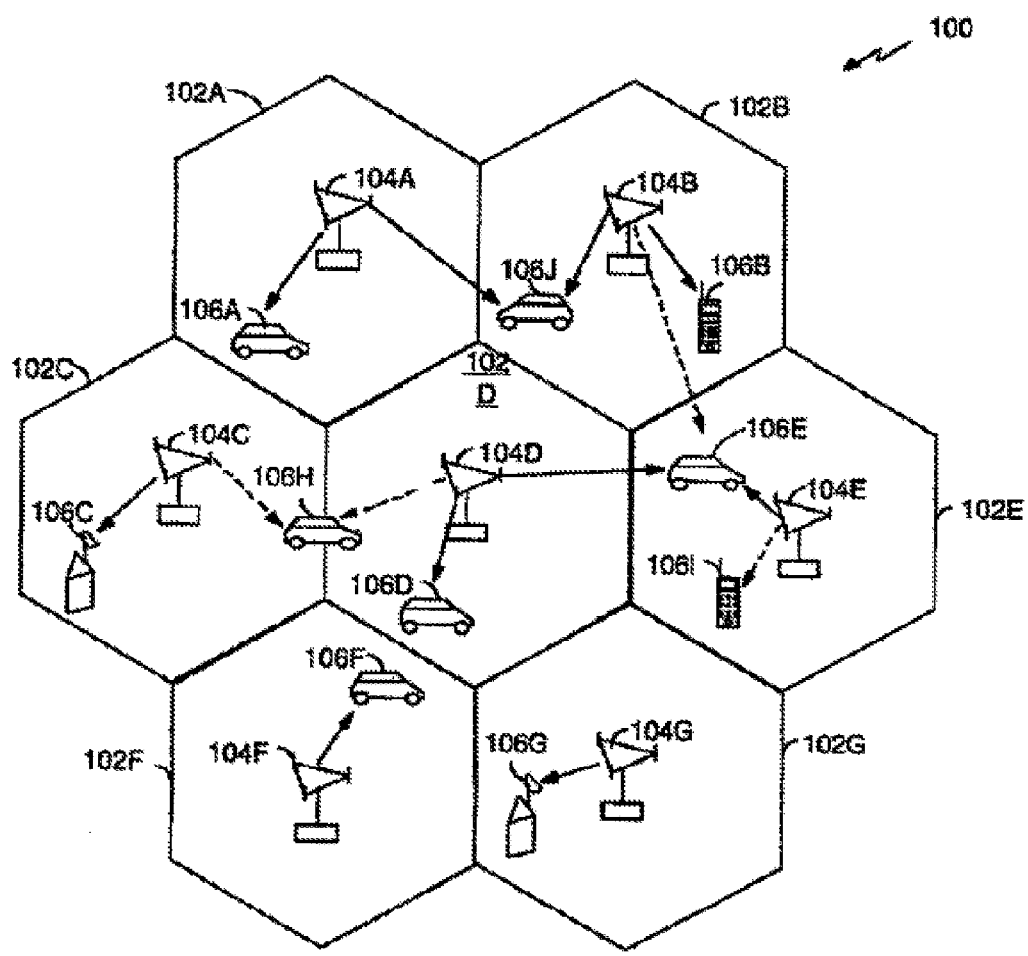
FIG. 1 is a diagram of a wireless communication system with multiple users, according to certain aspects of the present disclosure.

In the following detailed description, numerous specific details are set forth to provide a full understanding of the subject technology. It will be obvious, however, to one ordinarily skilled in the art that the subject technology may be practiced without some of these specific details. In other instances, well-known structures and techniques have not been shown in detail so as not to obscure the subject technology.

The word "exemplary" is used herein to mean "serving as an example or illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

FIG. 1 is a diagram of a wireless communication system supporting multiple users, according to certain aspects of the present disclosure. Communication system 100 provides communication for a number of cells 102A-102G (referred to as cells 102), each of which is serviced by a corresponding base station 104A-104G (referred to as base stations 104). Of course, any number of cells 102 and base stations 104 may be included in the communication system 100. In the exemplary communication system 100, some of the base stations 104 have multiple receive antennas and others have only one receive antenna. Similarly, some of the base stations 104 have multiple transmit antennas and others have a single transmit antenna.

Mobile stations 106A-106H (referred to as mobile stations 106) may refer to, for example, cellular phones, PDAs or the like, and may also be called mobile devices, user equipment (UE), wireless communication devices, terminals, stations, mobile equipment (ME) or some other terminology. As shown in FIG. 1, various mobile stations 106 may be dispersed throughout the communication system 100, and each mobile station 106 communicates with at least one base station 104 on a downlink and uplink at any given moment.

Different technologies may be used for various multiple access communication systems such as (1) a CDMA system that transmits data for different users using different orthogonal code sequences, (2) an FDMA system that transmits data for different users on different frequency subbands, (3) a TDMA system that transmits data for different users in different time slots, (4) a spatial division multiple access (SDMA) system that transmits data for different users on different spatial channels, (5) an orthogonal frequency division multiples access (OFDMA) system that transmits data for different users on different frequency subbands, and so on.

Figure 2:
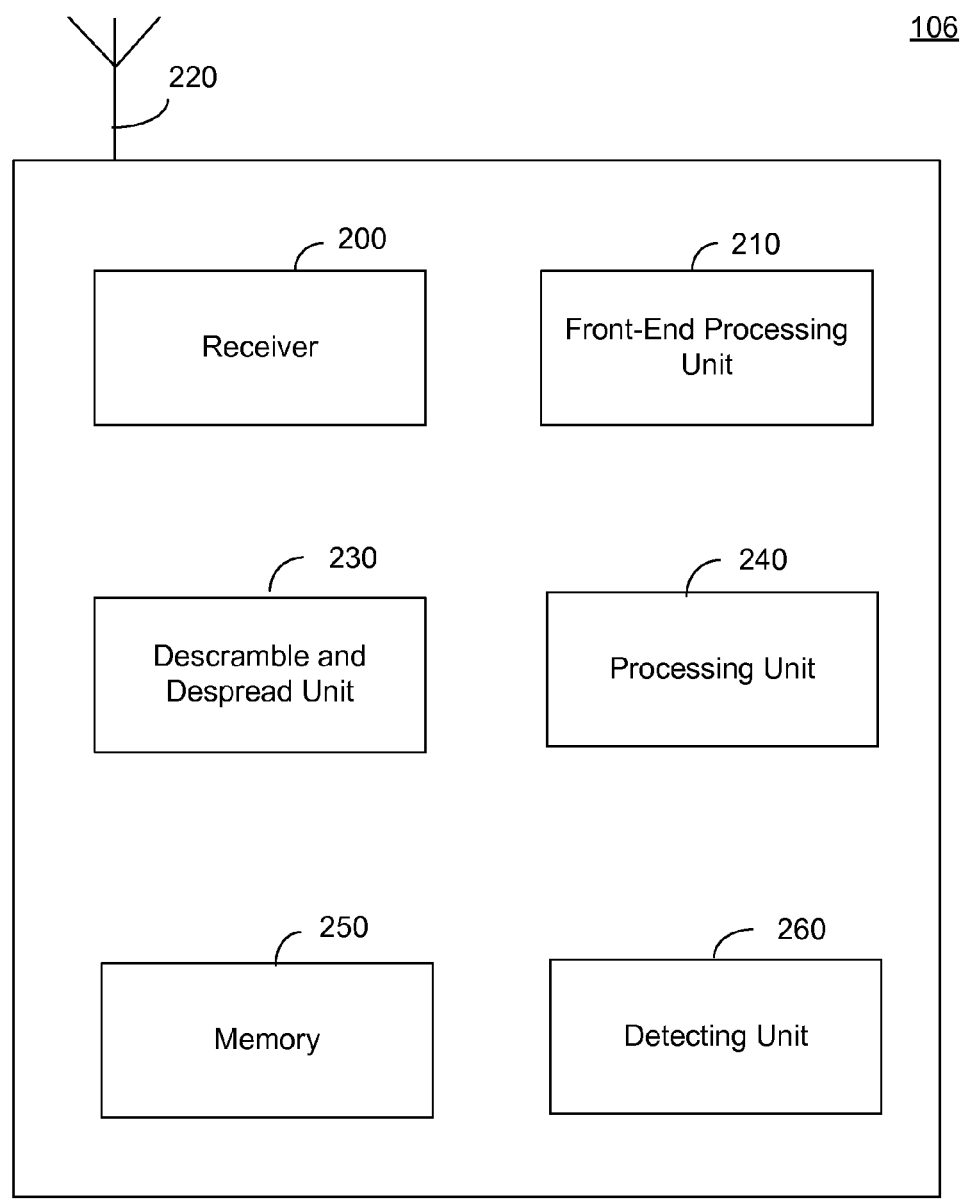
FIG. 2 is a block diagram of a mobile station used in a wireless communication system, according to certain aspects of the present disclosure.

FIG. 2 is a block diagram of a mobile station 106 used in a wireless communication system 100, according to certain aspects of the present disclosure. Mobile station 106 may include a receiver 200 that is configured to receive a transmitted signal using antenna 220. The receiver 200 is communicatively coupled to a front-end processing unit 210, which may be used for filtering of the received signal using, for example, a channel-matched filter and/or an equalizer. The mobile station 106 may include a descramble and despread unit 230, which descrambles and despreads the output of the front-end processing unit 210. Mobile station 106 may further include a processing unit 240, a communicatively coupled memory 250 and a communicatively coupled detection unit 260, which is used for multi-user detection and described in further detail below. The mobile station 106 is not limited to any particular configuration, and various combinations of components, as well as other components, may be included in the mobile station 106.

Figure 3:
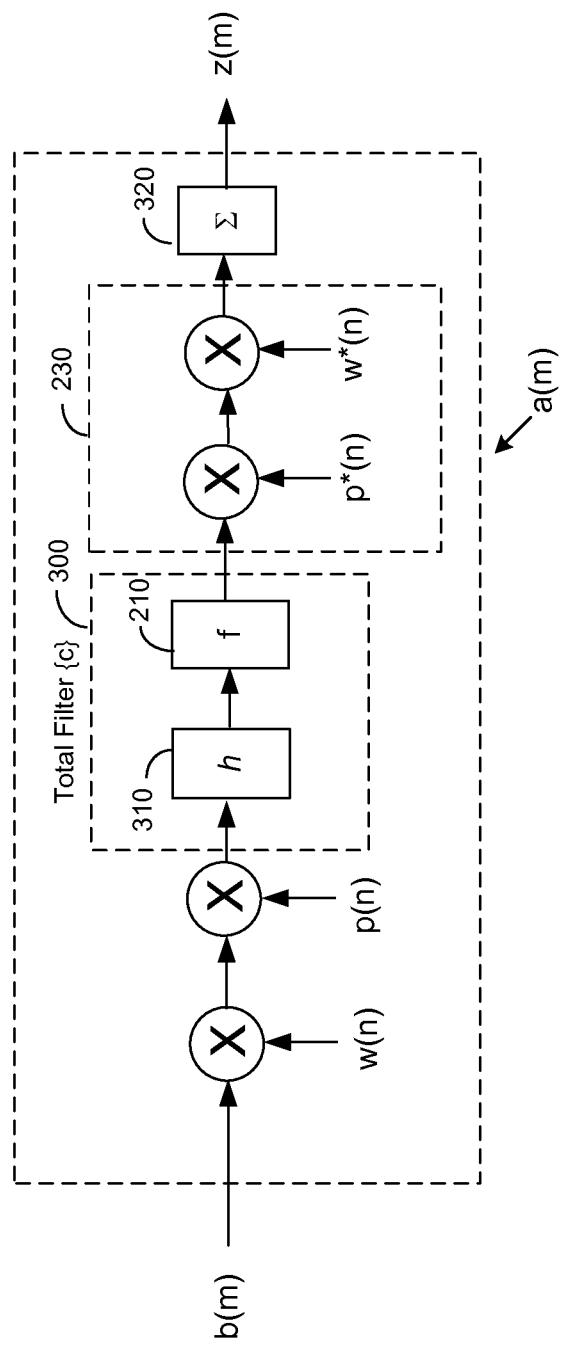
FIG. 3 is a diagram of a single user channel model, according to certain aspects of the present disclosure.

FIG. 3 is a diagram of a single user channel model, according to certain aspects of the present disclosure. As shown in FIG. 3, a user symbol b(m) is transmitted from a transmitter (not shown), which may be within a base station 104, for example. The user symbol may also be referred to as a data symbol for the user and may be obtained by mapping one or more data bits to a data symbol using Binary Phase Shift Keying (BPSK) modulation, Quadrature Phase Shift Keying (QPSK) modulation, Quadrature Amplitude Modulation (QAM), or other scheme. It is noted that m refers to the symbol period of user symbol b(m). It follows that a previous user symbol would be labeled as b(m−1) and a subsequent user symbol would be labeled as b(m+1). The user symbol b(m) is spread, using a Walsh code w(n), for example, and scrambled using code p(n). The Walsh code may have a spreading factor of N, in which the Walsh code w(n) comprises a sequence of N chips spanning one symbol period. The result of the spreading and scrambling is transmitted over channel h at block 310.

Mobile station 106 receives chips at receiver 200 using antenna 220, which are then filtered at front-end processing unit 210, and descrambled using descrambling code p*(n) and despread using despreading code w*(n) at the descramble and despread unit 230, before being summed at summation block 320. The resulting received symbol at the mobile station 106 is labeled as z(m). The summation block 320 sums the despreaded signal over one symbol period to obtain each received symbol z(m).

Total filter 300 "{c}" refers to a total filter, which is a convolution of the channel 310h and the filter 210f. The channel 310h may be estimated using pilot-based channel estimation and/or data-aided channel estimation, which are discussed in further detail below. When the length of the total filter 300 is less than 2N+1 (where N is the spreading factor), z(m) may be expressed by Eq. (1) below:

$$z(m) = a_{-1}(m)b(m-1) + a_0(m)b(m) + a_1(m)b(m+1) \quad (1)$$

In terms of c(l), w(n) and p(n), $a_{-1}(m)$, $a_0(m)$ and $a_1(m)$ may be expressed as shown in Eqs. (2)-(4).

$$a_0(m) = \sum_{d=0}^{N-1} c(d) \sum_{n=(m-1)N}^{mN-1-d} w^*[n+d]p^*[n+d]w[n]p[n] + \sum_{d=1}^{N-1} c(d-N) \sum_{n=mN-d}^{nN-1} w^*[n+d-N]p^*[n+d-N]w[n]p[n] \quad (2)$$

$$a_1(m) = \sum_{d=0}^{N-1} c(d-N) \sum_{n=mN}^{(m+1)N-1-d} w^*[n+d-N]p^*[n+d-N]w[n]p[n] \quad (3)$$

$$a_{-1}(m) = \sum_{d=1}^{N} c(d) \sum_{n=(m-1)N-d}^{(m-1)N-1} w^*[n+d]p^*[n+d]w[n]p[n] \quad (4)$$

Figure 4A:
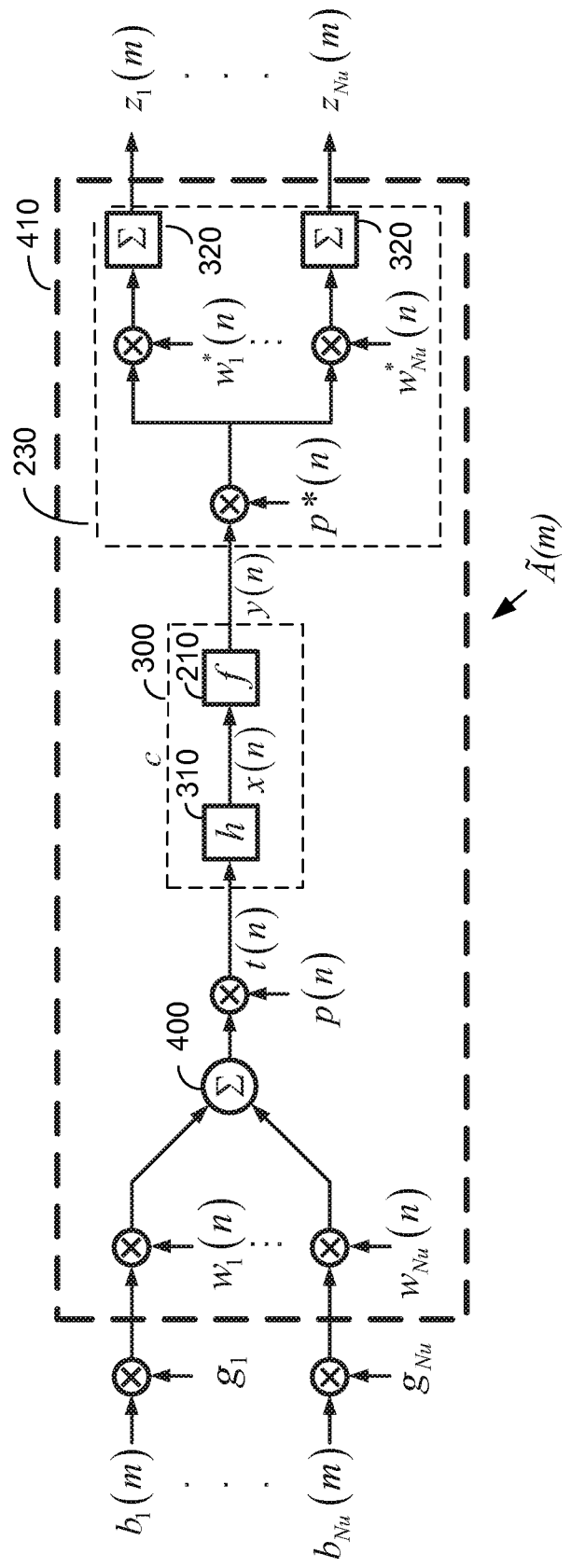
FIG. 4(a) is a diagram of a multi-user channel model, according to certain aspects of the present disclosure.

FIG. 4(a) is a diagram of a multi-user channel model, according to certain aspects of the present disclosure. Instead of transmitting a user symbol b(m), as described in FIG. 3, FIG. 4(a) shows the transmission of a user symbol set $\{b_k(m)\}$. That is, symbols $b_1(m)$ to $b_{Nu}(m)$ may be transmitted to multiple users 1 to Nu. It follows, therefore, that respective spreading codes (e.g., Walsh codes) $w_1(n)$ to $w_{Nu}(n)$ may be applied to each user symbol $b_1(m)$ to $b_{Nu}(m)$. Of course, the use of Walsh codes is merely exemplary, and other spreading techniques may be used without departing from the scope of the present disclosure. Furthermore, respective gains $g_1$ to $g_{Nu}$ may be applied to respective user symbols $b_1(m)$ to $b_{Nu}(m)$. It is noted that distinct or similar spreading codes or gains may be applied to respective user symbols $b_1(m)$ to $b_{Nu}(m)$ without departing from the scope of the present disclosure. The spread signals for the different users may be combined at combiner 400 before scrambling code p(n) is applied. The resulting combined signal is transmitted via channel 310h.

Mobile station 106 receives chips at receiver 200, using antenna 220, which are then filtered at front-end processing unit 210. Various front-end filtering techniques may be implemented (e.g., front-end channel-matched filter and/or equalization). The filtered chips are then descrambled using descrambling code p*(n) and despread using despreading codes $w^*_1(n)$ to $w^*_{Nu}(n)$ at the descramble and despread unit 230. The descrambling code p*(n) and despreading codes $w^*_1(n)$ to $w^*_{Nu}(n)$ may be conjugates of the scrambling p(n) and spreading codes $w_1(n)$ to $w_{Nu}(n)$, respectively. Each despreaded signal is summed over one symbol period by the respective summation block 320 to obtain a received symbol $z_1(m)$ to $z_{Nu}(m)$. The resulting received symbols $z_1(m)$ to $z_{Nu}(m)$ represent the symbols received at a mobile station 106.

Figure 4B:
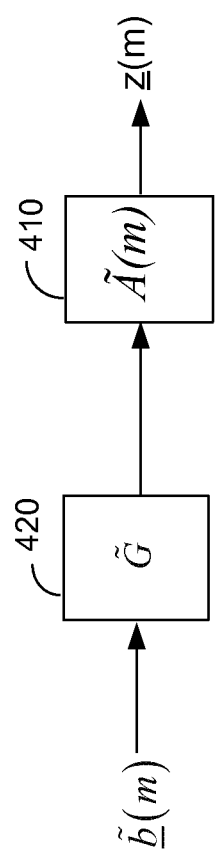
FIG. 4(b) is a diagram of a simplified multi-user channel model, according to certain aspects of the present disclosure.
Figure 4C:
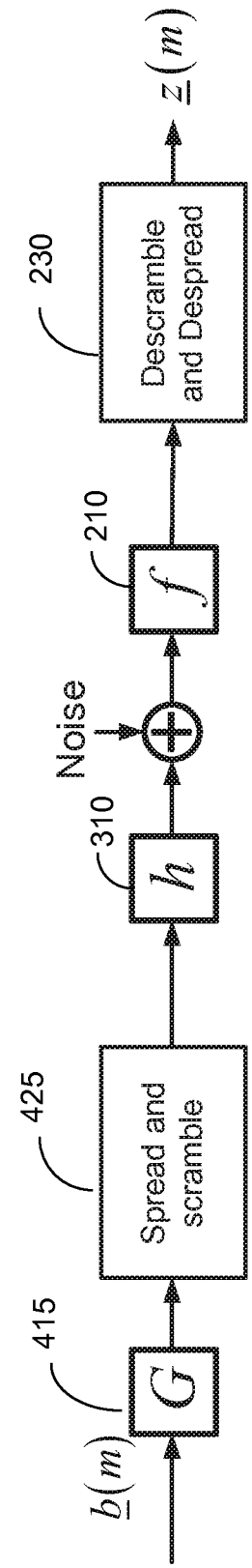
FIG. 4(c) is a diagram of a simplified multi-user channel model including noise, according to certain aspects of the present disclosure.

The resulting received symbols $z_1(m)$ to $z_{Nu}(m)$ may be expressed as a vector $\underline{z}(m)$, shown in Eq. (5) below:

$$\underline{z}(m) = A_{-1}(m)G\underline{b}(m-1) + A_0(m)G\underline{b}(m) + A_1(m)G\underline{b}(m+1) \quad (5)$$

$$= \tilde{A}(m)\tilde{G}\underline{\tilde{b}}(m)$$

where G is a gain matrix 415 (see FIG. 4(*c*)) and $\tilde{G}$ is a stacked gain matrix 420 (see FIG. 4(*b*)), which can be expressed as shown in Eq. (6):

$$G = \begin{bmatrix} g_1 & & 0 \\ & \ddots & \\ 0 & & g_{Nu} \end{bmatrix} \quad (6)$$

$$\tilde{G} = \begin{bmatrix} G & & \\ & G & \\ & & G \end{bmatrix}$$

b(m) is a vector of user symbols $b_1(m)$ to $b_{Nu}(m)$ and can be expressed as shown in Eq. (7):

$$\underline{b}(m) = \begin{bmatrix} b_1(m) \\ \vdots \\ b_{Nu}(m) \end{bmatrix}, \quad (7)$$

$$\underline{\tilde{b}}(m) = \begin{bmatrix} \underline{b}(m-1) \\ \underline{b}(m) \\ \underline{b}(m+1) \end{bmatrix}$$

$\tilde{A}(m)$ may be referred to as a multi-user interference matrix 410, and is expressed as shown in Eq. (8):

$$\tilde{A}(m) = [A_{-1}(m) \; A_0(m) \; A_1(m)] \quad (8)$$

According to certain embodiments, $A_{-1}(m)$, $A_0(m)$ and $A_1(m)$ are Nu by Nu multi-user interference (MAI) and shoulder matrices, where Nu is the number of code channels in a serving cell 102. The determination of matrices $A_{-1}l(m)$, $A_0(m)$ and $A_1(m)$ will be discussed in greater detail below with reference to FIG. 5.

The resulting expression in Eq. (5) may be rewritten as in Eq. (9) below:

$$\underline{z}(m) = \sum_{l=-1}^{1} A_l(m) G \underline{b}(m+l) \quad (9)$$

As a result of the foregoing equations, a simplified model of the transmission of user symbols $b_1(m)$ to $b_{Nu}(m)$ and the received symbols $z_1(m)$ to $z_{Nu}(m)$ may be expressed as shown in FIG. 4(*b*). In FIG. 4(*b*), the stacked gain matrix $\tilde{G}$ is labeled as 420 and multi-user interference matrix $\tilde{A}(m)$ is labeled as 410 (as delineated by the dotted line in FIG. 4(*a*)).

FIG. 4(*c*) is a diagram of a simplified multi-user channel model including noise, according to certain aspects of the present disclosure. As shown in FIG. 4(*c*), user symbols b(m) are gain scaled at block 415, and are spread and scrambled at block 425. The resulting signal is transmitted via channel 310*h*, and may be subjected to noise during transmission. The signal received at the receiver is filtered at front-end processing unit 210 and descrambled and despread at descramble and despread unit 230. The resulting received symbols $\underline{z}(m)$ can be expressed by Eq. (10), where the noise is represented by v(m).

$$\underline{z}(m) = \tilde{A}(m)\tilde{G}\underline{\tilde{b}}(m) + v(m) \quad (10)$$

It follows, therefore, that the resulting received symbols z(m) (e.g., a despread CDMA signal) may be shown by a single expression, which represents multi-user inter-symbol interference (ISI), multi-user interference (MUI) as well as other unaccounted for noise v(m). The single expression represents a symbol-level, time-varying, multi-user model of the despread signal, as shown in Eq. (11).

$$\underline{z}(m) = A_{-1}(m) G \underline{b}(m-1) + A_0(m) G \underline{b}(m) + A_{+1}(m) G \underline{b}(m+1) + \underline{v}(m) \quad (11)$$

As an alternative, Eq. (11) may be written as Eq. (12):

$$\underline{z}(m) = \sum_{l=-1}^{1} A_l(m) G \underline{b}(m+l) + \underline{v}(m) \quad (12)$$

Figure 5:
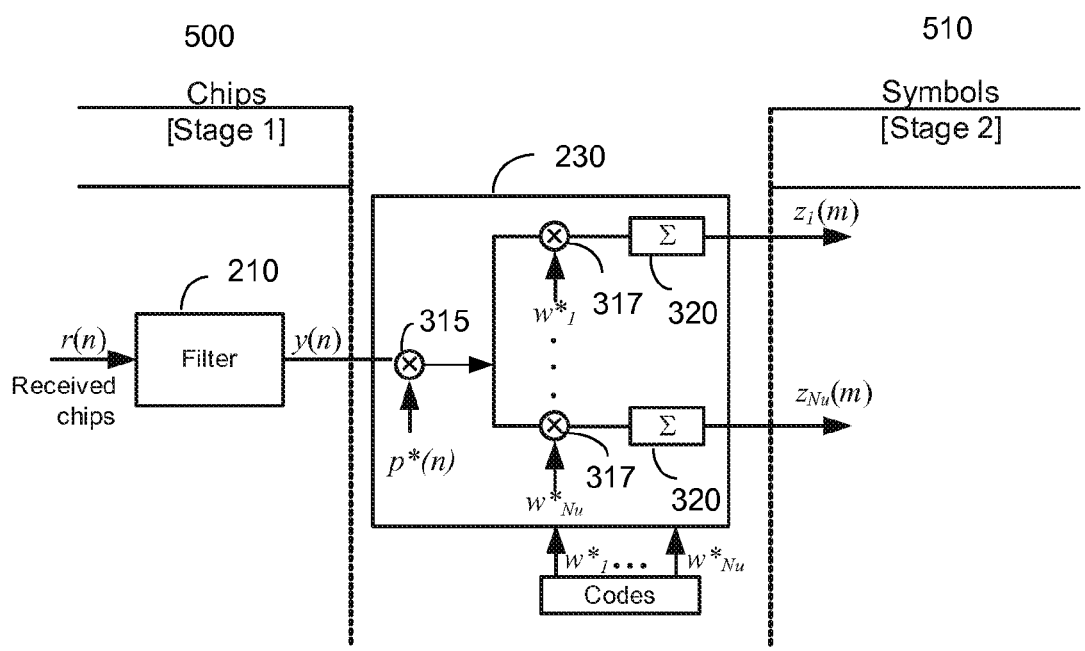
FIG. 5 is a schematic of a multi-user detection system using two-stage processing in a wireless communication system, according to certain aspects of the present disclosure.

FIG. 5 is a schematic of a multi-user detection system using two-stage processing at a receiver in a wireless communication system, according to certain aspects of the present disclosure. Stage 1 500 refers to the chip level, when the chips r(n) are received at receiver 200 (shown in FIG. 2). The received chips r(n) are subjected to front-end processing at filter 210 (e.g., channel matched filter and/or equalizer). The output of the filter 210, y(n), is input to the descramble and despread unit 230, where the output y(n) is descrambled using descrambling code p*(n) and despread using despreading codes $w^*_1(n)$ to $w^*_{Nu}(n)$, for example, which are previously stored in memory 250. The descramble and despread unit 230 outputs the received symbols $z_1(m)$ to $z_{Nu}(m)$.

In one aspect, the descramble and despread unit 230 comprises a descrambling mixer 315 to mix the filtered chips y(n) with the descrambling code p*(n) and despreading mixers 317 to mix the descrambled chips with the despreading codes $w^*_1(n)$ to $w^*_{Nu}(n)$. The descramble and despread unit 230 also comprises summation blocks 320 for summing the despread signals over one symbol period to obtain the received symbols $z_1(m)$ to $z_{Nu}(m)$.

It is to be understood that the filtering, descrambling and despreading operations of the multi-user detection system may be arranged in a different order than shown in the example in FIG. 5 to obtain the received symbols $z_1(m)$ to $z_{Nu}(m)$. For example, the descrambling and despreading operations may be performed before filtering. Therefore, the multi-user detection system is not limited to a particular order of filtering, descrambling and despreading operations.

As noted above, total filter 300*c* refers to the convolution of channel 310*h* and filter 210*f*. Thus, c(l) is equal to h(l) convolved with f(l), where h(l) and f(l) may be computed and stored in the memory 250. In terms of c(l), w(n) and p(n), matrices $A_{-1}(m)$, $A_0(m)$ and $A_1(m)$ may be expressed as shown in Eqs. (13)-(15).

$$[A_0(m)]_{ij} = \sum_{d=0}^{N-1} c(d) \sum_{n=(m-1)N}^{mN-1-d} w_i^*[n+d]p^*[n+d]w_j[n]p[n] + \quad (13)$$

$$\sum_{d=1}^{N-1} c(d-N) \sum_{n=mN-d}^{mN-1} w_i^*[n+d-N]p^*[n+d-N]w_j[n]p[n]$$

$$[A_1(m)]_{ij} = \quad (14)$$

$$\sum_{d=0}^{N-1} c(d-N) \sum_{n=mN}^{(m+1)N-1-d} w_i^*[n+d-N]p^*[n+d-N]w_j[n]p[n]$$

$$[A_{-1}(m)]_{ij} = \sum_{d=1}^{N} c(d) \sum_{n=(m-1)N-d}^{(m-1)N-1} w_i^*[n+d]p^*[n+d]w_j[n]p[n] \quad (15)$$

Stage 2 510 refers to the symbol level, where the output of the descramble and despread unit 230 is obtained (i.e., resulting received symbols $z_1(m)$ to $z_{Nu}(m)$). Eq. (11) above provides a symbol-level, time-varying, multi-user model that relates the received symbols $z_1(m)$ to $z_{Nu}(m)$ to the desired user symbols $b_1(m)$ to $b_{Nu}(m)$. Using Eq. (11) and the computed matrices $A_{-1}(m)$, $A_0(m)$ and $A_1(m)$, the gain matrix, and the received symbols, one can solve for the desired user symbols $b_1(m)$ to $b_{Nu}(m)$.

According to certain embodiments, the shoulder matrices $A_{-1}$ and $A_1$ may be small, so that they may be absorbed with noise $v(m)$, resulting in total interference $\acute{\eta}(m)$. As a result, $\underline{z}(m)$ may be expressed as shown in Eq. (16).

$$\underline{z}(m) = A_0(m)G\underline{b}(m) + \acute{\underline{\eta}}(m) \quad (16)$$

Figure 6:
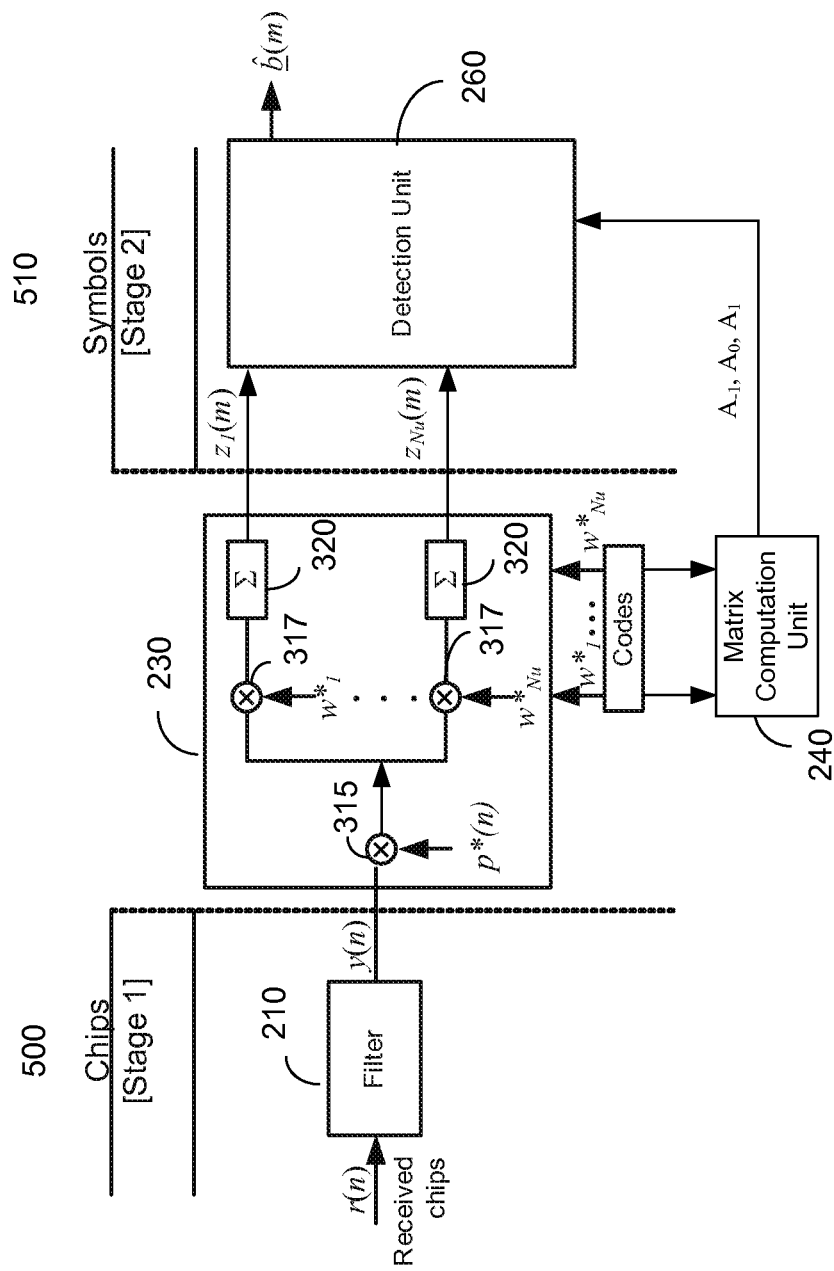
FIG. 6 is a schematic of a multi-user detection system using two-stage processing and a multi-user interference matrix, according to certain aspects of the present disclosure.

FIG. 6 is a schematic of a multi-user detection system using two-stage processing and a multi-user interference matrix in a wireless communication system, according to certain aspects of the present disclosure. FIG. 6 is similar to FIG. 5, but includes a matrix computation unit 240 and detection unit 260. The same Stage 1 500 and Stage 2 510 processing occurs, as described above with reference to FIG. 5. However, according to certain aspects, matrix computation unit 240 may compute the multi-user interference matrix $A_0(m)$, for example, and communicate the matrix to detection unit 260. Given the value of multi-user interference matrix $A_0(m)$ and the received symbols $\underline{z}(m)$, the detection unit 260 detects desired user symbols $\hat{b}(m)$ by solving for the desired symbols $b(m)$ in Eq. (16), for example. The hat superscript denotes the detected user symbols, which provide estimates of the user symbols at the transmitter side (e.g., base station 104). It is noted that the received symbols $\underline{z}(m)$ are previously determined by descrambling and despreading the received chips and G as previously known. Based on Eq. (16), various detection and estimation techniques may be employed by detection unit 260 to determine the desired user symbols, such as minimum mean square error estimation (MMSE), maximum likelihood detection (MLD) or sphere decoding (SD), maximum a posteriori detection (MAPD), and slicing. Other techniques known in the art may also be used. Although the matrix computation matrix 240 and detection unit 260 are shown separately in FIG. 5 for ease of illustration, their operations may be performed by the same processor or multiple processors.

In one aspect, the multi-user interference matrix $A_0(m)$ is a Nu by Nu matrix that relates each received symbol $z_1(m)$ to $z_{Nu}(m)$ to a corresponding user symbol and to the other user symbols. For example, for received symbol $z_1(m)$, coefficient $[A_0(m)]_{1,1}$ of the multi-user interference matrix $A_0(m)$ relates the received symbol $z_1(m)$ to the corresponding user symbol $b_1(m)$. In addition, the other coefficients $[A_0(m)]_{1,2}$ to $[A_0(m)]_{1,Nu}$ in the first row of the multi-user interference matrix $A_0(m)$ relate the received symbol $z_1(m)$ to the other user symbols $b_2(m)$ to $b_{Nu}(m)$, respectively, which contribute to the multi-user interference for received symbol $z_1(m)$. The same can apply to the other received symbols.

Therefore, the multi-user interference matrix $A_0(m)$ in this aspect accounts for multi-user interference when solving for the user symbols $b_1(m)$ to $b_{Nu}(m)$ in Eq. (16). Thus, the multi-user interference matrix $A_0(m)$ provides multi-user user symbol detection at the symbol level which accounts for multi-user interference without having to perform complex chip-level multi-user interference cancellation As a result, a desired symbol may be accurately detected with the use of a broad-range of powerful and advanced receivers at the symbol level.

Figure 7:
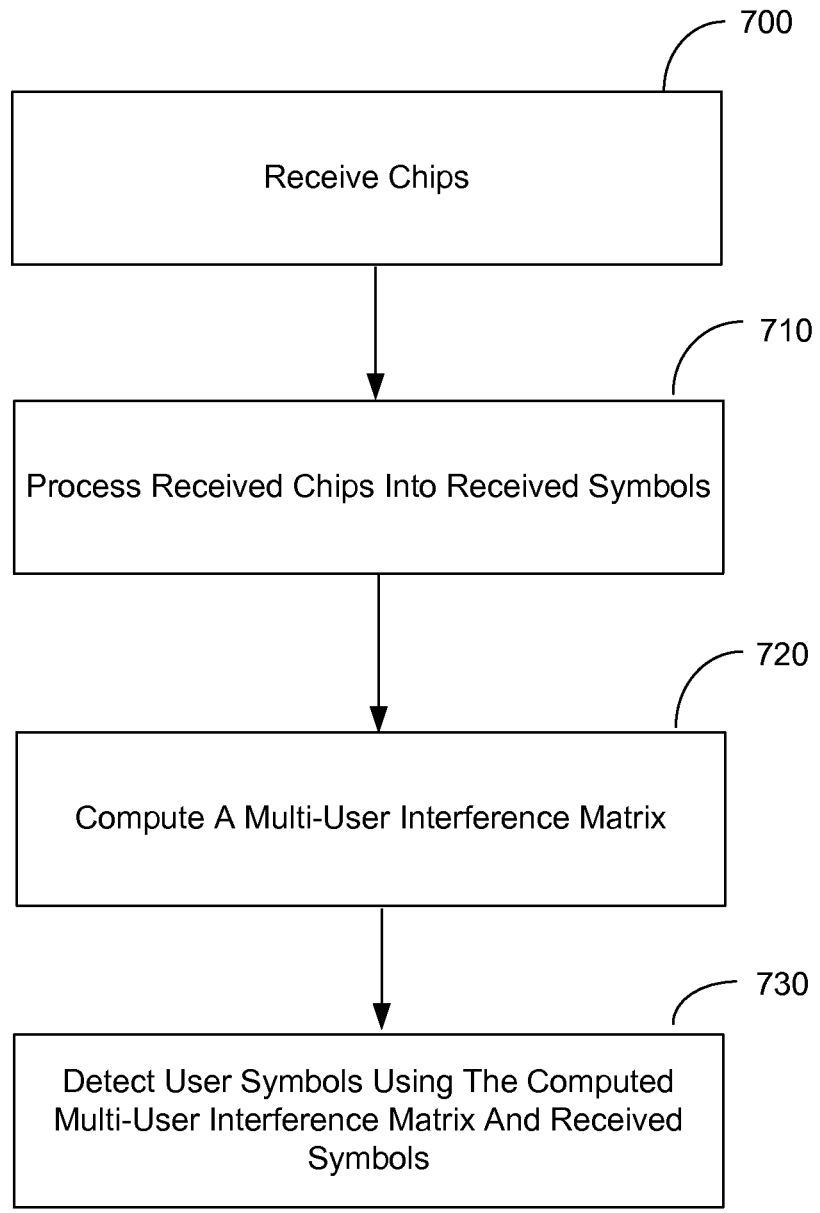
FIG. 7 is a flow diagram illustrating a method of multi-user detection using two-stage processing, according to certain aspects of the present disclosure.

FIG. 7 is a flow diagram illustrating a method of multi-user detection using two-stage processing in a wireless communication system, according to certain aspects of the present disclosure. At operation 700, chips are received at a receiver 200 as part of a mobile station 106. From operation 700, the process continues to operation 710, where the chips are processed into one or more received symbols $z(m)$ for a plurality of users. For example, the received chips may be filtered and then descrambled and despreaded into received symbols.

From operation 710, the process continues to operation 720 where a multi-user interference matrix $A_0(m)$ is computed from the known codes, filter coefficients and a channel estimate (e.g., based on Eq. (13)). The channel may be estimated, for example, using pilot-based channel estimation or data-aided channel estimation, which is described below.

From operation 720, the process continues to operation 730 where the computed matrix $A_0(m)$ and received symbols are used to detect the desired user symbols based on a symbol-level model relating the desired user symbols $b(m)$ to the received symbols $z(m)$. For example, the symbol-level, time-varying, multi-user model may be expressed by Eq. (16). In this example, the user symbols $\hat{b}(m)$ may be detected by solving for the user symbols $b(m)$ in Eq. (16), using various techniques including MMSE, MLD, SD, MAPD and slicing. The matrix $A_0(m)$ relates the received symbol for each user not only to the desired user symbols for the respective user, but also user symbols for the other users. Thus, the matrix $A_0(m)$ accounts for multi-user interference.

To account for multi-user inter-symbol interference, the shoulder matrices $A_1(m)$ and $A_{-1}(m)$ may also be computed in operation 720. The user symbols $\hat{b}(m)$ may then be detected in operation 730 using the received symbols $\underline{z}(m)$ and the matrices $A_1(m)$, $A_0(m)$, $A_{-1}(m)$, for example, by solving for the user symbols $b(m)$ in Eq. (12). One of the shoulder matrices $A_1(m)$ and $A_{-1}(m)$ may be used to detect the user symbols $b(m)$ instead of using both shoulder matrices. In this case, the term in Eq. (12) corresponding to the shoulder matrix not being used is omitted when solving for the user symbols $\underline{b}(m)$ in Eq. (12).

Figure 8:
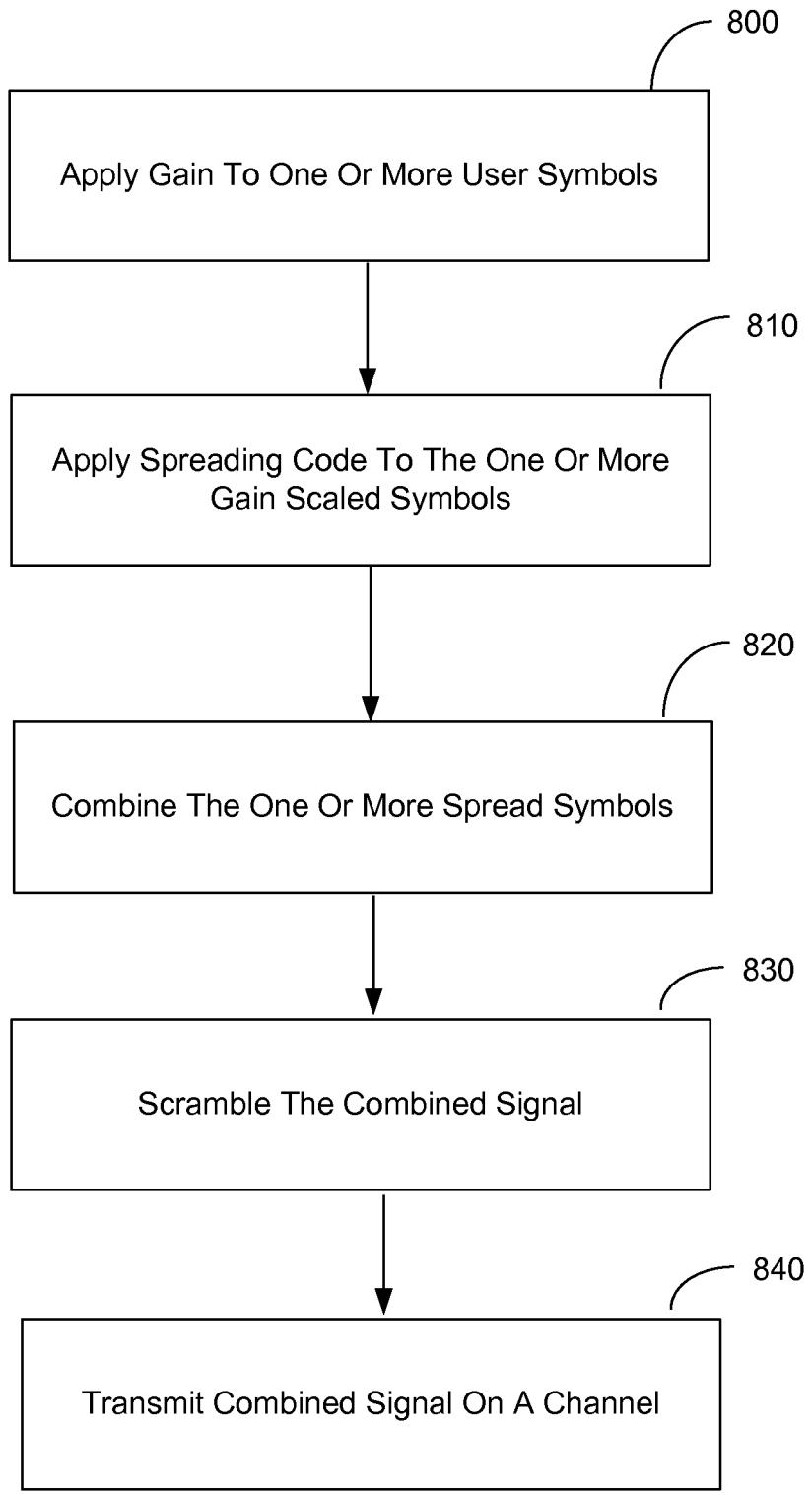
FIG. 8 is a flow diagram illustrating a method of transmitting chips to a receiver, according to certain aspects of the present disclosure.

FIG. 8 is a flow diagram illustrating a process of transmitting chips, according to certain aspects of the present disclosure. This process may be performed, for example, at a base station 104 or other transmitter to transmit chips to a mobile station 106 or other receiving device.

At operation 800, a respective gain is applied to one or more user symbols to be transmitted. Any conventional means for applying a gain may be used, and the respective gains may be the same or distinct from each other.

From operation 800, the process continues to operation 810 where spreading codes are applied to the one or more gain scaled symbols, respectively. Traditional CDMA spreading techniques, such as applying a Walsh code, may be implemented. The user symbols may be spread, for example, to separate user symbols for different users. The one or more spread symbols are combined, using a combiner 400, at operation 820.

From operation 820, the process continues to operation 830 where the combined signal is scrambled. The combined signal may be scrambled, for example, to separate the combined signal from signals from other cells (e.g., served by other base stations 104). Thereafter, at operation 840, the combined signal is transmitted on a channel $310h$ (see FIG. 3).

Figure 9:
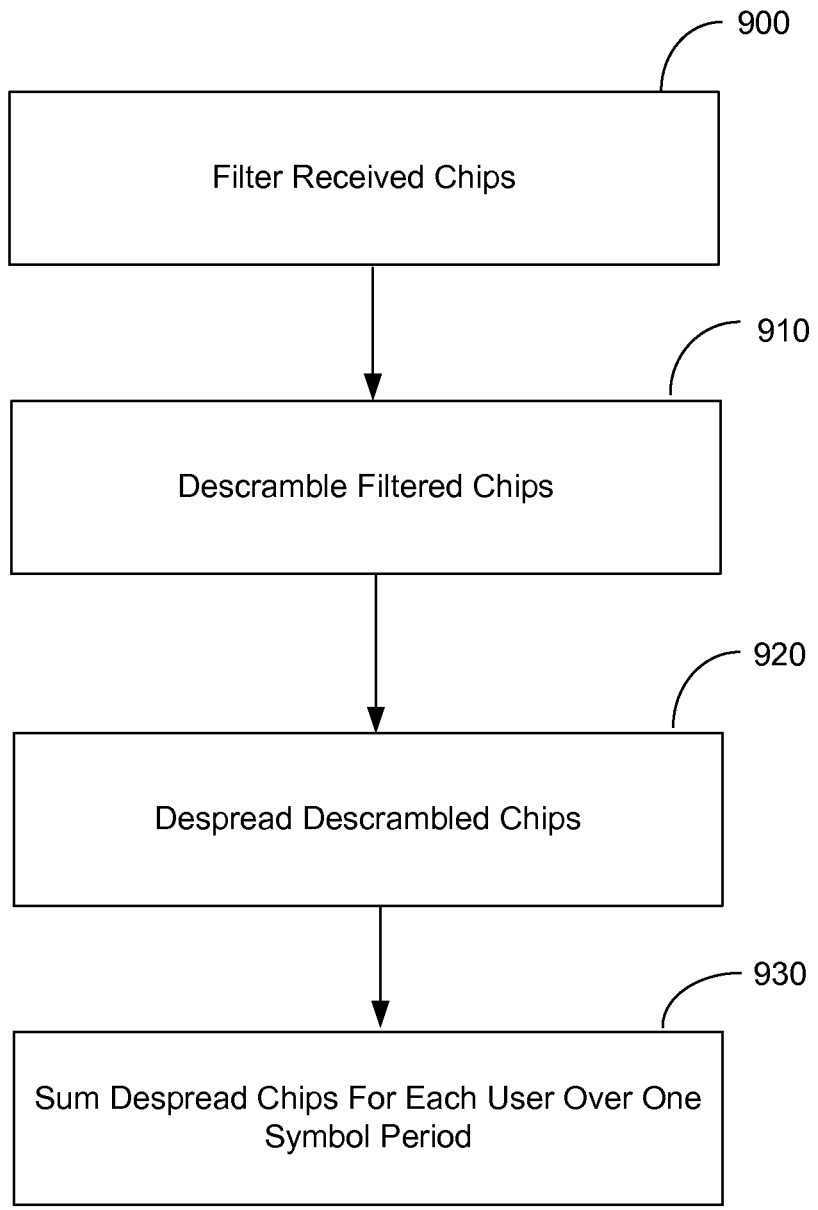
FIG. 9 is a flow diagram illustrating a method of processing chips into one or more received symbols for a plurality of users, according to certain aspects of the present disclosure.

FIG. 9 is a flow diagram illustrating a method of processing chips into one or more received symbols for a plurality of users, according to certain aspects of the present disclosure. This process may be performed at a mobile station 106 or other receiving device.

At operation 900, the received chips are filtered by filter 210f by front-end processing unit 210. As noted herein, the front-end processing may be performed using a channel matched filter and/or an equalizer, for example. However, other filtering techniques may be implemented without departing from the scope of the present invention.

From operation 900, the process continues to operation 910, where the filtered chips are descrambled using descrambling code p*(n), based on a conjugate of the scrambling code p(n) previously used to scramble the signal at the transmission side. Thereafter, the descrambled chips are despread at operation 920 using despreading codes based on conjugates of the Walsh codes, for example, previously used to spread the signal at the transmitter side. Each despreading code may correspond to a different user or code channel. The despreading and descrambling may be performed by the despreading and descrambling unit 230. The descrambling and despreading codes may be pre-programmed into memory 250, which is communicatively coupled to the descramble and despread unit 230.

From operation 920, the process continues to operation 930 where the despread chips for each user are summed over one symbol period to obtain the received symbol for the respective user. The summation may be performed by the respective summation block 320. The operations in FIG. 9 may also be performed in a different order to obtain the received symbols.

Figure 10:
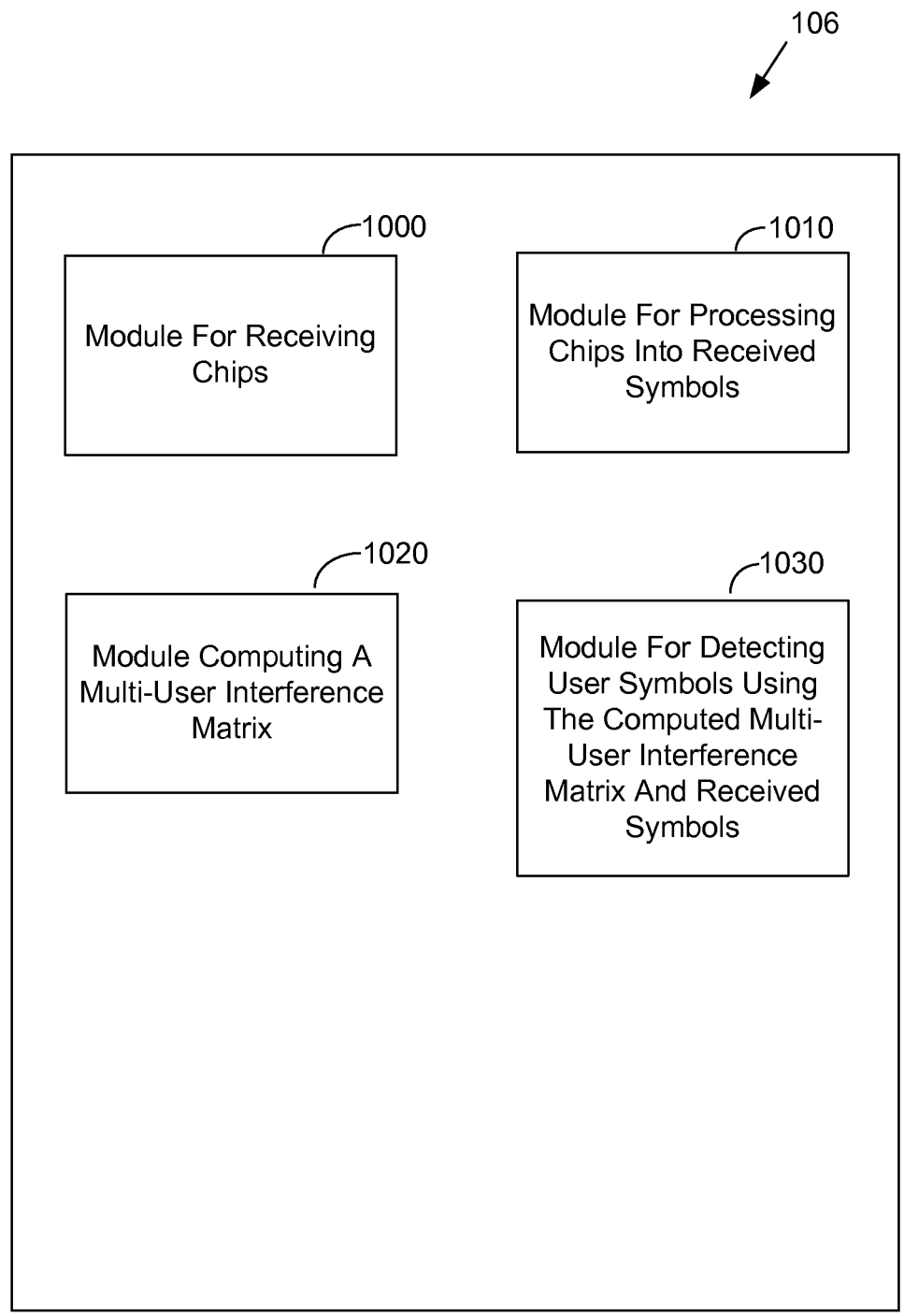
FIG. 10 is a block diagram of a mobile station used in a wireless communication system, according to certain aspects of the present disclosure.

FIG. 10 is a block diagram of a mobile station 106 used in a wireless communication system 100, according to certain aspects of the present disclosure. Mobile station 106 of FIG. 10 includes a module 1000 for receiving chips. The mobile station 106 also includes a module 1010 for processing chips into one or more received symbols for a plurality of users, where the chips are filtered through front-end processing unit and then descrambled and despreaded and output as symbols $\underline{z}(m)$.

The mobile station 106 further includes a module 1020 for calculating a multi-user interference matrix. As described above, a multi-user interference matrix $A_0(m)$, for example, may be calculated based on the known codes, filter coefficients and channel estimate.

The mobile station 106 further includes a module 1030 for detecting the user symbols $\hat{b}(m)$ using the computed matrix $A_0(m)$ and the received symbols $\underline{z}(m)$ based on a symbol-level, time-varying, multi-user model relating the desired user symbols $\underline{b}(m)$ to the received symbols $\underline{z}(m)$. For example, the symbol-level, time-varying, multi-user model may be expressed by Eq. (16). In this example, the user symbols $\hat{b}(m)$ may be detected by solving for the user symbols $\underline{b}(m)$ in Eq. (16), using various techniques including MMSE, MLD, SD, MAPD and slicing.

Efficient Computation of Multi-User Interference and Shoulder Matrices

Efficient methods and systems for computing multi-user interference and shoulder matrices are provided, according to certain aspects of the present disclosure. In one aspect, when the user symbols are spread by Walsh codes, the multi-user interference and shoulder matrices can be efficiently computed using Fast Hadamard Transforms (FHTs), as discussed in further detail below.

Figure 11:
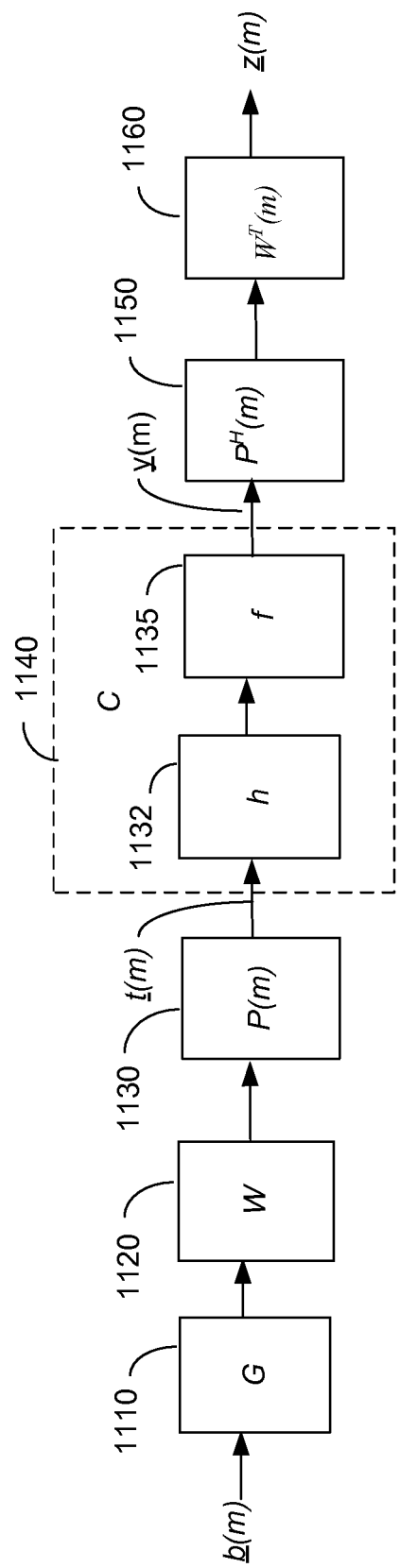
FIG. 11 is a diagram of a multi-channel model, according to certain aspects of the present disclosure.

FIG. 11 is a diagram of a multi-channel model according to one aspect. In FIG. 11, the user symbols $b_1(m)$ to $b_{Nu}(m)$ for symbol period m are represented in column vector form as $\underline{b}(m)$, where Nu is a number of users or code channels. A gain matrix G (block 1110) is applied to the user symbols $\underline{b}(m)$. The gain matrix G is a Nu×Nu diagonal matrix that applies gains $g_1$ to $g_{Nu}$ to the respective user symbols $b_1(m)$ to $b_{Nu}(m)$ and may be given as follows:

$$G = \begin{bmatrix} g_1 & & 0 \\ & \ddots & \\ 0 & & g_{Nu} \end{bmatrix} \quad (17)$$

The gain-scaled user symbols are then spread by a spreading matrix W (block 1120). The spreading matrix W is a N×Nu matrix that applies a Walsh code of N chips to each gain-scaled user symbol. The spreading matrix W may be given as follows:

$$W = [\underline{W}_1 \quad \cdots \quad \underline{W}_{Nu}] \quad (18)$$

where $\underline{W}_1$ is an N×1 column vector representing the Walsh code for the first user and $\underline{W}_{Nu}$ is an N×1 column vector of the Walsh code for the $Nu^{th}$ user. Each Walsh code $\underline{W}_1$ to $\underline{W}_{Nu}$ may comprise N chips. The spread user symbols are then scrambled by a scrambling matrix P(m) (block 1130). The scrambling matrix P(m) is a N×N diagonal matrix that applies a scrambling code of N chips to the spread user symbols. The scrambling matrix P(m) may be given as follows:

$$P(m) = \begin{bmatrix} P((m-1)N) & & 0 \\ & \ddots & \\ 0 & & P(mN-1) \end{bmatrix} \quad (19)$$

where (m−1)N to (mN−1) represent a chip index for the N chips of the scrambling code corresponding to symbol period m. After spreading and scrambling, the resulting chips are transmitted over channel h (block 1132). The transmitted chips for symbol period m may be represented as a N×1 column vector t(m) as shown in FIG. 11. The transmitted chips for symbol period m may be given as follows:

$$t(m) = P(m)WG\underline{b}(m) \quad (20)$$

The transmitted chips for the previous and next symbol periods m−1 and m+1, respectively, may be given as follows:

$$t(m-1) = P(m-1)WG\underline{b}(m-1) \quad (21)$$

$$t(m+1) = P(m+1)WG\underline{b}(m+1) \quad (22)$$

where it is assumed that the Walsh codes and gains are the same for the symbol periods m−1, m and m+1. In this aspect, the Walsh codes may repeat every symbol period.

The transmitted chips are transmitted over channel h (block 1132) to a receiver and filtered at the receiver by front-end filter f (block 1135). The output of the filter f for symbol period m may be represented as a N×1 column vector y(m), which may be expressed as:

$$\underline{y}(m) = C \begin{bmatrix} t(m-1) \\ t(m) \\ t(m+1) \end{bmatrix} \quad (23)$$

where C is a matrix for a total filter (block 1140), which is given by the convolution of the channel h and the filter f. The transmitted chips for symbol periods m−1 and m+1 are included in the expression for y(m) to account for inter-symbol interference. The total filter matrix C may be expressed by a N×3N Toeplitz matrix given as follows:

$$C = \begin{bmatrix} c[N] & c[N-1] & \cdots & c[1] & c[0] & c[-1] & \cdots & c[-N+1] & c[-N] \\ & \ddots & \ddots & \vdots & c[1] & \ddots & \ddots & \vdots & c[-N+1] & \ddots \\ & & \ddots & c[N-1] & \vdots & \ddots & \ddots & c[-1] & \vdots & \ddots & \ddots \\ & & & c[N] & c[N-1] & \cdots & c[1] & c[0] & c[-1] & \cdots & c[-N+1] & c[-N] \end{bmatrix} \quad (24)$$

$$\underbrace{\phantom{c[N]\ c[N-1]}}_{C_{-1}} \underbrace{\phantom{c[N-1]\ \cdots\ c[1]\ c[0]}}_{C_0} \underbrace{\phantom{c[-1]\ \cdots\ c[-N+1]\ c[-N]}}_{C_1}$$

where the filter length spans 2N chips (−N to N), and $C_{-1}$, $C_0$, and $C_1$ represent the portions of the total filter matrix C that are applied to the transmitted chips for the previous, current and next symbol periods, respectively. The total filter matrix C may be represented by $[C_{-1}\ C_0\ C_1]$. Plugging the expressions for the transmitted chips in Eqs. (20)-(22) into the expression for the filter output $\underline{y}(m)$ in Eq. (23) results in:

$$\underline{y}(m) = \sum_{l=-1}^{1} C_l P(m+l) W G \underline{b}(m+l) \quad (25)$$

After filtering by the front-end filter f, the filter output y(m) is descrambled by descrambling matrix $P^H(m)$ (block 1150), which is the Hermitian of the scrambling matrix P(m). After descrambling, the descrambled filter output is despread by despreading matrix $W^T$ (block 1160), which is the transpose of the spreading matrix W. The descrambling and despreading result in received symbols $\underline{z}(m)$ for users 1 to Nu. The received symbols $\underline{z}(m)$ may be given as follows:

$$\underline{z}(m) = W^T P^H(m) \underline{y}(m) \quad (26)$$

Plugging the expression for y(m) into Eq. (26) results in:

$$\underline{z}(m) = W^T P^H(m) \sum_{l=-1}^{1} C_l P(m+l) W G \underline{b}(m+l) \quad (27)$$

Based on Eq. (27), the multi-user interference and shoulder matrices $A_{-1}, A_0, A_1$, respectively, for symbol period m may be represented as follows:

$$A_{-1}(m) = W^T P^H(m) C_{-1} P(m-1) W \quad (28)$$

$$A_0(m) = W^T P^H(m) C_0 P(m) W \quad (29)$$

$$A_1(m) = W^T P^H(m) C_1 P(m+1) W \quad (30)$$

Using Eqs. (28)-(30), the multi-user interference and shoulder matrices $A_{-1}, A_0, A_1$ can be computed. In one aspect, Fast Hadamard Transforms (FHTs) are used to efficiently compute the multi-user interference and shoulder matrices $A_{-1}, A_0, A_1$, as discussed below.

A FHT operation computes the product of a Hadamard matrix and a vector, in which a $2^n$ order Hadamard matrix may be recursively defined by:

$$H_{2^n} = \begin{bmatrix} H_{2^{n-1}} & H_{2^{n-1}} \\ H_{2^{n-1}} & -H_{2^{n-1}} \end{bmatrix} \quad (31)$$

where $H_2$ is given by:

$$H_2 = \begin{bmatrix} 1 & 1 \\ 1 & -1 \end{bmatrix} \quad (32)$$

A FHT operation may also be used to compute the product of a Hadamard matrix and a matrix since a matrix may be represented by multiple vectors. Computationally efficient systems and methods have been developed to perform FHT operations. A Walsh matrix may be transformed into a Hadamard matrix by re-ordering the rows or columns of the Walsh matrix. Alternatively, the Walsh codes in the Walsh matrix may already be ordered to form a Hadamard matrix, in which case the Walsh matrix does not need to be transformed. These properties of the Walsh matrix can be exploited to efficiently compute the multi-user interference and shoulder matrices in Eqs. (28)-(30) using FHT operations.

In one aspect, the spreading matrix W in Eqs. (28)-(30) is a Walsh matrix that can be transformed into a Hadamard matrix by reordering the rows or columns of the matrix W. The despreading matrix $W^T$ in Eqs. (28)-(30) is a transpose of the spreading matrix W that may be considered a Walsh matrix that can also be transformed into a Hadamard matrix by reordering the rows or columns of the matrix $W^T$. In this aspect, the product of the Walsh matrix W and another matrix in Eqs. (28)-(30) may be efficiently computed using FHT operations by reordering the rows or columns of the Walsh matrix W to transform the Walsh matrix W into a corresponding Hadamard matrix, and reordering the rows or columns of the other matrix in a similar manner. The other matrix may be one or a combination of matrices in Eqs. (28)-(30). FHT operations are then used to compute the product of the corresponding Hadamard matrix and the other matrix with its rows or columns reordered. After the FHT operations, the rows or columns of the resulting matrix may be reordered in a reverse manner as the Walsh matrix W to obtain the desired product. The reordering operations are not needed if the Walsh codes in the Walsh matrix W are already ordered to form a Hadamard matrix, in which case the FHT operations can be applied directly to the Walsh matrix W.

The product of the Walsh matrix $W^T$ and another matrix in Eqs. (28)-(30) may also be computed using FHT operations in a similar manner. The matrices in Eqs. (28)-(30) selected for the FHT operations may be based on, e.g., a selection resulting in an efficient hardware and/or software implementation. Two examples of using FHT operations to efficiently compute the multi-user interference and shoulder matrices are provided below.

In one example, FHT operations can be used to efficiently compute the product given by:

$$A_0(m) = W^T M \quad (33)$$

where $W^T$ is the despreading matrix, which in this example is a Walsh matrix comprising a plurality of Walsh codes, and M is a combined matrix given by:

$$M = P^H(m) C_0 P(m) W \quad (34)$$

The product of matrices $W^T$ and M is equivalent to Eq. (29) for computing the interference matrix $A_0$ where matrix $W^T$ corresponds to the despreading matrix. In order to apply FHT operations, the Walsh matrix $W^T$ is transformed into a Hadamard by reordering the rows (Walsh codes) in the matrix $W^T$. The rows of matrix M are also reordered in a similar manner as matrix $W^T$. After row reordering, the product may be given by:

$$A_0'(m) = HM' \quad (35)$$

where H is the Hadamard matrix corresponding to $W^T$ and M' is matrix M after the rows have been reordered. FHT operations may then be used to efficiently compute the product in Eq. (35). After the FHT operations, the rows of the resulting matrix $A_0'$ may be reordered in a reverse manner as matrix $W^T$ to obtain the interference matrix $A_0$. The shoulder matrices $A_{-1}$ and $A_1$ may be computed in a similar manner using FHT operations.

The matrix M in Eq. (33) may also be computed using FHT operations. In one aspect, the matrix M may be expressed by:

$$M = [[P^H(m) C_0 P(m) W]^T]^T \quad (36)$$

using the property:

$$M = [M^T]^T \quad (37)$$

where T is a transpose. Equation (36) may be rewritten as follows:

$$M = [W^T (P^H(m))^T C_0^T P^T(m)]^T \quad (38)$$

$$M = [W^T P^T(m) C_0 T (P^H(m))^T]^T \quad (39)$$

$$M = [W^T (P^T(m) C_0^T P^*(m))]^T \quad (40)$$

In one aspect, matrix M in Eq. (40) is efficiently computed using FHT operations. To do this, the matrix $W^T$ is transformed into a corresponding Hadamard matrix by re-ordering the rows of the matrix $W^T$, and the rows of the combined matrix $P^T(m) C_0^T P^*(m)$ are reordered in a similar manner. After row reordering, the product may be efficiently computed using FHT operations. After the FHT operations, the rows of the resulting matrix are reordered in a reverse manner as the rows of $W^T$. Finally, after row reordering, the transpose of the resulting matrix is taken to obtain the matrix M. The matrix M for the shoulder matrices $A_{-1}$ and $A_1$ may be computed in a similar manner using FHT operations.

Figure 12A:
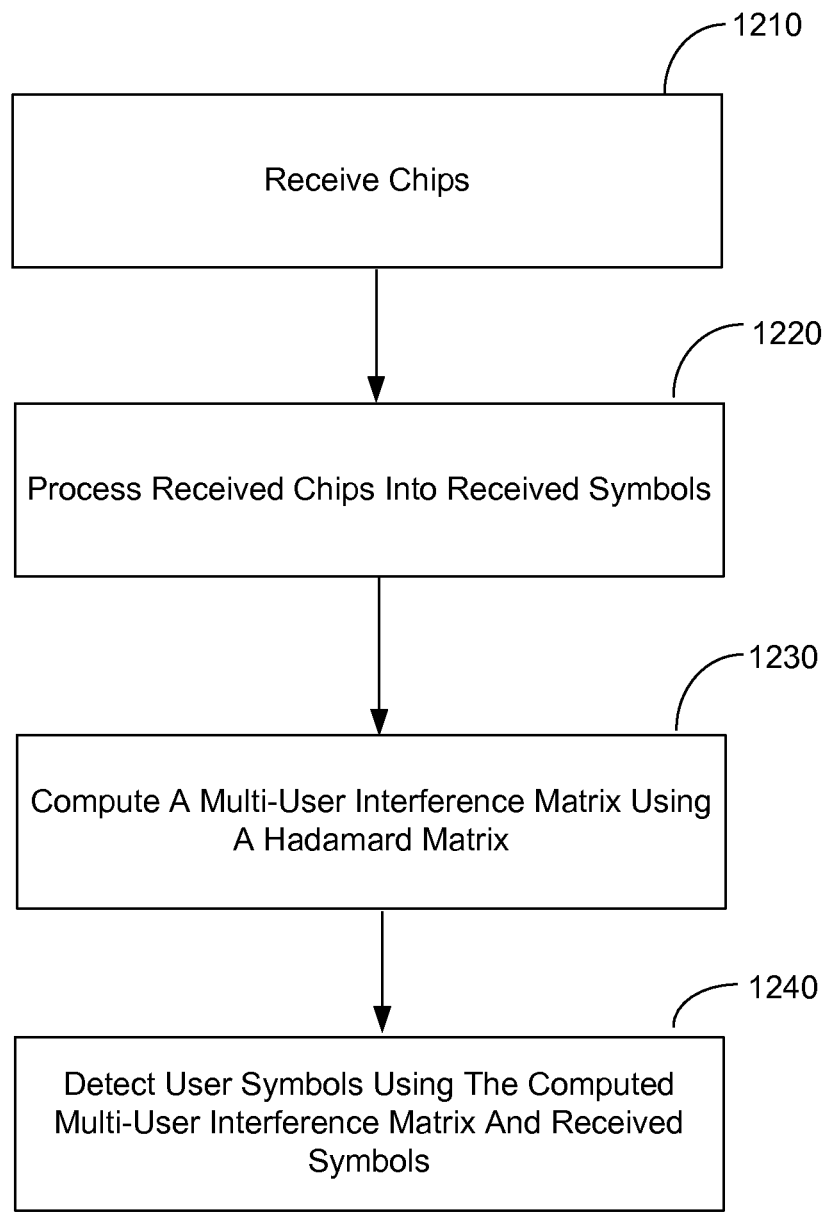
FIG. 12a is a flow diagram illustrating a method of multi-user detection, according to certain aspects of the present disclosure.

FIG. 12a is a flow diagram illustrating a process of multi-user detection using a Hadamard matrix in a wireless communication system, according to certain aspects of the present disclosure. At operation 1210, chips are received at a receiver 200 as part of a mobile station 106. From operation 1210, the process continues to operation 1220, where the chips are processed into one or more received symbols for a plurality of users.

From operation 1220, the process continues to operation 1230 where a multi-user interference matrix is computed using a Hadamard matrix. For example, the multi-user interference matrix may be computed by transforming a Walsh matrix in Eq. (29) into the Hadamard matrix and multiplying the Hadamard matrix with one or a combination of the other matrices in Eq. (29) using FHT operations.

From operation 1230, the process continues to operation 1240 where the computed matrix and received symbols are used to detect the desired user symbols.

Figure 12B:
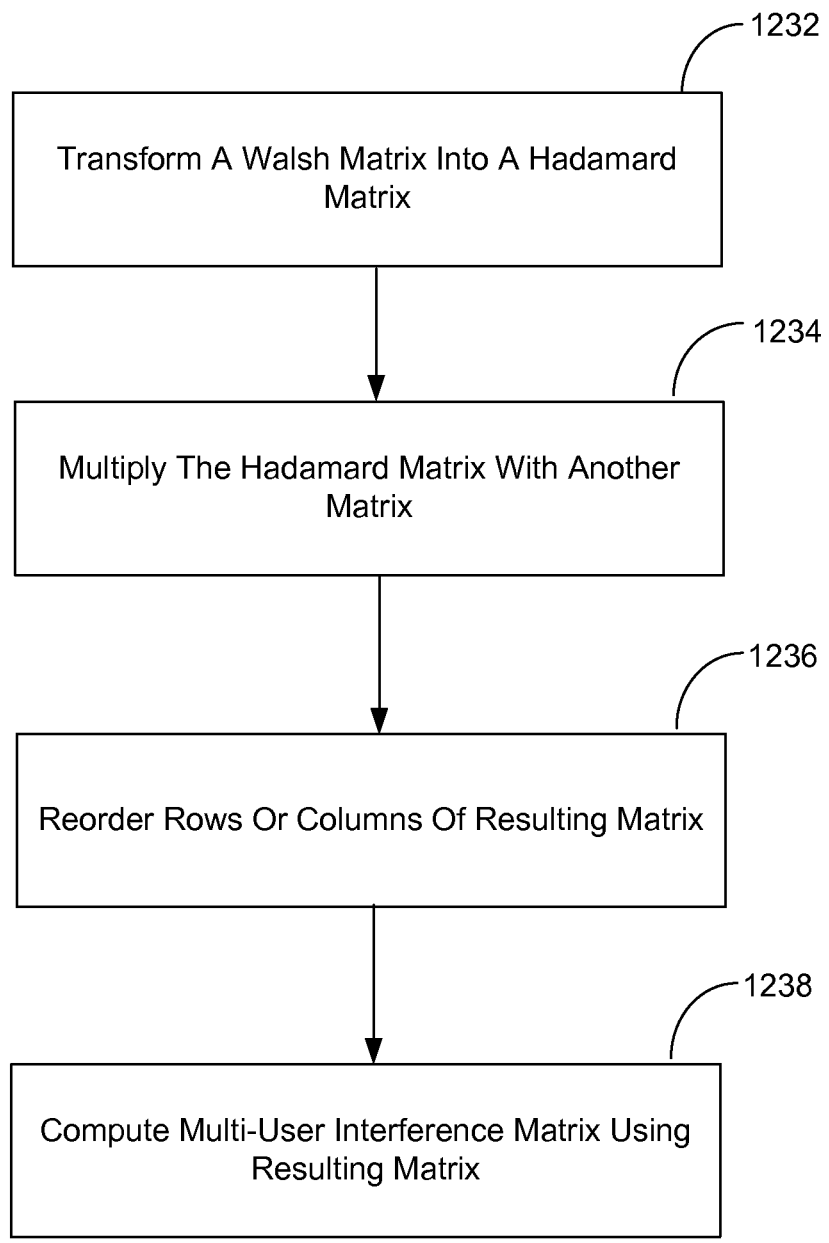
FIG. 12b is a flow diagram illustrating a method of computing a multi-user interference matrix, according to certain aspects of the present disclosure.

FIG. 12b is a flow diagram illustrating a process of computing the multi-user interference matrix using a Hadamard matrix, according to certain aspects of the present disclosure. At operations 1232, a Walsh matrix is transformed into a Hadamard matrix, for example, by reordering rows or columns of the Walsh matrix. The Walsh matrix may be a spreading matrix or a despreading matrix comprising a plurality of Walsh codes. The Hadamrd matrix corresponding to the Walsh matrix may be stored in memory and retrieved from memory when computing the multi-user interference matrix.

From operation 1232, the process continues to operation 1234 where the Hadamard matrix is multiplied by another matrix. For example, the other matrix may be a scrambling matrix, a descrambling matrix, a total filter matrix or a combination thereof. The rows or columns of the other matrix may be reordered to match the reordering of rows or columns of the Walsh matrix in operations 1232. The multiplication in operation 1234 may be performed using FHT operations for efficient computation.

From operation 1234, the process continues to operation 1236 where the rows or columns of the matrix resulting from operation 1234 are reordered. For example, the rows or columns of the resulting matrix may be reordered in a reverse manner as the Walsh matrix. The reordering operations described above may be omitted if the Walsh codes of the Walsh matrix are already ordered in the form of a Hadamard matrix.

From operation 1236, the process continues to operation 1268 where the resulting matrix from operation 1234 is used to compute the multi-user interference matrix.

Figure 13:
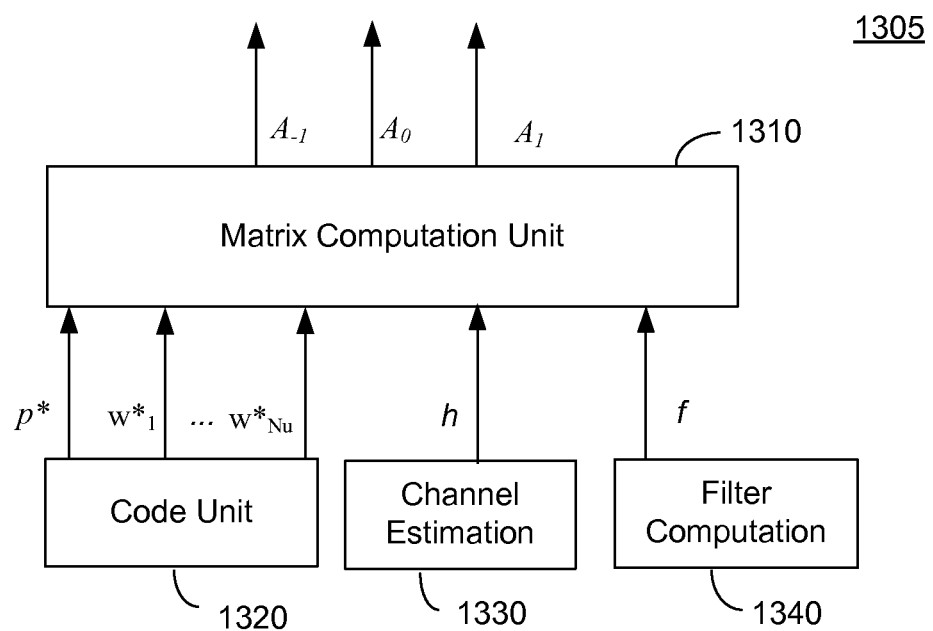
FIG. 13 is a schematic of a system for computing multi-user interference and shoulder matrices, according to certain aspects of the present disclosure.

FIG. 13 is a schematic of a system 1305 for computing the multi-user interference and shoulder matrices $A_{-1}$, $A_0$, $A_1$, according to certain aspects of the present disclosure. In this aspect, the system 1305 comprises a matrix computation unit 1310, a code unit 1320, a channel estimation unit 1330, and a filter computation unit 1340. The code unit 1320 provides descrambling code p*(n) and despreading codes $w^*_1(n)$ to $w^*_{Nu}(n)$ to the matrix computation unit 1310. The code unit 1320 may store descrambling and despreading codes for many cells in the memory 250 (shown in FIG. 2) and output the codes for the cell currently serving the mobile station 106. The code unit 1320 may also provide the scrambling code p(n) and spreading codes $w_1(n)$ to $w_{Nu}(n)$ to the matrix computation unit 1310 (not shown in FIG. 13). Alternatively, the code unit 1320 may provide either the scrambling codes or descrambling codes to the matrix computation unit 1310, in which case the matrix computation unit 1310 can derive the scrambling codes or descrambling codes from the received codes. The same applies to the spreading and despreading codes.

The channel estimation unit 1330 provides a channel estimate h to the matrix computation unit 1310. The channel estimation unit 1330 may estimate the channel using pilot-based channel estimation, data-aided channel estimation or any other channel estimation technique. Data-aided channel estimation is described in further detail below.

The filter computation unit 1340 provides the filter f parameter to the matrix computation unit 1310. In one aspect, the filter computation unit 1340 may compute the filter coefficients for the front-end filter and provide the filter f parameter to the matrix computation unit 1310 based on the computed filter coefficients. For an example of a channel-matched filter (CMF), the filter coefficients, and hence the filter f parameter, may be based on a time-inverse conjugate h*(-n) of the channel estimate h.

In one aspect, the matrix computation unit 1310 may use the received channel estimate h and filter f parameter to compute the total filter matrix C (e.g., based on Eq. (24)). The matrix computation unit 1310 may then compute the multi-user interference and shoulder matrices $A_{-1}, A_0, A_1$ using the total filter matrix C and the scrambling, descrambling, spreading and despreading matrices derived from the received codes (e.g., based on Eqs. (28)-(30)). The matrix computation unit 1310 may use FHT operations to efficiently compute the multi-user interference and shoulder matrices when Walsh codes are used for spreading, as discussed above. The matrix computation 1310 may then provide the computed multi-user interference and shoulder matrices $A_{-1}, A_0, A_1$ to the detection unit 260 or any other detection unit including any of the detection units discussed in the present disclosure.

Multi-User Interference Cancellation

In an aspect of the disclosure, multi-user detection systems and methods are provided with symbol-level multi-user interference cancellation. In this aspect, user symbols for the symbol periods m−1, m, and m+1 are initially detected, and the initially detected user symbols are used to compute multi-user interference for symbol period m. The computed multi-user interference is then removed (subtracted) from the received symbols for symbol period m. The user symbols for symbol period m are then redetected from the received symbols with the computed multi-user interference removed.

In this aspect, the initially detected user symbols for symbol periods m−1, m, and m+1 may be represented in vector form as $\hat{b}(m-1)$, $\hat{b}(m)$, and $\hat{b}(m+1)$, respectively. The initial user symbol detection may be performed using any detection technique including any of the detection techniques described in the present disclosure. For example, user symbols for a certain symbol period may be initially detected from the received symbols for the same symbol period using Eq. (16), in which inter-symbol interference is neglected to simplify the detection computation. In this example, once the interference matrix, gain matrix and received data symbols in Eq. (16) are known, various techniques may be applied to Eq. (16) to solve for the desired user symbols including MMSE, MLD, SD, MAPD, and slicing.

After the user symbols $\hat{b}(m-1)$ and $\hat{b}(m+1)$ for periods m−1 and m+1 are initially detected, multi-user inter-symbol interference for symbol period m may be computed as follows:

$$\hat{I}_{inter-symbol}(m) = A_{-1}(m)G\underline{\hat{b}}(m-1) + A_{+1}(m)G\underline{\hat{b}}(m+1) \quad (41)$$

where $A_{-1}(m)$ and $A_{+1}(m)$ are shoulder matrices (which may be computed using Eqs. (15) and (14), respectively) and G is the gain matrix (which may be given by Eq. (6)). For each user, Eq. (41) accounts for inter-symbol interference from other users as well as inter-symbol interference from the previous and next user symbols for the same user.

After the user symbol $\hat{b}(m)$ for symbol period m is initially detected, the multi-user interference from user symbols at symbol period m may be computed as follows:

$$\hat{I}_{multi-user}(m) = A_0(m)G\underline{\hat{b}}(m) - \text{diag}\{A_0(m)\}G\underline{\hat{b}}(m) \quad (42)$$

where $A_0(m)$ is the multi-user interference matrix (which may be computed using Eq. (13)) and $\text{diag}\{A_0(m)\}$ is a diagonal matrix, in which only the diagonal coefficients in the multi-user interference matrix are retained (i.e., non-diagonal coefficients are zero). The multi-user interference matrix $A_0(m)$ not only relates the received symbols to multi-user interference, but also relates the received data symbols to their respective desired user symbols. Therefore, the diagonal matrix $\text{diag}\{A_0(m)\}$ is used in Eq. (42) to subtract out the portion of $A_0(m)G\underline{b}(m)$ that is contributed by the respective desired user symbols so that only the multi-user interference remains in Eq. (42).

The interferences given in Eqs. (41) and (42) may be combined to express the multi-user interference $\hat{I}(m)$ for symbol period m as follows:

$$\hat{I}(m) = \{A_{-1}(m)G\underline{\hat{b}}(m-1) + A_{+1}(m)G\underline{\hat{b}}(m+1)\} + A_0(m)G\underline{\hat{b}}(m) - \text{diag}\{A_0(m)\}G\underline{\hat{b}}(m) \quad (43)$$

The computed multi-user interference $\hat{I}(m)$ for symbol period m in Eq. (43) accounts for multi-user interference from user symbols at symbol period m as well as multi-user inter-symbol interference from user symbols at the previous symbol period m−1 and the next symbol period m+1. The inter-symbol interference in Eq. (43) may be omitted to simplify the multi-user interference computation.

After the multi-user interference $\hat{I}(m)$ is computed using the initially detected user symbols $\hat{b}(m-1)$, $\hat{b}(m)$, and $\hat{b}(m+1)$, the computed multi-user interference may be removed (subtracted) from the received symbols as follows:

$$\underline{\tilde{z}}(m) = \underline{z}(m) - \hat{I}(m) \quad (44)$$

where z(m) is a vector of the received symbols for symbol period m, and $\tilde{z}(m)$ is a vector of the received symbols for symbol period m with the computed interference removed. Plugging the expression for the multi-user interference from Eq. (43) into Eq. (44) results in:

$$\tilde{z}(m) = z(m) - \{A_{-1}(m)G\underline{\hat{b}}(m-1) + A_{+1}(m)G\underline{\hat{b}}(m+1)\} - A_0[m]G\underline{\hat{b}}(m) + \text{diag}\{A_0(m)\}G\underline{\hat{b}}(m) \quad (45)$$

After the computed interference is removed from the received symbols to obtain $\tilde{z}(m)$, the desired user symbols $\hat{b}(m)$ may be redetected from $\tilde{z}(m)$.

Thus, this aspect uses information about the user symbols for symbol periods m−1, m, m+1 obtained from the initial detection to compute multi-user interference at the symbol level. The computed multi-user interference is then removed from the received symbols for symbol period m, thereby canceling multi-user interference from the received symbols. The multi-user interference cancellation provides improved detection of the user symbols. Further, the multi-user interference is computed and removed from the received symbols at the symbol level without having to perform complex chip-level multi-user interference cancellation.

In one aspect, the desired user symbols $\hat{b}(m)$ are redetected from the received symbols $\tilde{z}(m)$ with the computed interference removed using slicing as follows:

$$\hat{b}(m) = \text{slice}(\underline{\tilde{z}}(m)) \quad (46)$$

For an example of Binary Phase Shift Keying (BPSK) modulation, the slicing may be given as follows:

$$\text{slice}(\underline{\tilde{z}}(m)) = \text{sign}\{Re(\underline{\tilde{z}}(m))\} \quad (47)$$

In the example of BPSK modulation, the bit value of a user symbol may be decided based a sign of the received symbol $\tilde{z}(m)$ with interference cancellation. For an example of Quadrature Phase Shift Keying (QPSK) modulation, in which each symbol represents two bits, the slicing may be given as follows:

$$\text{slice}(\tilde{z}(m)) = \frac{1}{\sqrt{2}}\text{sign}\{\text{Re}(\tilde{z}(m))\} + \frac{j}{\sqrt{2}}\text{sign}\{\text{Im}(\tilde{z}(m))\} \quad (48)$$

In the example of QPSK modulation, the two bit values of a user symbol may be decided based on the signs of the real and imaginary parts of the received symbol $\tilde{z}(m)$ with interference cancellation. Other detection techniques may be used to redetect the user symbols $\hat{b}(m)$ besides slicing. Also, other modulation schemes may be used for the user symbols, for example 16-Qaudrature Amplitude Modulation (QAM) where each user symbol carries four bits of information. Further, the above slicing may be used in the initial detection of the user symbols.

Figure 14:
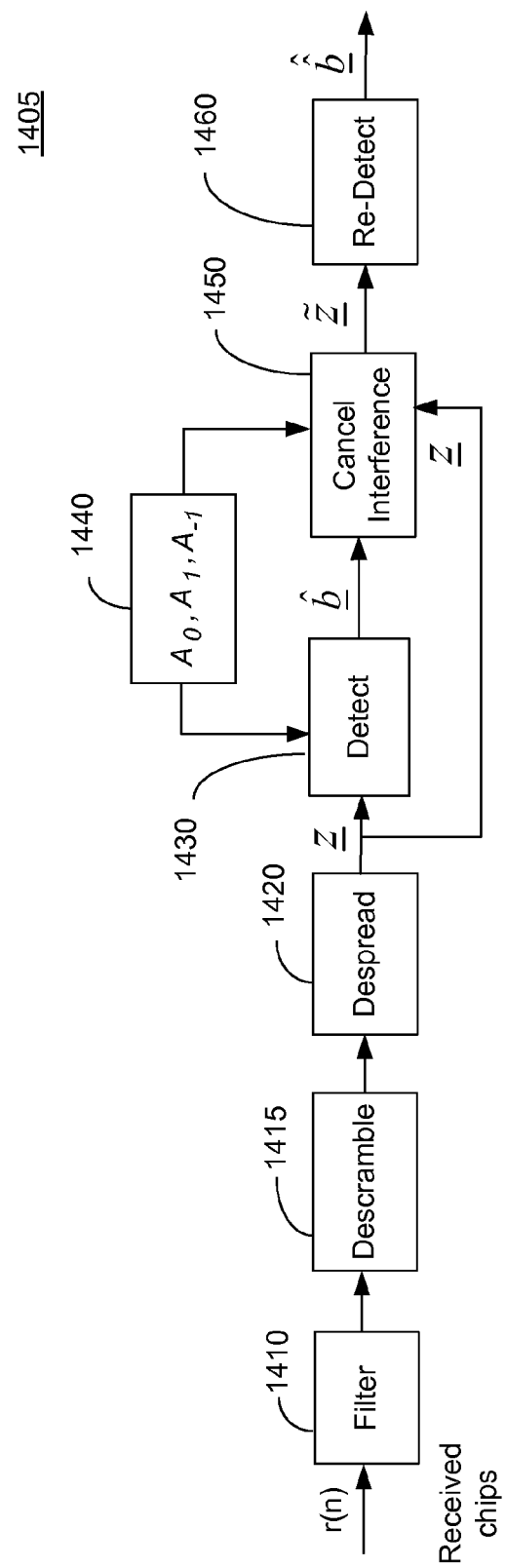
FIG. 14 is a schematic of a multi-user detection system with interference cancellation, according to certain aspects of the present disclosure.

FIG. 14 is a schematic of a multi-user detection system 1405 with interference cancellation, according to certain aspects of the present disclosure. The detection system 1405 may be at a receiver in a wireless communication system. The detection system 1405 comprises a filter unit 1410 for filtering received chips r(n), a descramble unit 1415 for descrambling the filtered chips, and a despread unit 1420 for despreading the descrambled chips into received data symbols z(m). The filter unit 1410 may comprise an equalizer, and/or a channel-matched filter. After filtering, the descramble unit 1415 descrambles the filtered chips using a descrambling code. The despread unit 1420 then despreads the descrambled chips using a set of despreading codes. In one aspect, each despreading code may correspond to a different user and may be used to obtain a received symbol for the corresponding user. In this aspect, the despread unit 1420 outputs a set of received symbols z(m) during each symbol period using the set of despreading codes.

The detection system 1405 further comprises a detection unit 1430, a matrix computation unit 1440, an interference cancellation unit 1450, and a redetection unit 1460. The detection unit 1430 performs an initial detection of the desired user symbols from the received symbols z(m) during each symbol period. The detection unit 1430 may initially detect the user symbols $\hat{b}(m)$ using any detection technique including any of the detection techniques discussed in the present disclosure.

The interference cancellation unit 1450 receives the initially detected user symbols $\hat{b}(m)$ for each symbol period from the detection unit 1430. In one aspect, the interference cancellation unit 1450 computes multi-user interference $\hat{I}(m)$ for the symbol period m using Eq. (43) and the initially detected user symbols $\hat{b}(m-1)$, $\hat{b}(m)$ and $\hat{b}(m+1)$ for the symbol periods m−1, m, m+1, respectively, from the detection unit 1430. In this aspect, the cancellation unit 1450 may obtain the user symbols $\hat{b}(m-1)$, $\hat{b}(m)$ and $\hat{b}(m+1)$ by storing initially detected user symbols from the detection unit 1430 over a period of at least three symbol periods into memory (e.g., a buffer). In this aspect, the cancellation unit 1450 waits until the initially detected user symbols $\hat{b}(m+1)$ for symbol period m+1 are received before going back and computing the multi-user interference $\hat{I}(m)$ for symbol period m.

After computing the multi-user interference, the interference cancellation unit 1450 removes the computed interference $\hat{I}(m)$ from the received symbols z(m) to obtain the received symbols $\tilde{z}(m)$ with the computed interference removed.

The redetection unit 1460 receives the received symbols $\tilde{z}(m)$ with the computed interference removed, redetects the desired user symbols $\hat{b}(m)$ from $\tilde{z}(m)$, and outputs the user symbols $\hat{b}(m)$. For example, the redetection unit 1460 may redetect the desired user symbols $\hat{b}(m)$ by slicing the received symbols $\tilde{z}(m)$ with the computed interference removed.

The matrix computation unit 1440 computes the interference and shoulder matrices $A_{-1}$, $A_0$, $A_{+1}$ for each symbol period, and supplies the matrices to the detection unit 1430 and the cancellation unit 1450. The matrix computation unit 1440 may compute the matrices $A_{-1}$, $A_0$, $A_{+1}$ using FHT operations and/or any technique.

Figure 15:
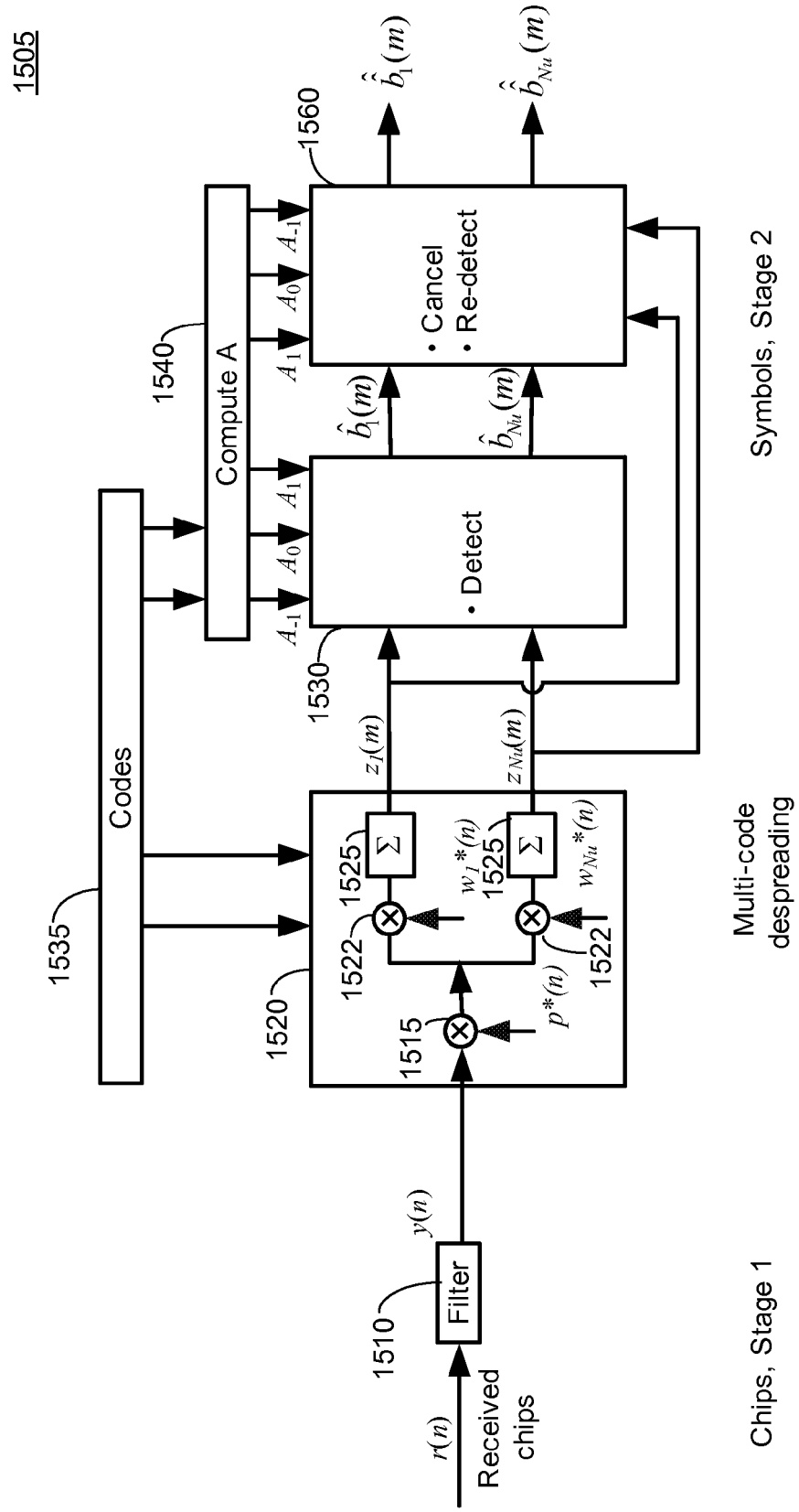
FIG. 15 is a schematic of a multi-user detection system with interference cancellation, according to certain aspects of the present disclosure.

FIG. 15 is a schematic of a multi-user detection system 1505 with interference cancellation, according to certain aspects of the present disclosure. The detection system 1505 may be at a receiver in a wireless communication system. The detection system 1505 comprises a filter unit 1510 for filtering received chips r(n), and a descramble and despread unit 1520. The filter unit 1510 may comprise an equalizer, and/or a channel-matched filter (CFM).

The descramble and despread unit 1520 comprises a descramble mixer 1515, a plurality of despread mixers 1522 and a plurality of corresponding summation blocks 1525. The descramble mixer 1515 mixes the filtered received chips y(n) with a descrambling code p*(n) to descramble the filtered received chips y(n). The descrambling code p*(n) may be a conjugate of the scrambling code used at the transmitter side (e.g., base station). The despread mixers 1522 then mix the descrambled signal with a set of despreading codes $w_1^*(n)$ to $w_{Nu}^*(n)$ corresponding to multiple users 1 to Nu, respectively. The despreading codes $w_1^*(n)$ to $w_{Nu}^*(n)$ may be conjugates of the spreading codes used at the transmitter side (e.g., base station 104). The despread signal from each despread mixer 1522 is inputted to the respective summation block 1525, which accumulates the despread signal over a period of one symbol to produce a received symbol for the corresponding user. The descramble and despread unit 1520 outputs a set of received symbols $z_1(m)$ to $z_{Nu}(m)$ for the multiple users during each symbol period. Thus, the descramble and despread unit 1520 converts the filtered received chips from the chip-level to the symbol-level. The set of received symbols $z_1(m)$ to $z_{Nu}(m)$ may also be expressed in vector form as z(m).

The detection system 1505 also comprises a detection unit 1530, a cancellation and redetection unit 1560, a code unit 1535 and a matrix computation unit 1540. The detection unit 1530 performs an initial detection of the desired user symbols from the received symbols $z_1(m)$ to $z_{Nu}(m)$. The detection unit 1530 may initially detect the user symbols $\hat{b}_1(m)$ to $\hat{b}_{Nu}(m)$ using any detection technique including any of the techniques discussed in the present disclosure. For example, the detection unit 1530 may initially detect the user symbols $\hat{b}_1(m)$ to $\hat{b}_{Nu}(m)$ by solving for the desired user symbols in Eq. (16) using any one of a number of different techniques including MMSE, MLD, SD, MAPD, and slicing. The user symbols $\hat{b}_1(m)$ to $\hat{b}_{Nu}(m)$ may also be expressed in vector form as $\hat{b}(m)$.

The cancellation and redetection unit 1560 receives the initially detected user symbols $\hat{b}_1(m)$ to $\hat{b}_{Nu}(m)$ for each symbol period from the detection unit 1530, and computes the multi-user interference for the symbol period m (e.g., based on Eq. (43)) and the initially detected user symbols for the symbol periods m−1, m, m+1, respectively, from the detection unit 1530. In this aspect, the cancellation and redetection unit 1560 may comprise memory 250 (shown in FIG. 2) to store initially detected user symbols from the detection unit 1530 over a period of at least three symbol periods. The cancellation and redetection unit 1560 may then use the stored initially detected user symbols for the symbol periods m−1, m, m+1 to compute the multi-user interference for symbol period m. The cancellation and redetection unit 1560 removes the computed interference for symbol period m from the received symbols $z_1(m)$ to $z_{Nu}(m)$ for symbol period m. The cancellation and redetection unit 1560 then redetects the user symbols $\hat{b}_1(m)$ to $\hat{b}_{Nu}(m)$ from the received symbols with the computed interference removed, and outputs the redetected user symbols $\hat{b}_1(m)$ to $\hat{b}_{Nu}(m)$. The redetected user symbols $\hat{b}_1(m)$ to $\hat{b}_{Nu}(m)$ may be expressed in vector form as $\hat{\underline{b}}(m)$.

The code unit 1535 supplies the descrambling and despreading codes to the descramble and despread unit 1520 and the matrix computation unit 1565. The despreading codes may be stored in memory 250 (not shown in FIG. 15). The matrix computation unit 1540 computes the interference and shoulder matrices $A_{-1}, A_0, A_{+1}$ for each symbol period, and supplies the matrices to the detection unit 1530 and the cancellation and redetection unit 1560.

Figure 16:
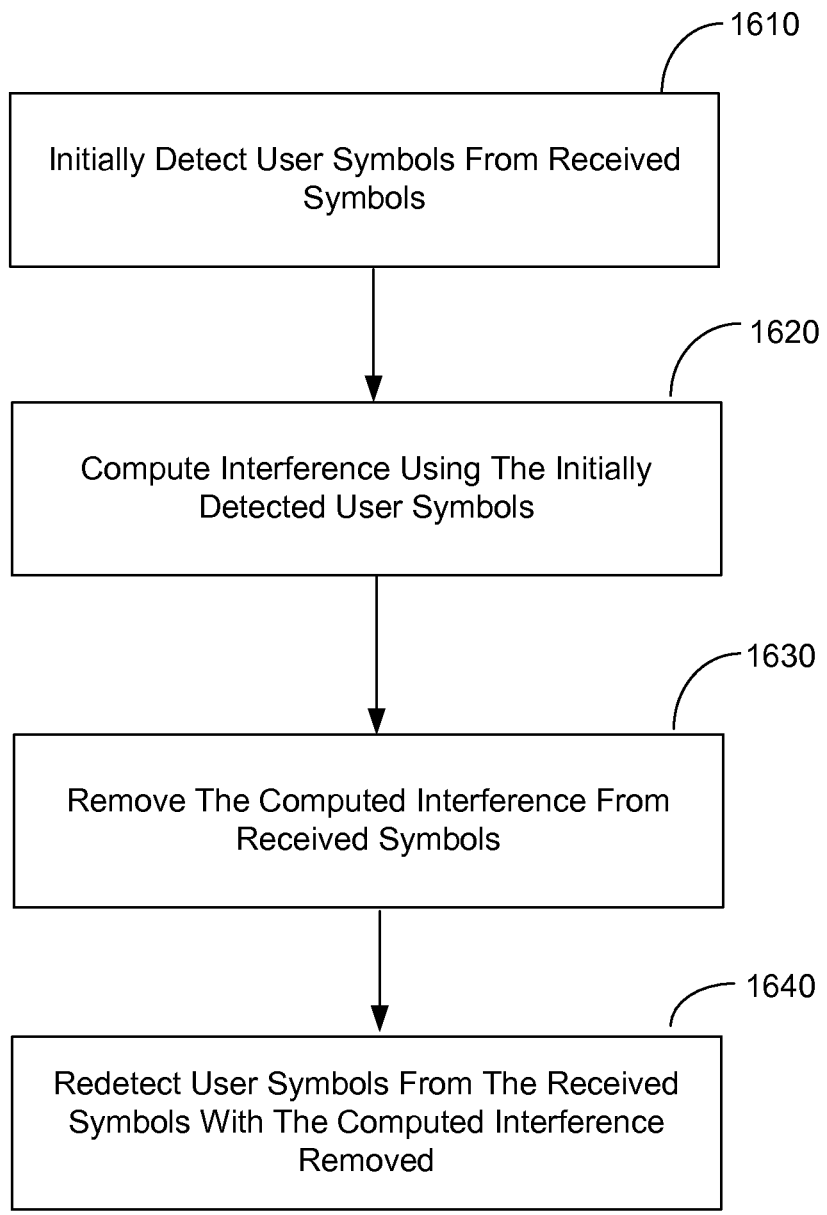
FIG. 16 is a flow diagram illustrating a method of multi-user detection with interference cancellation, according to certain aspects of the present disclosure.

FIG. 16 is a flow diagram illustrating a process of multi-user detection with interference cancellation, according to certain aspects of the present disclosure. This process may be performed, for example, at a mobile station 106 to detect user symbols from the transmitter side (e.g., base station 104), where the detected user symbols are estimated of the user symbols at the transmitter side.

At operation 1610, user symbols are initially detected from received symbols. For example, user symbols for a certain symbol period may be initially detected from the received symbols for the same symbol period by solving for the user symbols in Eq. (16) using any one of a variety of techniques including MMSE, MLD, SD, MAPD, and slicing.

From operation 1610, the process continues to operation 1620 where multi-user interference is computed using the initially detected user symbols. For example, the multi-user interference for symbol period m may be computed using Eq. (43) and the initially detected user symbols for symbol periods m−1, m, and m+1.

From operation 1620, the process continues to operation 1630 where the computed multi-user interference is removed from the received symbols.

From operation 1630, the process continues to operation 1640 where the user symbols are redetected from the received symbols with the computed interference removed. For example, the user symbols may be redetected by slicing the received symbols with the computed interference removed.

Figure 17:
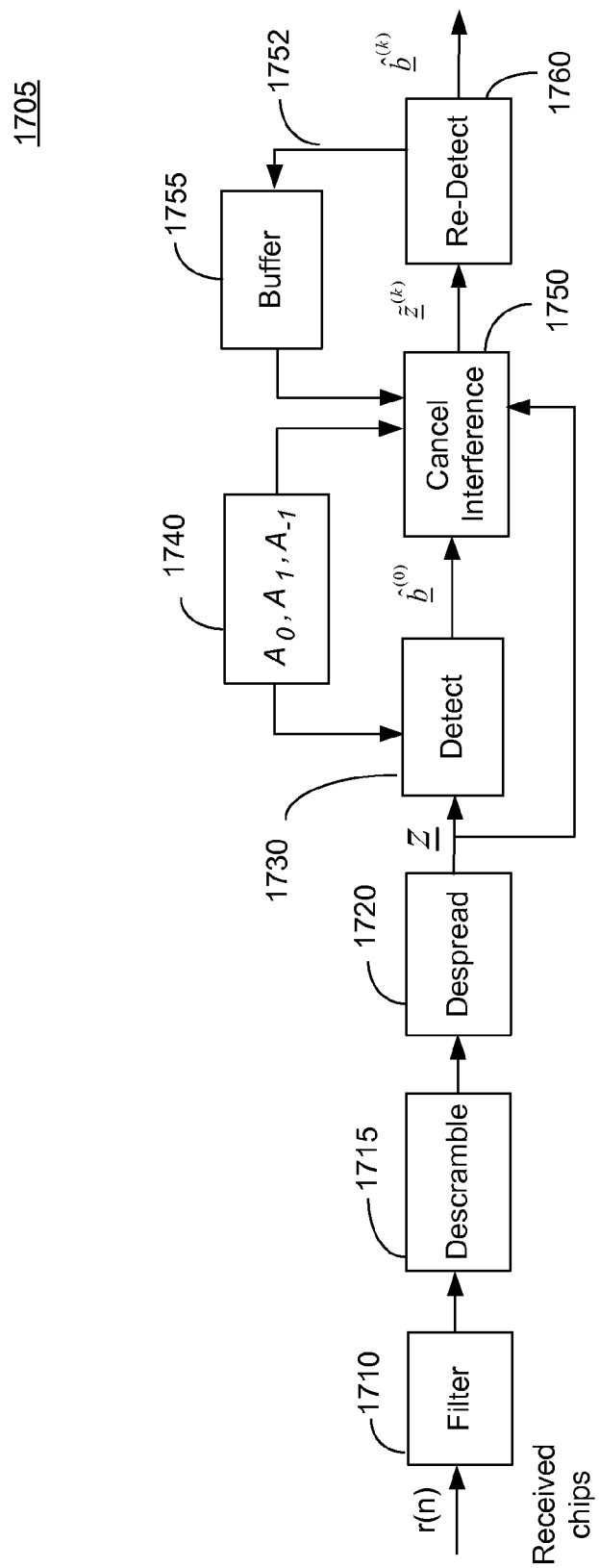
FIG. 17 is a schematic of a multi-user detection system with iterative interference cancellation, according to certain aspects of the present disclosure.

FIG. 17 is a schematic of a multi-user detection system 1705 with iterative interference cancellation, according to certain aspects of the present disclosure. The detection system 1705 may be at a mobile station in a wireless communication system. The detection system 1705 according to this aspect is similar to the detection system 1405 in FIG. 14, in which an iterative process is used to refine the redetected user symbols.

In one aspect, multi-user cancellation and redetection are repeated in an iterative process to refine the redetected user symbols. In this aspect, the multi-user interference for each iteration may be given as follows:

$$\hat{I}^{(k)}(m) = \{A_{-1}(m)G\hat{\underline{b}}^{(k-1)}(m-1) + A_{+1}(m)G\hat{\underline{b}}^{(k-1)}(m+1)\} - A_0(\overline{m})G\hat{\underline{b}}^{(k-1)}(m) + \text{diag}\{A_0(\overline{m})\}G\hat{\underline{b}}^{(k-1)}(m) \quad (49)$$

where k is an iteration index, $\hat{I}^{(k)}(m)$ is the multi-user interference for iteration k, and $\hat{b}^{(k-1)}(m-1)$, $\hat{b}^{(k-1)}(m)$, and $\hat{b}^{(k-1)}(m+1)$ are the redetected user symbols from the previous iteration k−1 for symbol periods m−1, m, and m+1, respectively.

For each iteration, the received user symbols with the multi-user interference removed may be given as:

$$\underline{\tilde{z}}^{(k)}(m) = \underline{z}(m) - \hat{I}^{(k)}(m) \quad (50)$$

where k is the iteration index, $z(m)$ is a vector of the received symbols and $\tilde{z}^{(k)}(m)$ is a vector of the received symbols with the multi-user interference for iteration k removed (subtracted out). After $\tilde{z}^{(k)}(m)$ is computed for iteration k, the user symbols for iteration k may be redetected using any detection technique. For example, the user symbols $\hat{b}^{(k)}(m)$ for iteration k may be redetected by slicing $\tilde{z}^{(k)}(m)$ as follows:

$$\hat{\underline{b}}^{(k)}(m) = \text{slice}(\underline{\tilde{z}}^{(k)}(m)) \quad (51)$$

After the user symbols $\hat{b}^{(k)}(m)$ are redetected for iteration k, the user symbols $\hat{b}^{(k)}(m)$ for iteration k may be used to compute the multi-user iteration for the next iteration k+1 or may be outputted by the detection system 1705 with no more iterations.

The user symbols for the previous and next symbol periods $\hat{b}^{(k)}(m-1)$ and $\hat{b}^{(k)}(m+1)$ may also be redetected for iteration k in a manner similar to $\hat{b}^{(k)}(m)$. For example, the interference $\hat{I}^{(k)}(m-1)$ for the previous symbol period $\hat{b}^{(k)}(m-1)$ may be computed using the redetected user symbols $\hat{b}^{(k-1)}(m-2)$, $\hat{b}^{(k-1)}(m-1)$, and $\hat{b}^{(k-1)}(m)$ from the previous iteration k−1 for symbol periods m−2, m−1, and m, respectively. The computed interference $\hat{I}^{(k)}(m-1)$ may then be removed from the received symbol $z(m-1)$ for symbol period m−1 for redetection. The user symbols for the next symbol period $\hat{b}^{(k)}(m+1)$ may be redetected for iteration k in a similar manner.

In one aspect, received symbols may be processed block-by-block, in which received symbols are collected over a block of L symbol periods (e.g., 100 symbol periods), stored in memory, and processed together. During each iteration in a block, the user symbols for all of the symbol periods in the block may be redetected for the current iteration before advancing to the next iteration. This way, the interference computations for each symbol period in the block has access to redetected user symbols for the previous and next symbol periods in the block from the previous iteration.

The received symbols may also be processed symbol-by-symbol. In this aspect, the interference computations for the current symbol period may use previously stored redetected user symbols for the previous symbol period, and use initially detected user symbols for the next symbol period for all iterations.

In another aspect, the interference computations for the current symbols may use initially detected user symbols for the previous and next symbols periods for all iterations. Thus, in this aspect, only the user symbols for the current symbol period are updated in each iteration.

In the example illustrated in FIG. 17, the detection unit 1730 initially detects user symbols $\hat{b}(m)$, which may be similar to the initial detection in FIG. 14. The initially detected user symbols may be expressed in terms of the iteration index as $\hat{b}^{(0)}(m)$ where k=0, as shown in FIG. 17. The cancellation interference unit 1750 then computes the multi-user interference $\hat{I}^{(1)}(m)$ for the first iteration k=1 using the initially detected user symbols $\hat{b}^{(0)}(m)$, and removes the computed multi-user interference $\hat{I}^{(1)}(m)$ from the received symbols $z(m)$. The redetection unit 1760 then redetects the user symbols $\hat{b}^{(1)}(m)$ for the first iteration from the received symbols $\tilde{z}^{(1)}(m)$ with the computed multi-user interference $\hat{I}^{(1)}(m)$ removed. The redetected user symbols $\hat{b}^{(1)}(m)$ from the redetection unit 1760 may then be fed back to the interference cancellation unit 1750 using feedback path 1752 to perform another iteration (e.g., based on Eqs. (49)-(51)).

The detection system 1705 may perform any number of iterations (e.g., one or more) to refine the redetected user symbols. For example, the detection system 1705 may perform iterations until the redetected user symbols for consecutive iterations converge (e.g., differences between the user symbols for consecutive iterations are small) and/or other criteria are met. In another example, a predetermined number of iterations may be programmed into the detection system 1705. In this example, the detection system 1705 may increment a counter each time an iteration is performed and stop iterating when the counter reaches the programmed number of iterations.

In one aspect, the feedback 1752 path between the redetection unit 1760 and interference cancellation unit 1750 may include a buffer 1755 to temporarily store user symbols from the redetection unit 1760 for a next iteration. In this aspect, the buffer 1755 may be used to store redetected user symbols over a block of L symbols periods (e.g., 100 symbols periods) to implement block-by-block processing as described above.

Although the detection unit 1730 and redetection unit 1760 are shown separately in FIG. 17, their operations may be performed by a common detection unit. Further, the detection unit 1730 and the redetection unit 1760 may both use the same detection technique, e.g., slicing, and example of which is discussed below with reference to FIG. 19.

Figure 18:
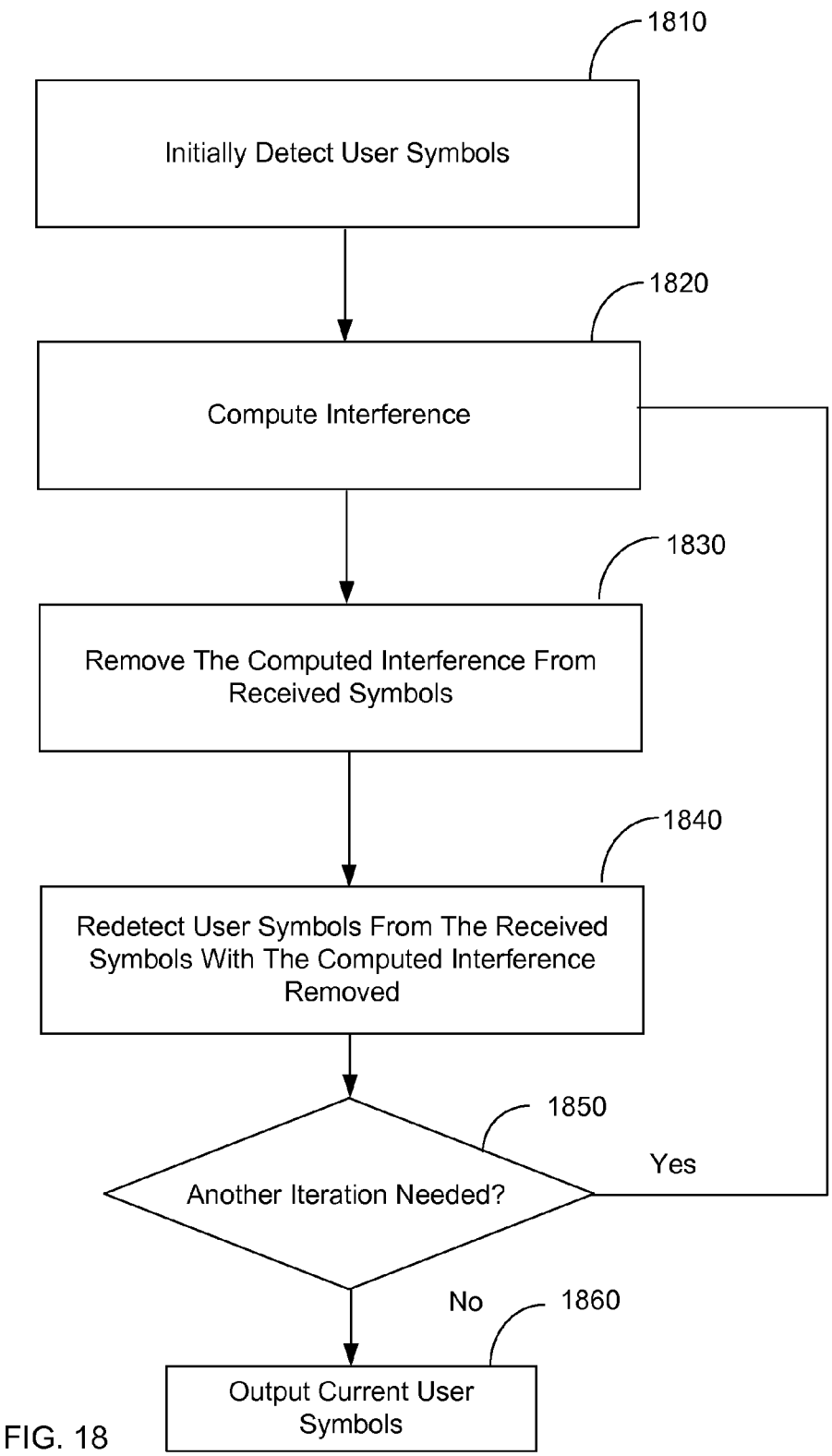
FIG. 18 is a flow diagram illustrating a method of multi-user detection with iterative interference cancellation, according to certain aspects of the present disclosure.

FIG. 18 is a flow diagram illustrating a process of multi-user detection with iterative interference cancellation, according to certain aspects of the present disclosure. At operation 1810, user symbols are initially detected from received symbols.

From operation 1810, the process continues to operation 1820 where multi-user interference is computed. For a first iteration, the multi-user interference may be computed using the initially detected user symbols in operation 1810. For subsequent iterations, the multi-user interference may be computed using redetected user symbols from operation 1840 in a previous iteration.

From operation 1820, the process continues to operation 1830 where the computed multi-user interference from operation 1820 is removed from the received symbols.

From operation 1830, the process continues to operation 1840 where the user symbols are redetected from the received symbols with the computed interference removed. For example, the user symbols may be redetected by slicing the received symbols with the computed interference removed.

From operation 1840, the process continues to operation 1850, which determines whether another iteration is needed. If another iteration is needed, then the process returns to operation 1820 to perform the next iteration. In operation 1820, the multi-user interference is re-computed using the redetected user symbols from operation 1840 in the previous iteration. The re-computed multi-user interference is then removed from the received symbols in operation 1830 and the user symbols are redetected from the received symbols with the recomputed interference removed in operation 1840.

If another iteration is not needed, then the current redetected user symbols may be outputted in operation 1860. Operation 1850 may determine whether another iteration is needed using any of the techniques discussed above.

Figure 19:
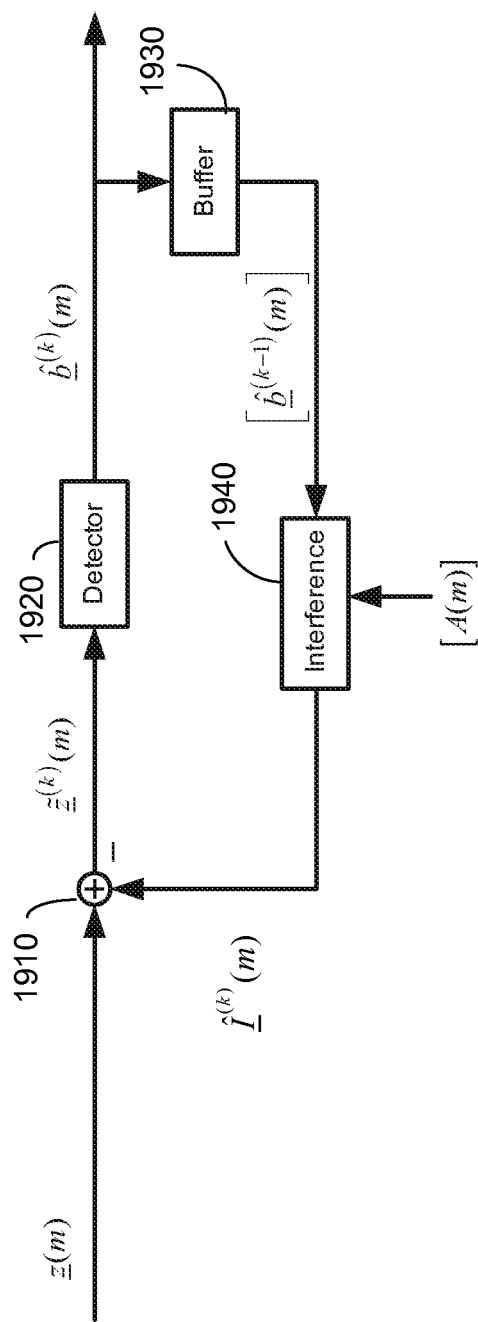
FIG. 19 is a schematic of a multi-user detection system with iterative interference cancellation, according to certain aspects of the present disclosure.

FIG. 19 is a schematic of a multi-user detection system 1905 with iterative interference cancellation, according to certain aspects of the present disclosure. The detection system 1905 may be at a mobile station in a wireless communication system.

The detection system 1905 comprises a subtraction unit 1910, a symbol detector 1920, a buffer 1930, and an interference computation unit 1940. The detection system 1905 receives the received symbols z(m) and iteratively performs multi-user interference cancellation and user symbol detection for a number of iterations.

Operation of the detection system 1905 will now be discussed for the example of multi-user detection of user symbols $\hat{b}^{(k)}$ (m) for symbol period m. The multi-user interference is initialized to zero as follows $\hat{I}^{(0)}$ (m)=0, where the iteration index k=0. As a result, the subtraction unit 1910 does not initially remove multi-user interference from the received symbols z(m), and the received symbols z(m) are initially inputted to the symbol detector 1920. The symbol detector 1920 initially detects user symbols $\hat{b}^{(0)}$ (m) from the received symbols z(m). For example, the symbol detector 1920 may initially detect the user symbols $\hat{b}^{(0)}$ (m) by slicing the received symbols z(m) or using other detection techniques including any of the detection techniques discussed in the disclosure.

The initially detected user symbols $\hat{b}^{(0)}$ (m) for symbol period m are temporarily stored in the buffer 1930. In addition, the symbol detector 1920 initially detects user symbols for symbol periods m−1 and m+1, which are also temporarily stored in the buffer 1930. The initially detected user symbols for symbols periods m−1, m and m+1 are then outputted from the buffer 1930 to the interference computation unit 1940. The interference computation unit 1940 computes the multi-user interference $\hat{I}^{(1)}$ for the first iteration k=1 using the initially detected user symbols $\hat{b}^{(0)}$ (m−1), $\hat{b}^{(0)}$ (m) and $\hat{b}^{(0)}$ (m+1) (e.g., based on Eq. (49)). To compute the multi-user interference $\hat{I}^{(1)}$ based on Eq. (49), the interference computation unit 1940 may receive the multi-user interference matrix $A_0$(m) and the shoulder matrices $A_{-1}$(m) and $A_1$(m) from a matrix computation unit, for example, the matrix computation unit 1310 in FIG. 13. The matrices $A_{-1}$(m), $A_0$(m) and $A_1$(m) are represented by [A(m)] in FIG. 19.

The subtraction unit 1910 removes (i.e., subtracts out) the multi-user interference $\hat{I}^{(1)}$ for the first iteration from the received symbols z(m). The received symbols $\tilde{z}^{(1)}$ (m) with the computed multi-user interference $\hat{I}^{(1)}$ (m) removed are inputted to the symbol detector 1920. The symbol detector 1920 redetects the user symbols $\hat{b}^{(1)}$ (m) for the first iteration from the received symbols $\tilde{z}^{(1)}$ (m) with the computed multi-user interference $\hat{I}^{(1)}$ (m) removed. The redetected user symbols $\hat{b}^{(1)}$ (m) for the first iteration may then be feed back to the buffer 1930 for a second iteration k=2.

The interference computation unit 1940 recomputes the multi-user interference $\hat{I}^{(2)}$ for the second iteration using the redetected user symbols from the first iteration. The subtraction unit 1910 removes the multi-user interference $\hat{I}^{(2)}$ for the second iteration from the received symbols z(m). The received symbols $\tilde{z}^{(2)}$ (m) with the computed multi-user interference $\hat{I}^{(2)}$ (m) removed are then inputted to the symbol detector 1920. The symbol detector 1920 redetects the user symbols $\hat{b}^{(2)}$ (m) for the second iteration from the received symbols $\tilde{z}^{(2)}$ (m) with the computed multi-user interference $\hat{I}^{(2)}$ (m) removed. The redetected user symbols $\hat{b}^{(2)}$ (m) from the second iteration may then be feed back to the interference computation unit 1940 through the buffer 1930 to perform a third iteration. The detection system 1905 may perform any number of iterations, for example, until the user symbols for consecutive iterations converge.

In one aspect, the interference computation unit 1940 computes the multi-user interference for iteration k using the detected user symbols $\hat{b}^{(k-1)}$ (m−1), $\hat{b}^{(k-1)}$ (m), and $\hat{b}^{(k-1)}$ (m+1) from the previous iteration k−1. The detected user symbols $\hat{b}^{(k-1)}$, $\hat{b}^{(k-1)}$ (m), and $\hat{b}^{(k-1)}$ (m+1) from the previous iteration k−1 are represented by $[\hat{b}^{(k-1)}$ (m)] in FIG. 19.

Data-Aided Channel Estimation

In one aspect, user symbols detected from received symbols are used to enhance channel estimation. This may be referred to as data-aided channel estimation. Before discussing data-aided channel estimation, it may be instructive to first discuss an example of pilot-based channel estimation.

In pilot-based channel estimation, a pilot signal is transmitted from the transmitter side (e.g., base station 104) to the receiver (e.g., mobile station 106). The pilot signal is a signal that is known a priori by the receiver, and used by the receiver to estimate the channel h between the transmission side and the receiver. For an example of CDMA, the pilot signal may comprise a known sequence of symbols.

For an example of a single-user communication system, the transmitted chips t(n) at the transmitter side may be expressed as:

$$t(n) = b_1(n)g_1w_1(n)p(n) + b_2(n)g_2w_2(n)p(n) \quad (52)$$

where $b_1(n)$ is the symbol of a pilot signal and $b_2(n)$ is a user symbol for a user. In Eq. (52), the pilot symbol $b_1(m)$ is expressed in terms of the chip index n as $b_1(n)$, in which $b_1(n)$ over a span of N chips corresponds to one symbol (where N is the spreading factor). Similarly, the user symbol $b_2(m)$ is expressed in terms of the chip index n as $b_2(n)$. Eq. (52) can be applied to multi-user communication systems by adding additional user symbols in Eq. (52) for multiple users including their corresponding gains and spreading codes.

The received chips r(n) at the receiver can be expressed as the convolution of the channel h and transmitted chips t(n) in terms of discrete convolution and noise v(n) as:

$$r(n) = \sum_{d=0}^{D} h(d)t(n-d) + v(n) \quad (53)$$

where D is the bound of the discrete convolution.
Plugging the expression for t(n) in Eq. (52) into Eq. (53) results in:

$$r(n) = \sum_{d=0}^{D} h(d)b_1(n-d)g_1w_1(n-d)p(n-d) + \sum_{d=0}^{D} h(d)b_2(n-d)g_2w_2(n-d)p(n-d) + v(n) \quad (54)$$

In Eq. (54), the pilot symbol $b_1(n)$ is known a priori by the receiver, while the user $b_2(n)$ is not. Since the user symbol $b_2(n)$ is not known a priori by the receiver, the second summation term in Eq. (54) and the noise v(n) may be lumped together as an unknown v'(n). As a result, the received chips r(n) may be expressed as:

$$r(n) = \sum_{d=0}^{D} h(d)b_1(n-d)g_1w_1(n-d)p(n-d) + v'(n) \quad (55)$$

where the unknown is given by:

$$v'(n) = \sum_{d=0}^{D} h(d)b_2(n-d)g_2w_2(n-d)p(n-d) + v(n) \quad (56)$$

At the receiver, the received chips r(n), pilot symbol $b_1(n)$, spreading code $w_1(n)$, and scrambling code p(n) are known.

Thus, Eq. (55) can be used in pilot-based channel estimation to estimate the channel h by solving for h(d) using known techniques The pilot symbol $b_1(n)$ may be a constant, in which case the pilot symbol may be represented as simply $b_1$ in Eq. (55). Eq. (55) may be extended to a multi-user communication system, in which the user symbols for the multi-users may be lumped into the unknown v'(n) since they are not known a priori by the receiver.

In the example of pilot-based channel estimation discussed above, the receiver uses the pilot signal as a reference signal that is known a priori by the receiver to estimate the transmitted chips t(n), and then uses the received chips r(n) and estimated transmitted chips t(n) to estimate the channel h. A drawback of this approach is that the power of the unknown signal v'(n) may be high, which reduces the accuracy of the estimated channel h.

In one aspect, user symbols detected from received symbols are used to create virtual pilot signals, which are used to enhance channel estimation. In this aspect, the virtual pilot signals are created from the detected user symbols by treating the detected user symbols as known symbols for purposes of channel estimation. The virtual pilots signals are not actual pilot signals transmitted between the transmitter side (e.g., base station 104) and receiver side (e.g., mobile station 106).

The user symbols may be detected using any detection technique including any of the detection techniques discussed in the disclosure. In the example in Eq. (54), user symbol $b_2(n)$ may be replaced by the detected user symbol $\hat{b}_2(m)$ (expressed in terms of chip index n as $\hat{b}_2(n)$ ) to rewrite Eq. (55) as:

$$r(n) = \sum_{d} h(d)\big(b_1(n-d)g_1w_1(n-d) + \hat{b}_2(n-d)g_2w_2(n-d)\big)p(n-d) + v'(n) \quad \text{Eq. (57)}$$

where the unknown is given by:

$$v'(n) = \sum_{d=0}^{D} h(d)(\hat{b}_2(n-d) - b_2(n-d))g_2w_2(n-d)p(n-d) + v(n) \quad (58)$$

Thus, the detected user symbol $\hat{b}_2(n)$ may be used to create a virtual pilot signal in Eq. (57) to provide enhanced estimation of the channel h. As discussed above, a virtual pilot signal is created by treating the detected user symbol $\hat{b}_2(n)$ as a known symbol for purposes of channel estimation in Eq. (57). If the detected user symbol $\hat{b}_2(n)$ is close to the actual user symbol $b_2(n)$, then the power of the unknown signal v'(n) may be greatly reduced in Eq. (57), which enhances the channel estimation. Eq. (57) may be extended to multiple users by using the detected user symbols for the multiple users to generate multiple virtual pilot signals.

Figure 20:
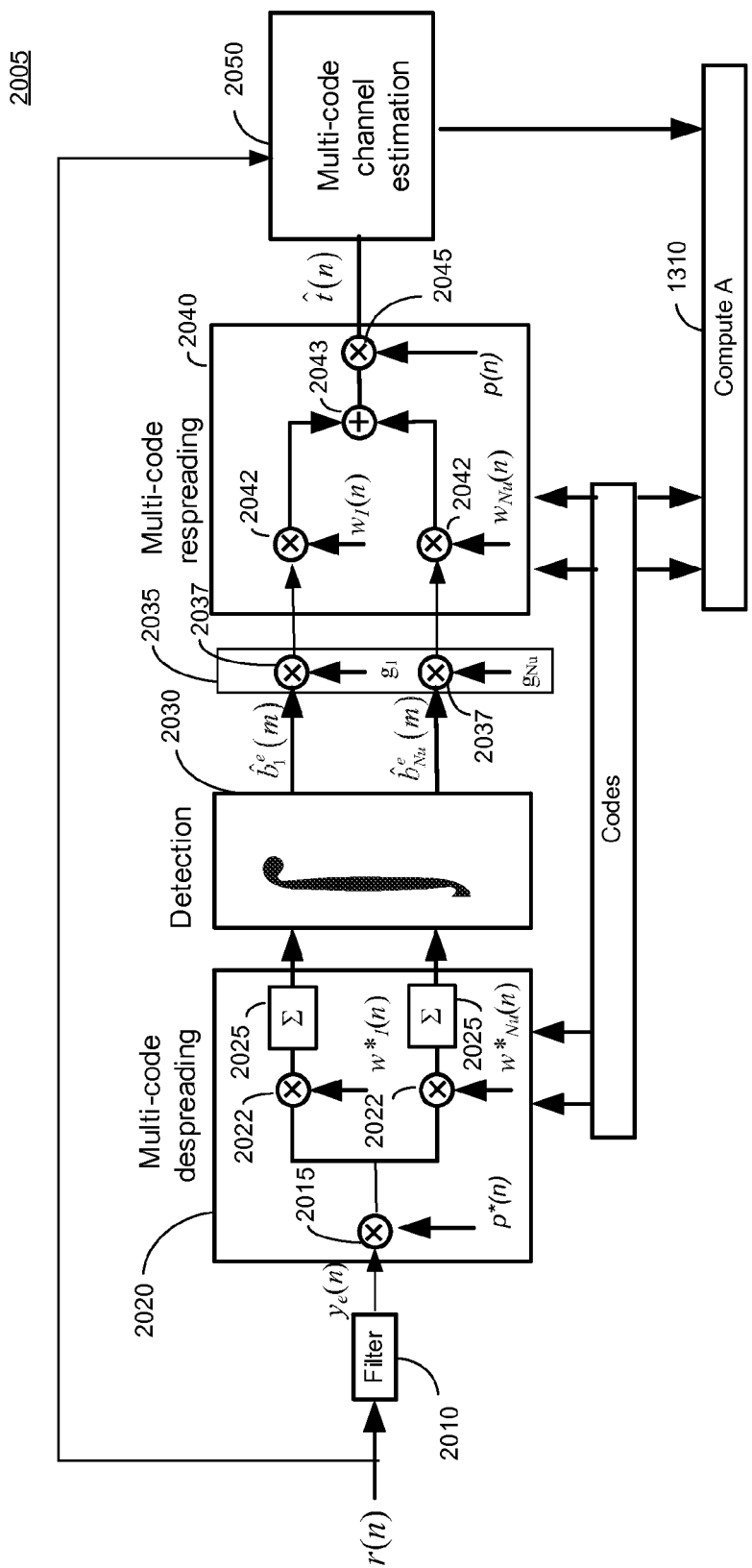
FIG. 20 is a schematic of a channel estimation system, according to certain aspects of the present disclosure.

FIG. 20 is a schematic of a channel estimation system 2005, according to certain aspects of the present disclosure. The channel estimation system 2005 may be at a receiver in a wireless communication system. The channel estimation system 2005 comprises a filter 2010 for filtering received chips r(n), a descramble and despread unit 2020, and a detection unit 2030. The filter unit 2010 may comprise an equalizer, and/or a channel-matched filter.

The descramble and despread unit 2020 comprises a descramble mixer 2015, a plurality of despread mixers 2022 and a plurality of corresponding summation blocks 2025. The descramble mixer 2015 mixes the filtered received chips ye(n) with a descrambling code p*(n) to descramble the filtered received chips y(n). The superscript "e" indicates that the filtered chips are used to estimate the channel h.

The despread mixers 2022 then mix the descrambled signal with a set of despreading codes $w_1^*(n)$ to $w_{Nu}^*(n)$. The despread signal from each despread mixer 2022 is inputted to the respective summation block 2025, which accumulates the despread signal over a period of one symbol to produce a received symbol for the corresponding user. The received symbols are inputted to the detection unit 2030, which detects the user symbols $\hat{b}_1^e(m)$ to $\hat{b}_{Nu}^e(m)$ from the received symbols. The detection unit 2030 may use any detection technique including slicing or any other detection technique discussed in the disclosure. If one of the user symbols corresponds to a known pilot symbol, then the known pilot symbol may be outputted (e.g., from memory) as one of the user symbols $\hat{b}_1^e(m)$ to $\hat{b}_{Nu}^e(m)$.

The channel estimation system 2005 further comprises a gain unit 2035, a spread and scramble unit 2040, and a channel computation unit 2050. The gain unit 2035 comprises a plurality of gain mixers 2037 that apply a set of gains $g_1$ to $g_{Nu}$ to the detected user symbols $\hat{b}_1^e(m)$ to $\hat{b}_{Nu}^e(m)$, respectively. The spread and scramble unit 2040 comprises a plurality of spread mixers 2042, a combiner 2043, and a scramble mixer 2045. The spread mixers 2022 mix the gain-scaled user symbols with a set of spreading codes $w_1(n)$ to $w_{Nu}(n)$, the combiner 2043 combines the spread signals, and the scramble mixer 2045 mixes the combined signal with scrambling code p(n). The spreading codes and scrambling code may be the same as those used in the transmitter side so that the output $\hat{t}(n)$ of the spread and scramble unit 2040 provides an estimate of the transmitted chips at the transmitter side.

The output of the spread and scramble unit 2040 may be given as:

$$\hat{t}(n)=(\hat{b}_1^e(n)g_1 w_1(n)+\ldots+\hat{b}_{Nu}^e(n)g_2 w_2(n))p(n) \quad (59)$$

where the detected user symbols are expressed in terms of the chip index n. In one aspect, one of the symbols $\hat{b}^e$ in Eq. (59) may be a known pilot symbol while the other symbols are detected user symbols. Thus, the estimated transmitted chips $\hat{t}(n)$ may be computed based on the detected user symbols and a known pilot symbol by spreading and scrambling the detected user symbols and pilot symbol to obtain $\hat{t}(n)$. Because $\hat{t}(n)$ provides an estimate of the transmitted chips, the received chips r(n) may be represented by the convolution of $\hat{t}(n)$ with the channel h as:

$$r(n) = \sum_{d=0}^{D} h(d)\hat{t}(n-d) + v'(n) \quad (60)$$

Plugging in the expression for $\hat{t}(n)$ in Eq. (59) into Eq. (60) results in:

$$r(n) = \sum_{d=0}^{D} h(d)(\hat{b}_1^e(n-d)g_1 w_1(n-d) + \ldots + \hat{b}_{Nu}^e(n-d)g_2 w_2(n-d))p(n-d) + v'(n) \quad (61)$$

The channel estimation unit 2050 may then use the input $\hat{t}(n)$ from the spread and scramble unit 2040, the received chips r(n) and Eq. (60) to estimate the channel h. In this aspect, the detected user symbols $\hat{b}_1^e(m)$ to $\hat{b}_{Nu}^e(m)$ are treated as known symbols in Eq. (60) for purposes of channel estimation. This reduces the power of the unknown signal v'(n), which enhances channel estimation.

In one aspect, a scaled estimate of the channel $\hat{h}(l)$ can be obtained by computing the cross-correlation of the received chips r(n) and the estimated transmitted chips $\hat{t}(n)$ over a chip length of A as follows:

$$\hat{h}(l) = \frac{\sum_{n=1}^{A} r(n)\hat{t}*(n-l)}{A} \quad (62)$$

where $\hat{h}(l)$ is the scaled estimate of the channel at chip l. The channel h over chip length D can be estimated by computing equation (61) for l=0 to l=D.

The channel computation unit 2050 may provide the channel estimate to the matrix computation unit 1310 in FIG. 13 to compute the matrices $A_{-1}, A_0, A_{+1}$ or other systems. The data-aided channel estimation provides a more accurate channel estimation h resulting in more accurate computed matrices $A_{-1}, A_0, A_{+1}$. Further, the channel computation unit 2050 may provide the channel estimate to a filter to compute the filter coefficients of the filter. For example, the data-aided channel estimate may be provided to the front-end filters 2010, 1410, 1510 or any other filter. The filter 2010 in the channel estimation system 2005 may use a channel estimate derived from pilot-based channel estimation or a previous data-aided channel estimation.

A process for estimating the gains for the different user symbols will now be discussed, according to one aspect of the disclosure. In this aspect, the gain for each user symbol or code channel is estimated by differentiating received pilot symbols for consecutive symbol periods m and m+1, which may be given as follows:

$$\Delta z_0(m) = z_0(m) - z_0(m+1) \quad (63)$$

where the zero subscript refers to a pilot symbol. Assuming that transmitted pilot symbols are the same for each symbol period, differences between the received pilot symbols are due to noise. Thus, the pilot differentiation provides an estimate of noise at the receiver. Noise power $\hat{\sigma}^2(m)$ may be estimated based on the differentiation of the received pilot symbols as follows:

$$\hat{\sigma}^2(m) = \alpha \frac{|\Delta z_0(m)|^2}{2} + (1-\alpha)\hat{\sigma}^2(m-1) \quad (64)$$

Equation (64) may be implemented using an Infinite Impulse Response (IIR) filter with one tap, where α is a filter coefficient and $\hat{\sigma}^2(m-1)$ is the estimate of the noise power from the previous symbol period m−1. The noise power $\hat{\sigma}^2(m)$ estimate may be applied to each user or code channel of the cell for which $\hat{\sigma}^2(m)$ is estimated. The power $\hat{P}_i(m)$ of code channel i may be given as follows:

$$\hat{P}_i(m) = \alpha|z_i(m)|^2 + (1-\alpha)\hat{P}_i(m-1) \quad (65)$$

where $z_i(m)$ is the received symbol for code channel i, which corresponds to one of the users. Equation (65) may be implemented using an IIR filter with one tap, where α is a filter coefficient and $\hat{P}_i(m-1)$ is the estimate of the power from the previous symbol period m−1. The gain $\hat{g}_i(m)$ for a particular code channel or user may then be estimated as follows:

$$\hat{g}_i(m) = \sqrt{\hat{P}_i(m) - \hat{\sigma}^2(m)} \quad (66)$$

The initial value of the power may be simply the power of the first symbol. The gain unit 2035 may compute the set of gains $g_1$ to $g_{Nu}$ applied to the respective detected user symbols $\hat{b}_1^e(m)$ to $\hat{b}_{Nu}^e(m)$ based on Eq. (66).

In one aspect, the gain unit 2035 may apply the same or different gains to the detected user symbols $\hat{b}_1^e(m)$ to $\hat{b}_{Nu}^e(m)$ at mixers 2037 based on estimates of the corresponding gains at the transmitter side. In one aspect, the gain unit 2035 may compare the gains to a gain threshold to eliminate user symbols with low gains, which may be less reliable in estimating the channel. In this aspect, gains above the gain threshold are applied to their respective user symbols $\hat{b}_1^e(m)$ to $\hat{b}_{Nu}^e(m)$ and used to estimate the channel. Gains below the gain threshold and their respective user symbols $\hat{b}_1^e(m)$ to $\hat{b}_{Nu}^e(m)$ are not used to estimate the channel. In another aspect, the gain unit 2035 may apply the same gain to each user symbol.

In one aspect, the filter 2010 may use a channel estimate h provided by pilot-based channel estimation before the data-aided channel estimation is performed. In this aspect, the channel computation unit 2050 may use the output of the filter 2010 $y_e(n)$ to estimate the total filter c(n) as follows:

$$y_e(n) = \sum_{d=-D}^{D} c(d)\hat{t}(n-d) + v'(n) \quad \text{Eq. (67)}$$

The above equation is similar to Eq. (60), in which the filter output $y_e(n)$ is given by the convolution of $\hat{t}(n)$ with the total filter c(n). The channel computation unit 2050 may use the output $\hat{t}(n)$ from the spread and scramble unit 2040, the filter output $y_e(n)$ and Eq. (67) to estimate the total filter c(n). The total filter c(n) may also be estimated by computing the cross-correlation of the filter output $y_e(n)$ and the estimated transmitted chips $\hat{t}(n)$ similar to equation (62), in which the received chips r(n) in the cross-correlation are replaced with the filtered chips $y_e(n)$.

The filter 2010 may filter the received r(n) based on an initial channel estimate h using pilot-based channel estimation. Further, the channel computation unit 2050 may provide the estimated total filter c(n) to a matrix computation unit (e.g., matrix computation unit 1310), in which case the matrix computation unit does not have to separately compute the total filter c(n) using a channel estimate h and filter f parameters. In this aspect, the channel computation unit 2350 may receive the filtered output $y_e(n)$ from the filter 2010 to estimate the total filter c(n).

Figure 21A:
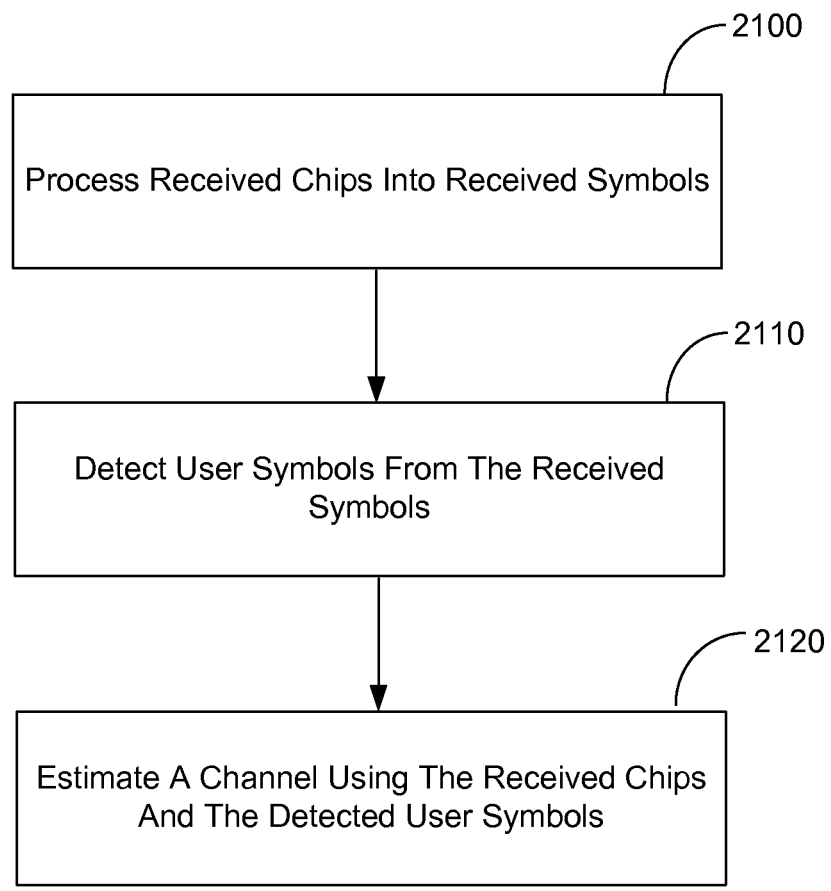
FIG. 21a is a flow diagram illustrating a method of channel estimation, according to certain aspects of the present disclosure.

FIG. 21a is a flow diagram illustrating a process of channel estimation at a receiver, according to certain aspects of the present disclosure. At operation 2100, received chips are processed into received symbols. For example, the received chips may be filtered and then descrambled and despreaded into received symbols.

From operation 2100, the process continues to operation 2110 where user symbols are detected from the received symbols. For example, the user symbols may be detected by slicing the received symbols. Other detection techniques may also be used.

From operation 2110, the process continues to operation 2130 where a channel is estimated using the received chips and the detected user symbols (e.g., based on Eq. (60)). For example, the detected user symbols may be spread and scrambled to estimate the transmitted chips at the transmitter side. Also, the detected user symbols may be used together with one or more known pilot symbols to estimate the transmitted chips. The estimated transmitted chips and the received chips may then be used to estimate the channel.

Figure 21B:
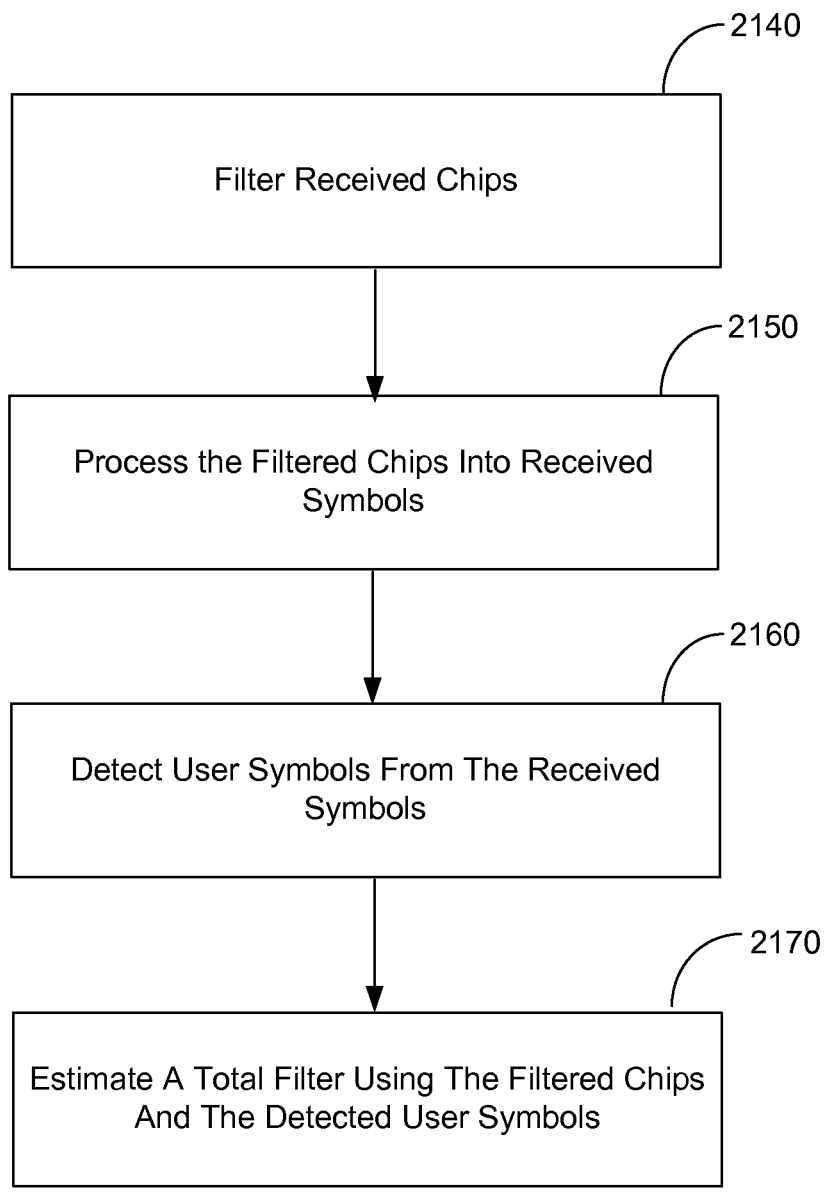
FIG. 21b is a flow diagram illustrating a method of total filter estimation, according to certain aspects of the present disclosure.

FIG. 21b is a flow diagram illustrating a process for estimating a total filter c(n) representing a convolution of a channel h and a filter f, according to certain aspects of the present disclosure. At operation 2140, received chips are filtered by the filter at a receiver.

From operation 2140, the process continues to operation 2150 where the filtered chips are processed into received symbols. For example, the filtered chips may be descrambled and despreaded into received symbols.

From operation 2150, the process continues to operation 2160 where user symbols are detected from the received symbols. For example, the user symbols may be detected by slicing the received symbols. Other detection techniques may also be used.

From operation 2160, the process continues to operation 2170 where the total filter c(n) is estimated using the filtered chips and the detected user symbols (e.g., based on Eq. (67)). For example, the detected user symbols may be spread and scrambled to estimate the transmitted chips at the transmitter side. Also, the detected user symbols may be used together with one or more known pilot symbols to estimate the transmitted chips. The estimated transmitted chips and the filtered chips may then be used to estimate the total filter c(n) (e.g., based on Eq. (67)).

Interference Cancellation

The multi-user interference cancellation was discussed above in the context of intra-cell interference, in which multi-user interference is caused by multiple users in the same cell (e.g., multiple users serviced by the same base station 104). A mobile station 106 in a wireless communication system may also be subject to inter-cell interference, in which interference is caused by users in other cells. For example, the mobile station 106 may be more susceptible to inter-cell interference when located near an edge of the serving cell where interference from neighboring cells is stronger. Referring to the example in FIG. 1, the mobile station 106D being served by cell 102D may be subject to inter-cell interference from cells 102F and 102G.

Figure 22:
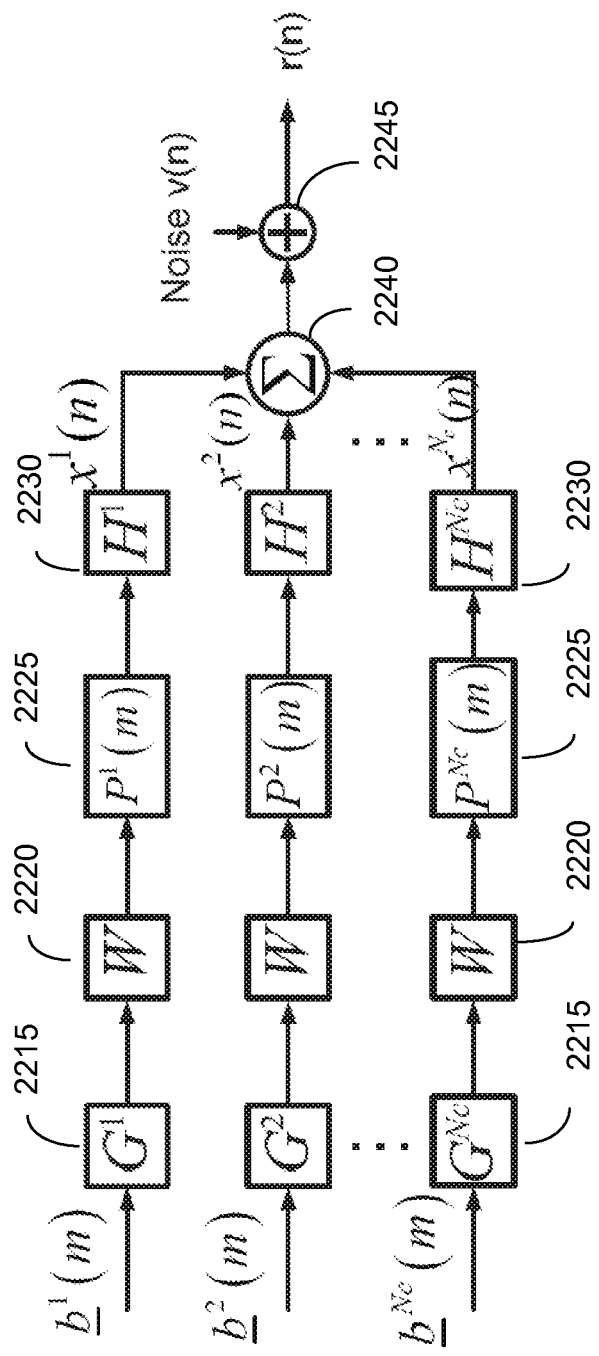
FIG. 22 is a diagram of a simplified multi-cell multi-user channel model, according to certain aspects of the present disclosure.

FIG. 22 is a diagram of a multi-cell multi-user model including noise, according to aspects of the present disclosure. The different cells in the model are identified by index i where i=1, . . . , Nc in FIG. 22. The model relates the transmitted user symbols $b^i(m)$ of each cell to the received chips r(n) at a receiver (e.g., mobile station 104). In each cell, the user symbols $b^i(m)$ are scaled by a respective gain matrix $G^i$ at block 2215, spread by a spreading matrix W at respective block 2220, and scrambled by a scrambling matrix $P^i(m)$ at respective block 2225. The resulting signal in each cell is then transmitted via a respective channel $H^i$ 2230 to the receiver. The received chips from each cell is represented by $x_i(n)$. The received chips $x_i(n)$ from the different cells are combined at block 2240 and noise v(n) is added at block 2245 to account for noise. The total received chips r(n) at the receiver for Nc=3 may be given as:

$$r(n) = x_1(n) + x_2(n) + x_3(n) + v(n) \quad (68)$$

The spreading matrix W for each cell represents spreading codes, for example, Walsh codes, used to separate the different users of the cell. The different cells may use the same spreading codes to separate their users. The scrambling matrix $P^i(m)$ for each cell represents a scrambling code used to separate the cell from other cells.

In one aspect, the received chips $x_i(n)$ for each cell may be computed at a receiver by detecting user symbols for the cell and processing the detected user symbols based on the above model to reconstruct the received chips for the cell. For example, the received chips $x_i(n)$ for cell i are computed by detecting user symbols for cell i using any detection technique including any of the detection techniques discussed in the disclosure. The detected user symbols, which provide an estimate of the transmitted user symbols $b^i(m)$, are then gain-scaled, spread, scrambled, and convolved with a channel estimate for cell i to reconstruct the received chips $x_i(n)$ for cell i.

In an inter-cell cancellation process, according to one aspect, the received chips $\hat{x}_i(n)$ for the different cells are successively computed and removed from the received chips $r(n)$. The hat superscript in this aspect and other aspects of the disclosure denotes that the computed received chips are estimates of the actual received chips. After the received chips for each cell has been removed from the received chips $r(n)$, the received chips $\hat{x}_i(n)$ for the target cell are added back and processed to detect the user symbols for the target cell. The target cell is the cell corresponding to the desired user symbols and may be referred to as a serving cell. The other cells may be referred to as interfering cells (i.e., other cells interfering with the users of the target cell).

Figure 23:
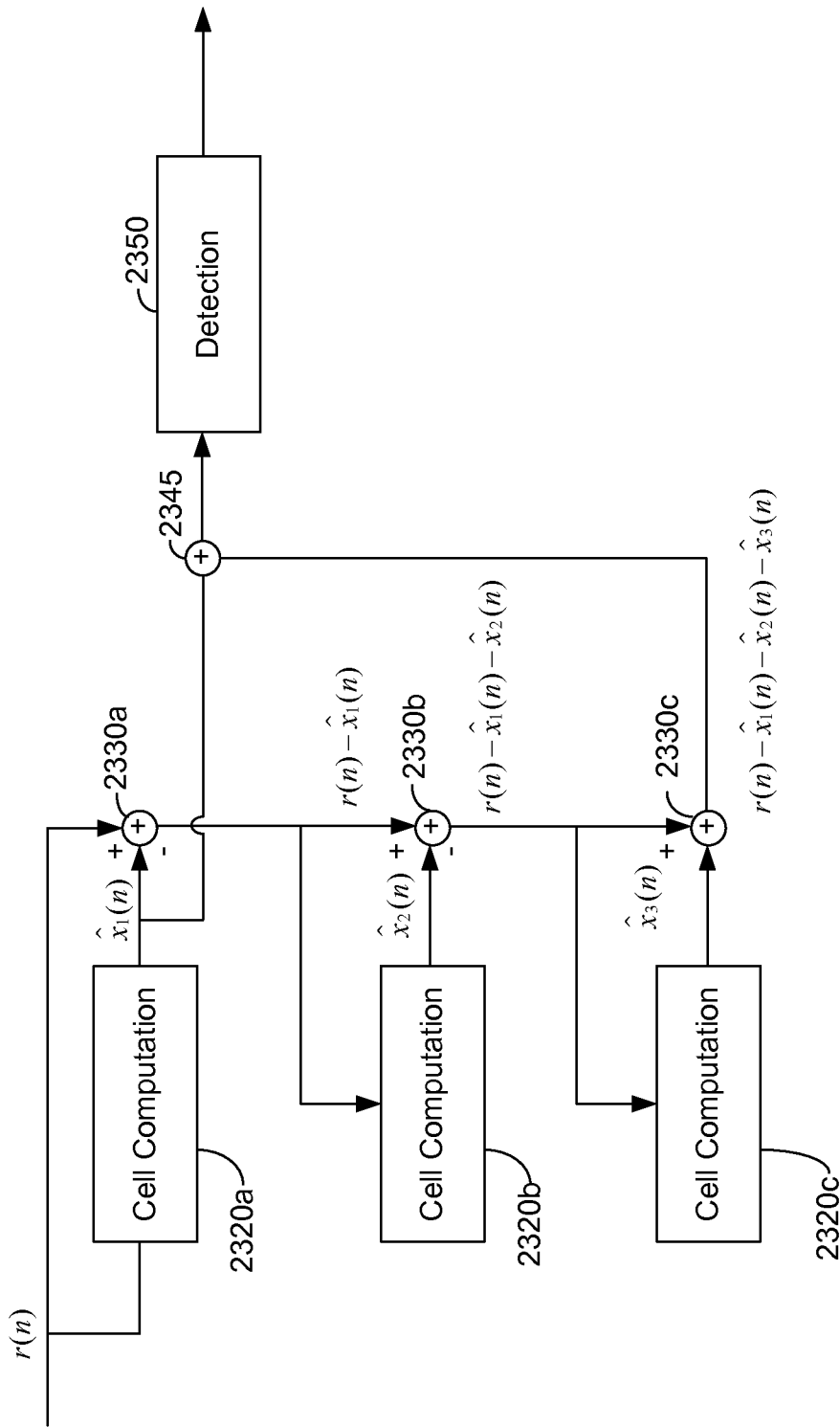
FIG. 23 is a schematic of a system for inter-cell interference cancellation, according to certain aspects of the present disclosure.

FIG. 23 is a schematic of a system 2310 with interference cancellation, according to certain aspects of the present disclosure. The system 2310 comprises first, second and third cell computation units 2320a-2320c, respectively and first, second and third subtraction units 2330a-2330c, respectively. The system 2310 also includes an addition unit 2345 and a detection system 2350. Each cell computation unit 2320a-2320c is configured to compute received chips for a selected or working cell.

In one aspect, the first cell computation unit 2320a computes received chips $\hat{x}_1(n)$ for the target cell, and each of the second and third cell computation units 2320b and 2320c computes received chips for first and second interfering cells, respectively. The hat superscript denotes computed received chips. Each of the cell computation units 2320a-2320c may be implemented using the exemplary cell computation unit 2410 illustrated in FIG. 24, which is discussed in further detail below.

In one aspect, cells are assigned to the cell computation units 2320a-2320c in order of decreasing signal strength or geometry at the receiver. The geometry for a cell may be defined by Ior/Ioc, where Ior is received power from the cell transmission and Ioc is the power of interference plus noise. In one aspect, the cell having the highest signal strength at the receiver is assigned to the first cell computation unit 2320a. Assuming that the target cell has the highest signal strength, the target cell is assigned to the first cell computation unit 2320. The cell having the second highest signal strength at the receiver is assigned to the second cell computation unit 2320b, and so forth.

In operation, the first cell computation unit 2320a receives the received chips $r(n)$, and computes and outputs the received chips $\hat{x}_1(n)$ for the target cell (assuming the target cell has highest signal strength at the receiver). The first subtraction block 2330a removes the computed received chips $\hat{x}_1(n)$ for the target cell from the received chips $r(n)$ resulting in $r(n)-\hat{x}_1(n)$. The output of the first subtraction block 2330a is inputted to the second cell computation unit 2320b. Thus, the computed received chips $\hat{x}_1(n)$ for the target cell are removed from the received chips $r(n)$ prior to the second cell computation unit 2320b. This removes the contribution of the target cell from the received chips $r(n)$ resulting in more reliable computations of the received chips for subsequent cells.

The second cell computation unit 2320b computes and outputs the received chips $\hat{x}_2(n)$ for a first interfering cell (e.g., interfering cell with highest power). The second subtraction unit 2330b removes the received chips $\hat{x}_2(n)$ for the first interfering cell from the output of the first subtraction unit 2330a resulting in $r(n)-\hat{x}_1(n)-\hat{x}_2(n)$. The output of the second subtraction block 2330b is inputted to the third cell computation unit 2320c. Thus, the received chips $\hat{x}_1(n)$ and $\hat{x}_2(n)$ for the target cell and the first interfering cell, respectively, are removed from the received chips $r(n)$ prior to the third cell computation unit 2320c. This removes the contribution of the target cell and the first interference cell from the received chip $r(n)$ resulting in more reliable computation of the received chips for the second interfering cell. The third cell computation unit 2320c computes and outputs the received chips $\hat{x}_3(n)$ for the second interfering cell.

The third subtraction unit 2330c removes the received chips $\hat{x}_3(n)$ for the second interfering cell from the output of the second subtraction unit 2330b resulting in $r(n)-\hat{x}_1(n)-\hat{x}_2(n)-\hat{x}_3(n)$. The addition unit 2345 then adds back the received chips $\hat{x}_1(n)$ for the target cell to the output of the third subtraction unit 2330c. The output of the addition unit 2345 is then inputted to the detection system 2350. Thus, inter-cell interference from the first and second interfering cells are cancelled from the input to the detection system 2350. The detection system 2350 then detects the user symbols for the target cell. For example, the detection system 2350 may filter, descramble and despread the input chips into received symbols for the target cell and then detect the user symbols for the target cell from the received symbols using any detection technique including any of the detection techniques discussed in the disclosure.

In the above aspect, the computed received chips for the target cell and the first and second interfering cells are successively cancelled from the received chips $r(n)$, and the computed chips for the target cell are added back to detect the user symbols for the target cell.

Figure 24:
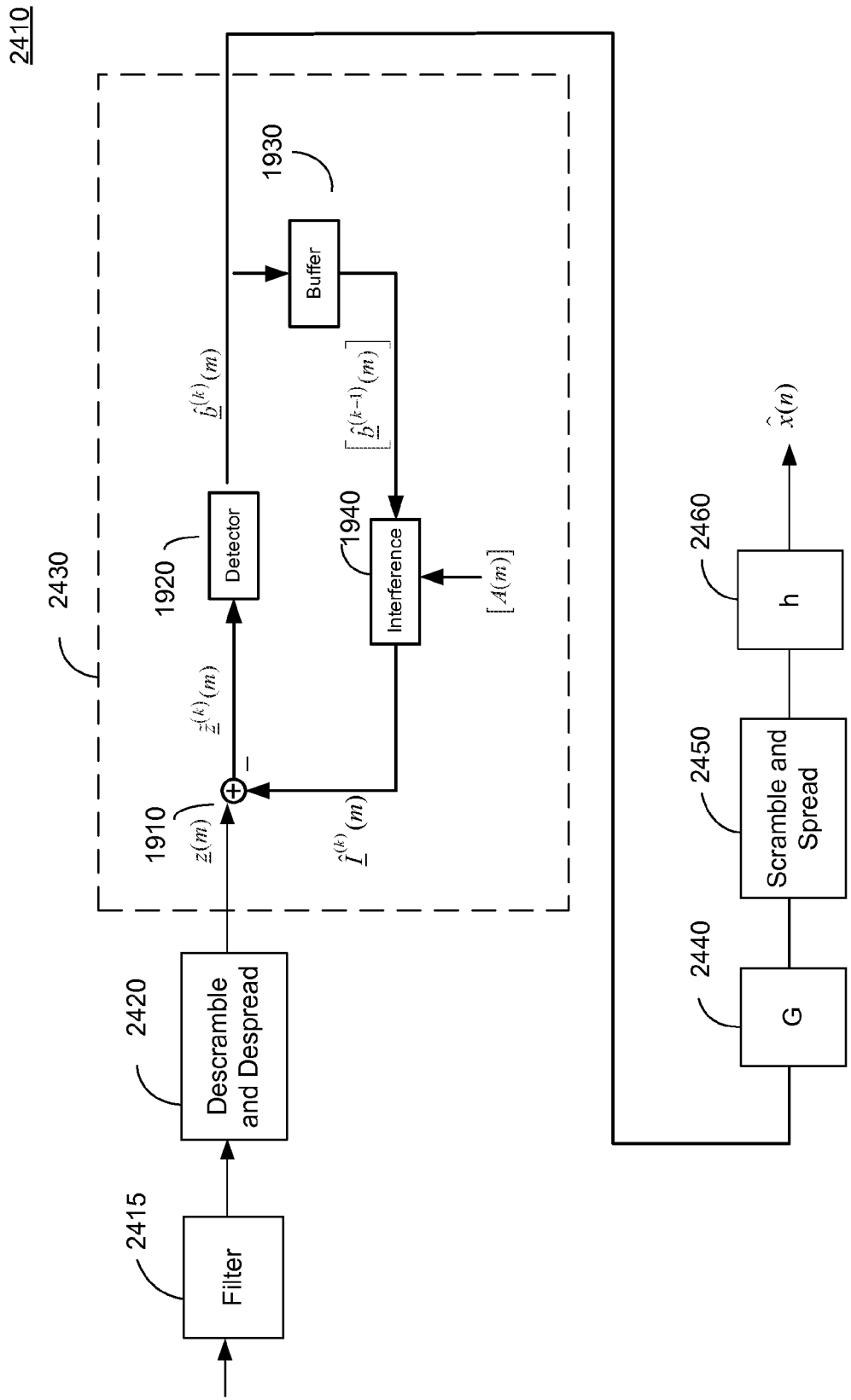
FIG. 24 is a schematic of a cell computation system for computing received chips, according to certain aspects of the present disclosure.

FIG. 24 is a schematic of a cell computation unit 2410, according to certain aspects of the present disclosure. The cell computation unit 2410 receives the received chips $r(n)$ and computes and outputs received chips $\hat{x}(n)$ for a working cell, where the working cell refers to a particular cell for which the cell computation unit 2410 is computing received chips at a given instance. The cell computation unit 2410 may also receive the received chips $r(n)$ with received chips for other cells removed. For example, if the cell computation unit 2410 implements the second cell computation 2320b in FIG. 23, then cell computation unit 2410 receives the received chips $r(n)$ with the computed received chips for the target cell $\hat{x}_1(n)$ removed and computes the received chips $\hat{x}_2(n)$ for a first interfering cell.

The cell computation unit 2410 comprises a filter 2415, a descramble and despread unit 2420, and a detection system 2430. The filter 2415 filters the received chips and may comprise an equalizer, and/or a channel-matched filter. For the example in which the filter 2415 comprises an equalizer, the equalizer may be implemented using a Frequency Domain Equalizer (FDE). The filter 2415 may filter the received chips based on a channel estimate for the working cell.

After filtering, the descramble and despread unit 2420 descrambles the filtered chips using a descrambling code for the working cell. The descramble and despread unit 2420 then despreads the descrambled signal using a set of despreading codes for the working cell, where each despreading code may correspond to a different user of the working cell. The descramble and despread unit 2420 outputs a set of received symbols $z(m)$ for the working cell. The detection system 2430 then detects user symbols from the received symbols $z(m)$ for the working cell. The detection system 2430 may use slicing or other detection techniques to detect the user symbols. In one aspect, the detection system 2340 is implemented using the detection system 1905 in FIG. 19. In this aspect, the detection system 2430 iteratively computes and cancels multi-user interference from the received symbols over k iterations to refine the redetected user symbols $\hat{b}^{(k)}(m)$. Thus, the detection system 2430 provides intra-cell multi-user interference cancellation for the working cell. The matrices $A_{-1}(m)$, $A_0(m)$ and $A_1(m)$ used by the interference computation unit 1940 may be computed using the spreading codes, scrambling code, descrambling code, despreading codes, gains, filter and channel estimate for the working cell. The detected user symbols $\hat{b}^{(k)}(m)$ provide an estimate of the transmitted user symbols for the working cell.

The cell computation unit 2010 further comprises a gain unit 2440, a spread and scramble unit 2450 and a channel unit 2460. The gain unit 2440 and the spread and scramble unit 2060 process the detected user symbols in a manner similar to the transmitter side (e.g., base station) of the working cell. The gain unit 2440 applies a set of gains to the user symbols, where the gains may be estimated based on Eq. (66) given above. The spread and scramble unit 2450 then spreads the user symbols using a set of spreading codes, combines the resulting spread signals, and scrambles the combined spread signal to generate an estimate of the transmitted chips for the working cell. The spread and scramble unit 2450 may use the same spreading and scrambling codes used at the transmitter side of the working cell.

The channel unit 2460 then convolves the estimated transmitted chips from the scramble and spread unit 2450 with a channel estimate for the working cell to compute the received chips $\hat{x}(n)$ for the working cell. The channel estimate for the working cell may be estimated, e.g., using pilot-based channel estimation and/or data-aided channel estimation, as described above.

Thus, the detected user symbols $\hat{b}^{(k)}(m)$ from the detection system 2430 provide an estimate of the transmitted user symbols for the working cell. Using the detected user symbols $\hat{b}^{(k)}(m)$, the gain unit 2440, the spread and scramble unit 2450 and the channel unit 2460 reconstruct the received chips $\hat{x}(n)$ for the working cell.

Although the cell computation units 2320a-2030c were shown separately in FIG. 23 for ease of illustration, it is to be understood that their operations may be performed by the same cell computation unit. For example, the cell computation unit 2410 may be used to successively compute the received cells for the cell computation unit 2310a-2310c in FIG. 23.

Figure 25:
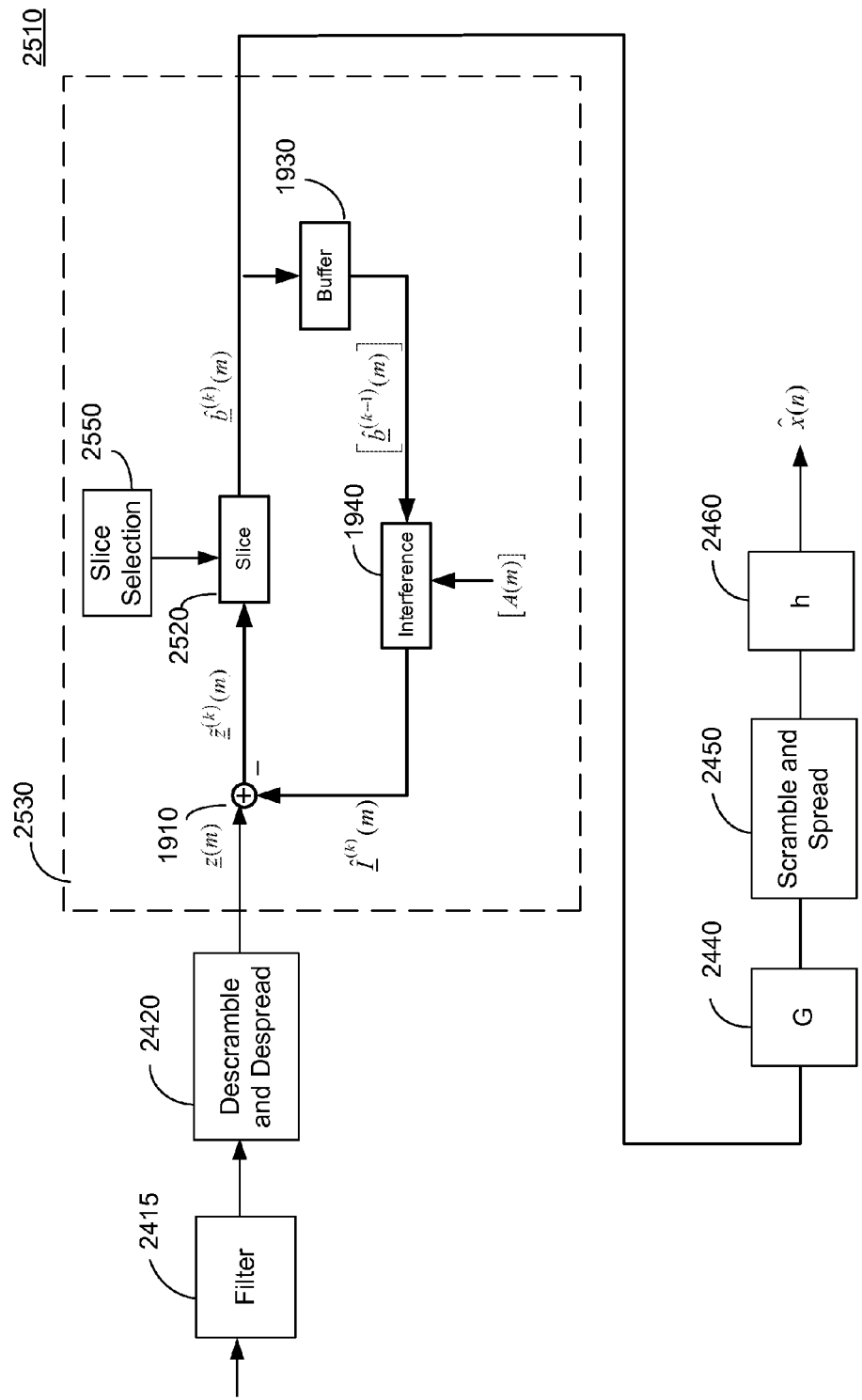
FIG. 25 is a schematic of a cell computation system for computing received chips with slice detection, according to certain aspects of the present disclosure.

FIG. 25 is a schematic of a cell computation unit 2510, according to certain aspects of the present disclosure. The cell computation unit 2510 is similar to the one shown in FIG. 24, in which the symbol detector 1920 in FIG. 24 is implemented with a slicer 2520. The slicer 2520 detects the user symbols $\hat{b}^{(k)}(m)$ from the received symbols $\tilde{z}^{(k)}(m)$ with the computed multi-user interference removed. For an example of Quadrature Phase Shift Keying (QPSK) modulation, the slicer 2520 may slice the received symbol $\tilde{z}_i^{(k)}(m)$ for user i as follows:

$$\text{slice}(\tilde{z}_i^{(k)}(m)) = \frac{1}{\sqrt{2}}\text{sign}\{\text{Re}(\tilde{z}_i^{(k)}(m))\} + \frac{j}{\sqrt{2}}\text{sign}\{\text{Im}(\tilde{z}_i^{(k)}(m))\} \quad (69)$$

The above slice may be referred to as a hard slice. A hard slice gives a hard symbol from the modulation scheme being used. For example, QPSK modulation contains four possible symbols, and therefore a hard slice using QPSK modulation would give one or four possible hard symbols. A soft slice gives a soft, real-valued symbol estimation. Linear minimum-mean squared-error estimation (LMMSE) may be used for soft slicing. For binary inputs, LMMSE may be given in the hyperbolic tangent form as shown below. In another aspect, for the example of QPSK modulation, the slicer 2520 may also perform a soft slice of the received symbols $\tilde{z}_i^{(k)}(m)$ as follows:

$$\text{slice}(\tilde{z}_i^{(k)}(m)) = \frac{1}{\sqrt{2}}\tanh\left\{\frac{\sqrt{2}\,g_i\text{Re}(\tilde{z}_i^{(k)}(m))}{\sigma^2}\right\} + \frac{j}{\sqrt{2}}\tanh\left\{\frac{\sqrt{2}\,g_i\text{Im}(\tilde{z}_i^{(k)}(m))}{\sigma^2}\right\} \quad (70)$$

where $\sigma^2$ is a complex noise power, and $g_i$ is an estimated gain for the respective user. The complex noise power $\sigma^2$ may be computed using pilot differentiation based on Eq. (64) given above. The gain $g_i$ may be estimated based on Eq. (66) given above. The complex noise power $\sigma^2$ and gain $g_i$ may be computed from a previous symbol period m−1. The soft slice takes into account noise power and gain for a received symbol when making a decision on the respective user symbol.

In one aspect, the detection system 2530 also comprises a slice selection unit 2520 that selects either a hard slice or a soft slice based on the geometry or signal strength of the corresponding cell. For example, the slice selection unit 2520 selects a hard slice if the geometry of the corresponding cell is equal to above a threshold (e.g., >=5 dB), and selects a soft slice if the geometry of the corresponding cell is below the threshold (e.g., <5 dB). The slice selection unit 2520 may then instruct the slicer 2520 to slice the received symbols $\tilde{z}^{(k)}(m)$ based on the selection. For the example of QPSK, the slice selection unit 2520 may instruct the slicer 2520 to hard slice the received symbols $\tilde{z}^{(k)}(m)$ using Eq. (69) if the geometry of the corresponding cell is equal to or above the threshold and instruct the slicer 2520 to soft slice the received symbols $\tilde{z}^{(k)}(m)$ using Eq. (70) if the geometry of the corresponding cell is below the threshold.

For high geometry, the estimated symbols from hard slicing are reliable, and thus can be used to cancel out interference. For low geometry, however, erroneously detected symbols from hard slicing can cause error propagation for interference cancellation. In this case, soft slicing minimizes error propagation effect and results in better performance of interference cancellation.

An interference cancellation process, according to one aspect, will now be discussed with reference to Table 1 below.

TABLE 1

| Iteration | Working Cell | Cancel | Add Back | Estimate |
|---|---|---|---|---|
| 1 | 1 | 0 + 0 + 0 | 0 | $\hat{x}_1(n)$ |
| 2 | 2 | $\hat{x}_1(n) + 0 + 0$ | 0 | $\hat{x}_2(n)$ |
| 3 | 3 | $\hat{x}_1(n) + \hat{x}_2(n) + 0$ | 0 | $\hat{x}_3(n)$ |
| 4 | 1 | $\hat{x}_1(n) + \hat{x}_2(n) + \hat{x}_3(n)$ | $\hat{x}_1(n)$ | $\hat{x}_1(n)$ |
| 5 | 2 | $\hat{x}_1(n) + \hat{x}_2(n) + \hat{x}_3(n)$ | $\hat{x}_2(n)$ | $\hat{x}_2(n)$ |
| 6 | 3 | $\hat{x}_1(n) + \hat{x}_2(n) + \hat{x}_3(n)$ | $\hat{x}_3(n)$ | $\hat{x}_3(n)$ |
| 7 | 1 | $\hat{x}_1(n) + \hat{x}_2(n) + \hat{x}_3(n)$ | $\hat{x}_1(n)$ | $\hat{x}_1(n)$ |
| ... | ... | ... | ... | ... |

As shown in Table 1, the interference cancellation process performs interference cancellation in iterations or stages. Table 1 shows an example of 7 iterations, although it is to be understood that fewer or more iterations may be performed. For each iteration, Table 1 shows the working cell, previously estimated received chips being cancelled and added back to the received chips r(n), and the received chips being estimated. Table 1 shows an example of three cells, although it is to be understood that the interference cancellation process may employ any number of cells. In one aspect, the three cells are arranged in order of decreasing geometry so that the first cell has the highest geometry, the second cell has the second highest geometry, and so forth.

In the first iteration, the process estimates the received chips $\hat{x}_1(n)$ for the first cell (e.g., target cell) using the received chips r(n). As shown in Table 1, the received chips for the three cells are initialized at zero ($\hat{x}_1(n)=\hat{x}_2(n)=\hat{x}_3(n)=0$) and thus there is no inter-cell interference cancellation in the first iteration. The first iteration may be performed, for example, by inputting the received chips r(n) to the cell computation unit 2410 and computing the received chips for the first cell.

In the second iteration, the process cancels previously estimated received chips $\hat{x}_1(n)$ for the first cell from the received chips r(n). The process then estimates the received chips $\hat{x}_2(n)$ for the second cell using the received chips r(n) with the previously estimated received chips $\hat{x}_1(n)$ cancelled out.

In the third iteration, the process cancels the previously estimated received chips $\hat{x}_1(n)$ and $\hat{x}_2(n)$ for the first and second cells, respectively, from the received chips r(n). The process then estimates the received chips $\hat{x}_3(n)$ for the third cell using the received chips r(n) with the previously estimated received chips $\hat{x}_1(n)$ and $\hat{x}_2(n)$ cancelled out.

In the fourth iteration, the process cancels the previously estimated received chips $\hat{x}_1(n)$, $\hat{x}_2(n)$ and $\hat{x}_3(n)$ for the first, second and third cells, respectively, from the received chips r(n) and adds back the previously estimated received chips $\hat{x}_1(n)$ for the first cell. The process then estimates the received chips $\hat{x}_1(n)$ for the first cell again using the received chips r(n) with the previously estimated received chips $\hat{x}_1(n)$, $\hat{x}_2(n)$ and $\hat{x}_3(n)$ cancelled out and the previously estimated received chips $\hat{x}_1(n)$ added back. Thus, the fourth iteration updates the estimate of the received chips $\hat{x}_1(n)$ for the first cell, which is used in subsequent iterations.

In the fifth iteration, the process cancels the previously estimated received chips $\hat{x}_1(n)$, $\hat{x}_2(n)$ and $\hat{x}_3(n)$ for the first, second and third cells, respectively, from the received chips r(n) and adds back the previously estimated received chips $\hat{x}_2(n)$ for the second cell. The process then estimates the received chips $\hat{x}_2(n)$ for the second cell again using the received chips r(n) with the previously estimated received chips $\hat{x}_1(n)$, $\hat{x}_2(n)$ and $\hat{x}_3(n)$ cancelled out and the previously estimated received chips $\hat{x}_2(n)$ added back. Thus, the fifth iteration updates the estimate of the received chips $\hat{x}_2(n)$ for the second cell, which is used in subsequent iterations.

In the sixth iteration, the process cancels the previously estimated received chips $\hat{x}_1(n)$, $\hat{x}_2(n)$ and $\hat{x}_3(n)$ for the first, second and third cells, respectively, from the received chips r(n) and adds back the previously estimated received chips $\hat{x}_3(n)$ for the third cell. The process then estimates the received chips $x_3(n)$ for the third cell again using the received chips r(n) with the previously estimated received chips $\hat{x}_1(n)$, $\hat{x}_2(n)$ and $\hat{x}_3(n)$ cancelled out and the previously estimated received chips $\hat{x}_3(n)$ added back. Thus, the sixth iteration updates estimate of the received chips $\hat{x}_3(n)$ for the third cell, which is used in subsequent iterations.

In the seventh iteration, the process cancels the previously estimated received chips $\hat{x}_1(n)$, $\hat{x}_2(n)$ and $\hat{x}_3(n)$ for the first, second and third cells, respectively, from the received chips r(n) and adds back the previously estimated received chips $\hat{x}_1(n)$ for the first cell. The process then estimates the received chips $\hat{x}_1(n)$ for the first cell again using the received chips r(n) with the previously estimated received chips $\hat{x}_1(n)$, $\hat{x}_2(n)$ and $\hat{x}_3(n)$ cancelled out and the previously estimated received chips $\hat{x}_1(n)$ added back. Thus, the seventh iteration updates estimate of the received chips $\hat{x}_1(n)$ for the first cell, which is used in subsequent iterations. The process may use the estimated received chips $\hat{x}_1(n)$ for the first cell to detect the user symbols for the first cell (assuming the first cell is the target cell) or continue with additional iterations to further refine the estimate of the received chips $\hat{x}_1(n)$. Also, the process may use perform fewer than 7 iterations. For example, the system 2310 illustrated in FIG. 23 may be used to perform the process illustrated in Table 1 up to the fourth iteration.

Thus, in each iteration, the process cancels previous estimates of the received chips for each cell (if available from a previous iteration) from the received chips r(n) and adds back the previous estimate of the received chips for the working cell (if available from a previous iteration). The process then estimates the received chips for the working cell using the received chips r(n) with the previous estimates of the received chips for the cells cancelled out and the previous estimate of the received chips for the working cell added back. Also, in this example, the process successively estimates the received chips for cells 1-3 and loops back to cell 1 after estimating the received chips for cell 3.

Figure 26:
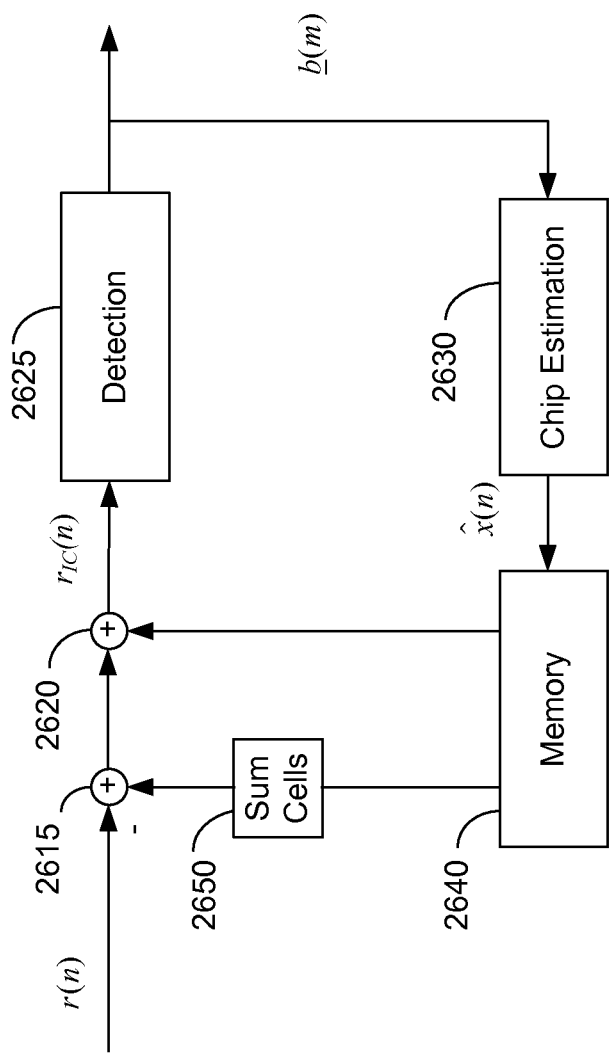
FIG. 26 is a schematic of a system capable of performing successive interference cancellation, according to certain aspects of the present disclosure.

FIG. 26 is a schematic of a system 2610 capable of performing the interference cancellation process illustrated in Table 1, according to certain aspects of the present disclosure. The system comprises a subtraction unit 2615, an addition unit 2620, a detection system 2625, a chip estimation system 2630, a memory 2640, and a cell summation unit 2650. The subtraction unit 2615 is configured to cancel previous estimates of the received chips for the cells (if available from previous iterations) from the received chips r(n) and the addition unit 2620 is configured to add back a previous estimate of the received chips (if available from a previous iteration) for the working cell. The received chips r(n) with the previous estimates of the received chips for the cells canceled out and the previous estimate of the received chips for the working cell added back is denoted by $r_{IC}(n)$ in FIG. 26.

The detection system 2625 is configured to process the received chips by $r_{IC}(n)$ into received symbols for the working cell and to detect user symbols b(m) for the working cell from the received symbols for the working cell. The chip estimation system 2630 is configured to estimate received chips $\hat{x}(n)$ for the working cell using the detected user symbols b(m) for the working cell from the detection system 2625. The memory 2640 is configured to store estimates of the received chips for the different cells.

In each iteration, the subtraction unit 2615 cancels previous estimates of the received chips for each cell (if available from a previous iteration) from the received chips r(n). To do this, the summation unit 2615 sums the previous estimates of the received cells for each cell (if available) from the memory 2640 and the subtraction unit 2615 subtracts the sum from the received chips r(n). In the first iteration, the subtraction unit 2615 does not cancel previous estimates of the received chips for the cells from the received chips r(n). In subsequent iterations, estimates of the received chips for the cells are stored in the memory 2640 and thus become available for use by the summation unit 2650 and subtraction unit 2615. For example, referring to Table 1, estimates for the received chips of cells 1-3 are available in the fourth iteration.

In each iteration, the addition unit 2620 adds back an estimate of the received chips for the working cell (if available from a previous iteration) to the output of the subtraction unit 2620. The addition unit 2620 receives the estimate of the received chips for the working cell from the memory 2640, which stored the estimate from a previous iteration. If a previous estimate of the received chips for the working cell is not available, then the addition unit 2620 does not add back an estimate of the received chips for the working cell.

In each iteration, the detection system 2625 detects the user symbols b(m) for the working cell using the received chips r(n) with the previous estimates of the received chips for the cells cancelled out and the estimate of the received chips for the working cell added back. The detection system may be implemented, for example, using the filter, descramble and despread unit and detection system in FIG. 24.

In each iteration, the chip estimates unit 2630 estimates the received chips for the working cell using the detected user symbols b(m) for the working cell from the detection system. The chip estimate unit 2630 may be implemented, for example, using the gain unit 2440, spread and scramble unit 2450 and the channel unit 2460 in FIG. 24.

In each iteration, the memory 2640 stores the estimate of the received chips for the working cell from the chip estimation unit 2630. If there is a previous estimate of the received chips for the working cell already stored in the memory 2640 from a previous iteration, then the memory 2640 updates the estimate of the received chips for the working cell using the most recent estimate from the chip estimation unit 2630 and uses the updated estimate in subsequent iterations.

The system 2610 may be used to perform any number of iterations for the process in Table 1. After a desired number of iterations have been performed, the user symbols b(m) for the target cell may be outputted from the detection system 2625.

Figure 27:
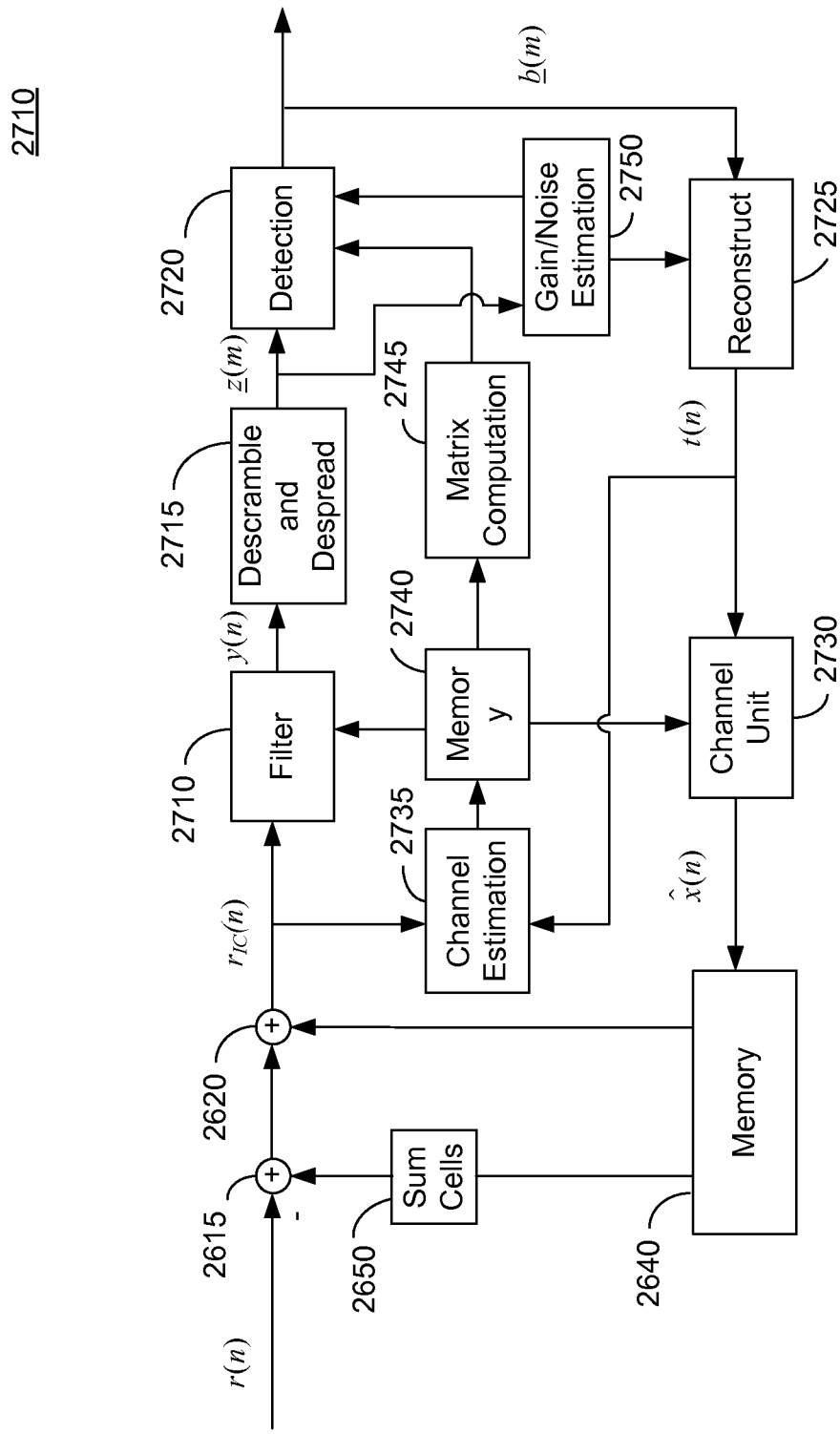
FIG. 27 is a schematic of a system capable of performing successive interference cancellation, according to certain aspects of the present disclosure.

FIG. 27 is a schematic of a system 2710 illustrating examples of implementations for the detection system 2625 and chips estimation unit 2630 in FIG. 25, according to certain aspects of the present disclosure. In the system 2710, the detection system 2625 in FIG. 26 comprises a filter 2710, a descramble and despread unit 2715, and a detection system 2720. The filter 2710 is configured to filter the chips $r_{IC}(n)$ into filtered chips y(n). The descramble and despread unit 2715 is configured to process the filtered chips y(n) into received symbols z(m) for the working cell by descrambling and despreading the filtered chips y(n). The descramble and despread unit 2715 descramble and despread the filtered chips y(n) using a descrambling code and a set of despreading codes, respectively, for the working cell. The detection unit 2720 detects the user symbols b(m) for the working cell from the received symbols z(m). The detection system 2720 may be implemented, for example, using the detection system 1905 in FIG. 19 for providing intra-cell multi-user cancellation for the working cell.

The chip estimation system 2630 in FIG. 26 comprises a reconstruction unit 2725 and a channel unit 2730. The reconstruction unit 2725 is configured to apply a set of gains to respective detected user symbols b(m), and to spread and scramble the gain-scaled detected user symbols to estimate the transmitted chips t(n). The reconstruction unit 2725 spreads and scrambles the gain-scaled detected user symbols using a set of spreading codes and a scrambling code, respectively, for the working cell. The channel unit 2730 convolves the estimated transmitted chips t(n) with an estimate of the channel for the working cell. The channel unit 2730 outputs the estimated received chips $\hat{x}(n)$ for the working cell to the memory 2640.

The system 2710 also comprises a channel estimation unit 2735, a memory 2740, and a matrix computation unit 2745. The channel estimation unit 2735 is configured to estimate the channel for the working cell using data-aided channel estimation, as discussed above. To estimate the channel, the channel estimation unit 2735 receives the received chips $r_{IC}(n)$ and the estimated transmitted chips t(n), and estimates the channel for the working cell based on Eqs. (60), (61) or (62) given above. The channel estimation unit 2735 may also use pilot-based channel estimation, as discussed above. The estimated channel is provided to the memory 2740 for temporary storage. In one aspect, the memory 2740 provides the estimated channel to the filter 2710, the channel unit 2730, and the matrix computation unit 2745. The memory 2740 may provide the estimated channel with a delay of one symbol period, for example, when the channel does not change much over one symbol period.

The filter 2715 filters the received chips $r_{IC}(n)$ based on the estimated channel. For an example of a channel-matched filter, the filter may filter the received chips $r_{IC}(n)$ with inter-cell cancellation using a time-inverse conjugate h*(−n) of the estimated channel h. The channel unit 2730 applies the estimated channel to the estimated transmitted chips t(n) to produce the estimated received chips $\hat{x}(n)$ for the working cell. The matrix computation unit 2745 uses the estimated channel to compute the multi-user interference matrix $A_0$ and the shoulder matrices $A_{-1}$ and $A_{+1}$ (e.g., based on Eqs. (28)-(30)), and provides these matrices to the detection system 2720. The detection system 2720 may use the multi-user interference matrix $A_0$ and the shoulder matrices $A_{-1}$ and $A_{+1}$, for example, to compute multi-user interference to perform intra-cell multi-user cancellation for the working cell.

The system 2710 also comprises a gain and noise estimation unit 2750, which estimates a set of gains for the working cell and noise. The gain and noise estimation unit 2750 may estimate the gain for each code channel or user of the working cell using the respective detected user symbol z(m) (e.g., based on Eq. (66)) and estimate noise (e.g., based on Eq. (64). The gain and noise estimation unit 2750 may provide the estimated gains to the reconstruction unit 2725. The gain and noise estimation unit 2750 may also provide the estimated noise and estimated gains to the detection unit 2750 to perform soft slicing (e.g. based on Eq. (70)).

Figure 28:
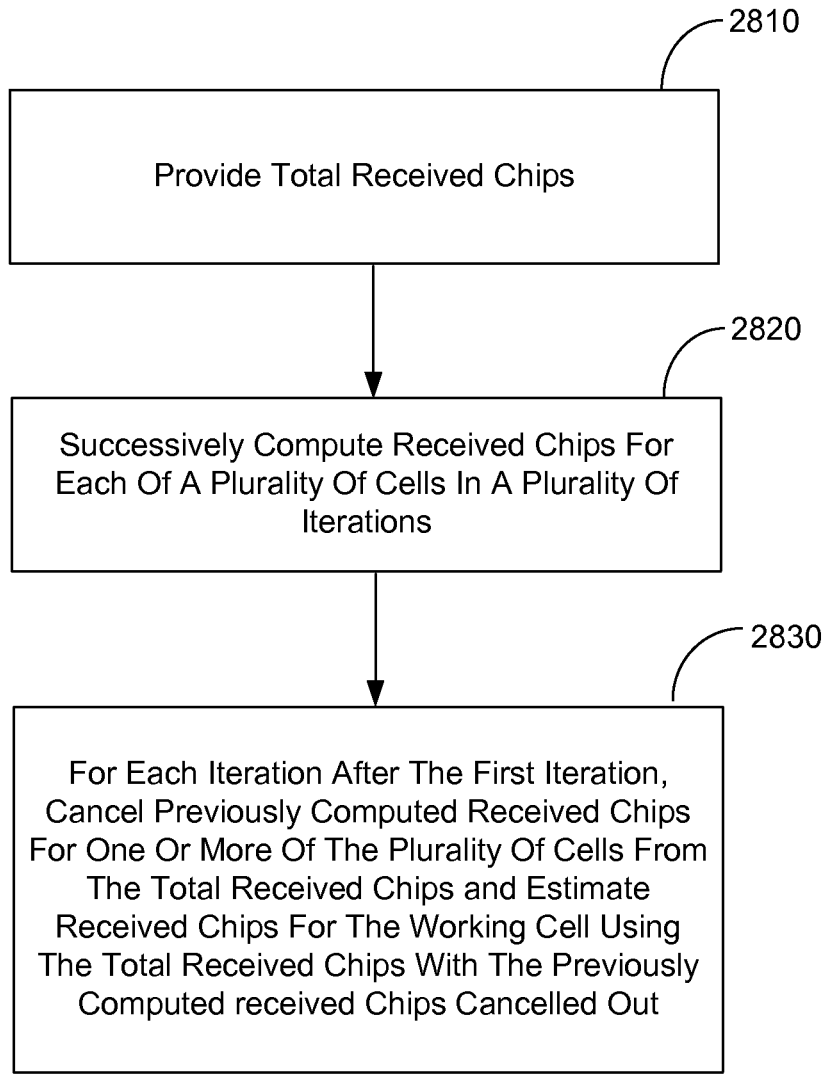
FIG. 28 is a flowchart illustrating a method of successive interference cancellation, according to certain aspects of the present disclosure.

FIG. 28 is a flow diagram illustrating a process of interference cancellation, according to certain aspects of the present disclosure. At operation 2810, total received chips r(n) are provided. The total received chips r(n) may comprise received chips $x_1(n)$ to $x_{N_C}(n)$ from a plurality of cells including a target cell and one or more interfering cells.

From operation 2810, the process continues to operation 2820 where the process successively computes received chips for each of the plurality of cells in a plurality of iterations. For example, the process first computes the received chips $\hat{x}_1(n)$ for cell 1, then the received chips $\hat{x}_2(n)$ for cell 2, and so forth.

In operation 2830, for each iteration after the first iteration, the process cancels previously computed received chips for one or more of the plurality of cells from the total received chips r(n). For example, in the second iteration, the process cancels the previously computed received chips $\hat{x}_1(n)$ for cell 1 from the total received chips r(n). In the third iteration, the process cancels the previously computed received chips $\hat{x}_1(n)$ and $\hat{x}_2(n)$ for cells 1 and 2 from the total received chips r(n), and so forth.

For each iteration after the first iteration, in operation 2830, the process also estimates or computes the received chips for the working cell in the iteration using the total received chips r(n) with the previously computed received chips cancelled out. For example, for the second iteration, the process computes the received chips $\hat{x}_2(n)$ for cell 2 using the total received chips r(n) with the previously computed chips $\hat{x}_1(n)$ for cell 1 cancelled out.

After the process has computed the received chips for each cell, the process may stop or loop back to the first cell and perform additional iterations to further refine the computed received chips for the target cell (e.g., cell 1). For each iteration after looping back, the process computes the received chips for the cell in the iteration using the total received chips r(n) with previously computed received chips $\hat{x}_1(n)$ to $\hat{x}_{N_C}(n)$ for each cell cancelled out and previously computed received chips for the cell in the iteration added back. For the example of three cells, in the fourth iteration, the process computes the received chips $\hat{x}_1(n)$ for cell 1 using the total received chips r(n) with previously computed received chips $\hat{x}_1(n)$ to $\hat{x}_3(n)$ for each cell cancelled out and previously computed received chips $\hat{x}_1(n)$ for cell 1 added back, where received chips for cell 1 were previously computed in the first iteration. In the fifth iteration, the process computes the received chips $\hat{x}_2(n)$ for cell 2 using the total received chips r(n) with previously computed received chips $\hat{x}_1(n)$ to $\hat{x}_3(n)$ for each cell cancelled out and previously computed received chips $\hat{x}_2(n)$ for cell 2 added back, where received chips for cell 2 were previously computed in the second iteration.

Figure 29:
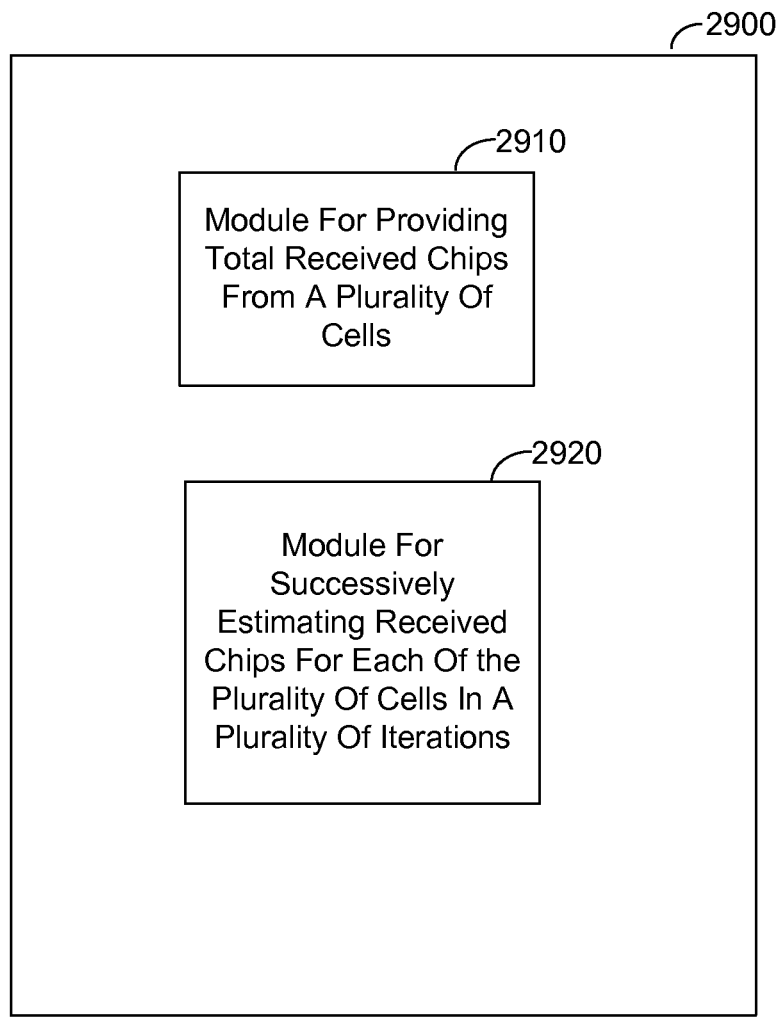
FIG. 29 is a block diagram illustrating an example of the functionality of an apparatus for interference cancellation according to certain aspects of the present disclosure.

FIG. 29 is a block diagram illustrating an example of the functionality of an apparatus 2900 for interference cancellation at a mobile station 106 according to an aspect of the disclosure. The apparatus 2900 comprises a module 2910 for providing total received chips received from a plurality of cells and a module 2920 for successively estimating received chips for each of the plurality of cells in a plurality of iterations. For each of the plurality of iterations after a first iteration, the module 2920 for successively estimating received chips cancels previously estimated received chips for one or more of the plurality of cells from the total received chips and estimates received chips for one of the plurality of cells using the total received chips with the previously estimated received chips for the one or more of the plurality of cells cancelled out.

Those of ordinary skill in the art would understand that the information and signal may be represented using any of a variety of different technologies and techniques. For example, data, instructions, commands information signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical modules, circuits and algorithms described in connection with the embodiments disclosed herein may be implemented as electronic hardware, computer software or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A process may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a machine-readable medium. Machine-readable media includes both computer storage media and communication media including any medium that facilitates transfer of a computer program from one place to another. A storage media may be any available media that can be accessed by a computer. By way of example, and not limitation, such machine-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a machine-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of machine-readable media.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the disclosure. Thus, the present disclosure is not intended to be limited to the aspects shown herein but is to be accorded the widest scope consistent with the principles and novel features disclosed herein.

What is claimed is:

1. A method for interference cancellation at a receiver in a wireless communication system, comprising:
providing a set of total received chips associated with a plurality of users received from a plurality of cells;
successively estimating received chips for each of the plurality of cells in a plurality of iterations, wherein each of the plurality of iterations after a first iteration comprises:
removing previously estimated received chips for one or more of the plurality of cells from the set of total received chips; and
estimating received chips for one of the plurality of cells using the set of total received chips with the previously estimated received chips, for the one or more of the plurality of cells, removed.

2. The method of claim 1, wherein the successively estimating received chips for each of the plurality of cells comprises: after estimating received chips for a last cell in the plurality of cells, estimating received chips for a first cell in the plurality of cells using the set of total received chips with previously estimated received chips, for each of the plurality of cells, removed and previously estimated received chips, for the first cell, added back.

3. The method of claim 2, wherein the successively estimating received chips for each of a plurality of cells comprises: estimating received chips for a second cell in the plurality of cells using the set of total received chips with previously estimated received chips, for each of the plurality of cells, removed and previously estimated received chips, for the second cell, added back.

4. The method of claim 1, further comprising detecting a plurality of user symbols for a target cell in the plurality of cells using the set of total received chips with previously estimated received chips, for each of the plurality of cells, removed and previously estimated received chips, for the target cell, added back.

5. The method of claim 1, wherein each of the plurality of iterations comprises:
   detecting a plurality of user symbols for a working cell in the plurality of cells from a plurality of received symbols for the working cell; and
   computing the received chips for the working cell using the plurality of detected user symbols for the working cell.

6. The method of claim 5, wherein detecting the plurality of user symbols for the working cell comprises:
   initially detecting the plurality of user symbols for the working cell from the plurality of received symbols for the working cell;
   computing multi-user interference for the working cell using the initially detected plurality of user symbols for the working cell;
   canceling the computed multi-user interference for the working cell from the plurality of received symbols for the working cell; and
   redetecting the plurality of user symbols for the working cell from the plurality of received symbols for the working cell with the computed multi-user interference for the working cell cancelled out.

7. The method of claim 5, wherein computing the received chips for the working cell using the plurality of detected user symbols for the working cell comprises:
   spreading the plurality of detected user symbols for the working cell;
   scrambling the spread plurality of detected user symbols for the working cell to obtain an estimate of transmitted chips for the working cell; and
   applying a channel estimate to the estimate of the transmitted chips for the working cell to estimate the received chips for the working cell.

8. The method of claim 1, further comprising arranging the plurality of cells in an order based on signal strengths of the plurality of cells, wherein the successively computing the received chips for each of a plurality of cells is performed according to the order.

9. The method of claim 8, wherein the plurality of cells are arranged in order of decreasing signal strength.

10. A method for interference cancellation at a receiver in a wireless communication system, comprising:
   providing total received chips received from a plurality of cells;
   successively estimating received chips for each of the plurality of cells in a plurality of iterations, wherein each of the plurality of iterations after a first iteration comprises:
      canceling previously estimated received chips for one or more of the plurality of cells from the total received chips; and
      estimating received chips for one of the plurality of cells using the total received chips with the previously estimated received chips for the one or more of the plurality of cells cancelled out,
      detecting a plurality of user symbols for a working cell in the plurality of cells from a plurality of received symbols for the working cell, wherein detecting the plurality of user symbols for the working cell comprises:
         comparing a signal strength for the working cell to a threshold;
         if the signal strength for the working cell is equal to or above the threshold, then performing a hard slice on each of the plurality of received symbols for the working cell; and
         if the signal strength for the working cell is below the threshold, then performing a soft slice on each of the plurality of received symbols for the working cell; and
      computing the received chips for the working cell using the plurality of detected user symbols for the working cell.

11. A system for interference cancellation at a receiver in a wireless communication system, the system receiving a set of total received chips associated with a plurality of users received from a plurality of cells, comprising: a cell computation unit configured to successively estimate received chips for each of the plurality of cells in a plurality of iterations; and a subtraction unit, wherein in each of the plurality of iterations after a first iteration, the subtraction unit is configured to remove previously estimated received chips for one or more of the plurality of cells from the set of total received chips, and wherein in each of the plurality of iterations after the first iteration, the cell computation unit is configured to estimate received chips for one of the plurality of cells using the set of total received chips with the previously estimated received chips, for the one or more of the plurality of cells, removed.

12. The system of claim 11, wherein the cell computation unit comprises:
   a detection unit, wherein in each of the plurality of iterations, the detection unit is configured to detect a plurality of user symbols for a working cell in the plurality of cells from a plurality of received symbols for the working cell; and
   a chip estimation unit, wherein in each of the plurality of iterations, the chip estimation unit is configured to estimate received chips for the working cell using the plurality of detected user symbols for the working cell.

13. The system of claim 12, wherein the detection unit comprises:
   a symbol detector;
   an interference computation unit configured to compute multi-user interference; and
   a subtraction unit, wherein in each of the plurality of iterations, the symbol detector is configured to initially detect the plurality of user symbols for the working cell, the interference computation unit is configured to compute multi-user interference using the initially detected plurality of user symbols for the working cell, the subtraction unit is configured to cancel the computed multi-user interference for the working cell from the plurality of received symbols for the working cell, and the symbol detector is configured to redetect the plurality of user symbols for the working cell from the plurality of received symbols for the working cell with the computed multi-user interference for the working cell cancelled out.

14. The system of claim 12, wherein chip estimation unit comprises:
   a spread and scramble unit configured to spread and scramble the plurality of detected user symbols for the working cell from the detection unit to obtain an estimate of transmitted user symbols for the working cell; and a channel unit configured to apply a channel estimate to the estimate of the transmitted chips for the working cell to estimate the received chips for the working cell.

15. The system of claim 11, wherein the cell computation unit is configured to arrange the plurality of cells in an order based on signal strengths of the plurality of cells and to successively compute the received chips for each of a plurality of cells according to the order.

16. The system of claim 15, wherein the cell computation unit is configured to arrange the plurality of cells in order of decreasing signal strength.

17. A system for interference cancellation at a receiver in a wireless communication system, the system receiving total received chips received from a plurality of cells, comprising: a cell computation unit configured to successively estimate received chips for each of the plurality of cells in a plurality of iterations; and a subtraction unit, wherein in each of the plurality of iterations after a first iteration, the subtraction unit is configured to cancel previously estimate received chips for one or more of the plurality of cells from the total received chips; wherein in each of the plurality of iterations after the first iteration, the cell computation unit is configured to estimate received chips for one of plurality of cells using the total received chips with the previously estimated received chips for the one or more of the plurality of cells canceled out; and wherein after computing received chips for a last cell in the plurality of cells, the cell computation unit is configured to loop back to a first cell in the plurality of cells, and wherein the system further comprises: an addition unit configured to add back previously estimated received chips for the first cell to the total received chips with previously estimated received chips for each of the plurality of cells cancelled out, and wherein the cell computation unit is configured to estimate received chips for the first cell using the total received chips with the previously estimated received chips for each of the plurality of cells cancelled out and the previously estimated received chips for the first cell added back.

18. The system of claim 17, wherein the addition unit is configured to add back previously estimated received chips for a second cell in the plurality of cells to the total received chips with previously estimated received chips for each of the plurality of cells cancelled out, and wherein the cell computation unit is configured to estimate received chips for the second cell using the total received chips with the previously estimated received chips for each of the plurality of cells cancelled out and the previously estimated received chips for the second cell added back.

19. The system of claim 17 further comprising:
an addition unit configured to add back previously estimated received chips for a target cell in the plurality of cells to the total received chips with previously estimated received chips for each of the plurality of cells cancelled out; and
a detection unit configured to detect a plurality of user symbols for the target cell using the total received chips with the previously estimated received chips for each of the plurality of cells cancelled out and the previously estimated received chips for the target cell added back.

20. A system for interference cancellation at a receiver in a wireless communication system, the system receiving total received chips received from a plurality of cells, comprising:

a cell computation unit configured to successively estimate received chips for each of the plurality of cells in a plurality of iterations, wherein the cell computation unit comprises:
a detection unit, wherein in each of the plurality of iterations, the detection unit is configured to detect a plurality of user symbols for a working cell in the plurality of cells from a plurality of received symbols for the working cell, and wherein the detection unit comprises:
a symbol detector; and
a selection unit configured to compare a signal strength for the working cell to a threshold and to instruct the symbol detector to perform a hard slice if the signal strength for the working cell is equal to or above the threshold and to instruct the symbol detector to perform a soft slice if the signal strength for the working cell is below the threshold;
a chip estimation unit, wherein in each of the plurality of iterations, the chip estimation unit is configured to estimate received chips for the working cell using the plurality of detected user symbols for the working cell; and
a subtraction unit, wherein in each of the plurality of iterations after a first iteration, the subtraction unit is configured to cancel previously estimated received chips for one or more of the plurality of cells from the total received chips; and wherein
in each of the plurality of iterations after the first iteration, the cell computation unit is configured to estimate received chips for one of plurality of cells using the total received chips with the previously estimated received chips for the one or more of the plurality of cells canceled out.

21. An apparatus for interference cancellation at a receiver in a wireless communication system, comprising: means for providing a set of total received chips associated with a plurality of users received from a plurality of cells; means for successively estimating received chips for each of the plurality of cells in a plurality of iterations, wherein for each of the plurality of iterations after a first iteration, the means for successively estimating received chips comprises: means for removing previously estimated received chips for one or more of the plurality of cells from the set of total received chips; and means for estimating received chips for one of the plurality of cells using the set of total received chips with the previously estimated received chips, for the one or more of the plurality of cells, removed.

22. The apparatus of claim 21, wherein the means for successively estimating received chips for each of the plurality of cells comprises after estimating received chips for a last cell in the plurality of cells, means for estimating received chips for a first cell in the plurality of cells using the set of total received chips with previously estimated received chips, for each of the plurality of cells, removed and previously estimated received chips, for the first cell, added back.

23. The apparatus of claim 22, wherein the means for successively estimating received chips for each of a plurality of cells comprises: means for estimating received chips for a second cell in the plurality of cells using the set of total received chips with previously estimated received chips, for each of the plurality of cells, removed and previously estimated received chips, for the second cell, added back.

24. The apparatus of claim 21, further comprising means for detecting a plurality of user symbols for a target cell in the plurality of cells using the set of total received chips with previously estimated received chips, for each of the plurality of cells, removed and previously estimated received chips, for the target cell, added back.

25. The apparatus of claim 21, wherein for each of the plurality of iterations, the means for successively estimating received chips comprises:
   means for detecting a plurality of user symbols for a working cell in the plurality of cells from a plurality of received symbols for the working cell; and
   means for computing the received chips for the working cell using the plurality of detected user symbols for the working cell.

26. The apparatus of claim 25, wherein the means for detecting the plurality of user symbols for the working cell comprises:
   means for initially detecting the plurality of user symbols for the working cell from the plurality of received symbols for the working cell;
   means for computing multi-user interference for the working cell using the initially detected plurality of user symbols for the working cell;
   means for canceling the computed multi-user interference for the working cell from the plurality of received symbols for the working cell; and
   means for redetecting the plurality of user symbols for the working cell from the plurality of received symbols for the working cell with the computed multi-user interference for the working cell cancelled out.

27. The apparatus of claim 25, wherein the means for computing the received chips for the working cell using the plurality of detected user symbols for the working cell comprises:
   means for spreading the plurality of detected user symbols for the working cell;
   means for scrambling the spread plurality of detected user symbols for the working cell to obtain an estimate of transmitted chips for the working cell; and
   means for applying a channel estimate to the estimate of the transmitted chips for the working cell to estimate the received chips for the working cell.

28. The apparatus of claim 21, further comprising means for arranging the plurality of cells in an order based on signal strengths of the plurality of cells, wherein the successively computing the received chips for each of a plurality of cells is performed according to the order.

29. The apparatus of claim 28, wherein the plurality of cells are arranged in order of decreasing signal strength.

30. An apparatus for interference cancellation at a receiver in a wireless communication system, comprising:
   means for providing total received chips received from a plurality of cells;
   means for successively estimating received chips for each of the plurality of cells in a plurality of iterations, wherein for each of the plurality of iterations after a first iteration, the means for successively estimating received chips comprises:
      means for canceling previously estimated received chips for one or more of the plurality of cells from the total received chips;
      means for estimating received chips for one of the plurality of cells using the total received chips with the previously estimated received chips for the one or more of the plurality of cells cancelled out; and
      means for detecting a plurality of user symbols for a working cell in the plurality of cells from a plurality of received symbols for the working cell, wherein the means for detecting the plurality of user symbols for the working cell comprises:
         means for comparing a signal strength for the working cell to a threshold;
         means for performing a hard slice on each of the plurality of received symbols for the working cell if the signal strength for the working cell is equal to or above the threshold; and
         means for performing a soft slice on each of the plurality of received symbols for the working cell if the signal strength for the working cell is below the threshold; and
      means for computing the received chips for the working cell using the plurality of detected user symbols for the working cell.

31. A non-transitory machine-readable medium storing instructions for interference cancellation at a receiver in a wireless communication system, the instructions comprising code for: providing a set of total received chips associated with a plurality of users received from a plurality of cells; successively estimating received chips for each of the plurality of cells in a plurality of iterations, wherein for each of the plurality of iterations after a first iteration, the code for successively estimating received chips comprises code for: removing previously estimated received chips for one or more of the plurality of cells from the set of total received chips; and estimating received chips for one of the plurality of cells using the set of total received chips with the previously estimated received chips, for the one or more of the plurality of cells, removed.

32. The machine-readable medium of claim 31, wherein the code for successively estimating received chips for each of the plurality of cells comprises code for: after estimating received chips for a last cell in the plurality of cells, estimating received chips for a first cell in the plurality of cells using the set of total received chips with previously estimated received chips, for each of the plurality of cells, removed and previously estimated received chips, for all the first cell, added back.

33. The machine-readable medium of claim 32, wherein the code for successively estimating received chips for each of a plurality of cells comprises code for: estimating received chips for a second cell in the plurality of cells using the set of total received chips with previously estimated received chips, for each of the plurality of cells, removed and previously estimated received chips, for the second cell, added back.

34. The machine-readable medium of claim 31, wherein the instructions further comprise code for detecting a plurality of user symbols for a target cell in the plurality of cells using the set of total received chips with previously estimated received chips for each of the plurality of cells removed and previously estimated received chips for the target cell added back.

35. The machine-readable medium of claim 31, wherein for each of the plurality of iterations, the code for successively estimating received chips comprises code for:
   detecting a plurality of user symbols for a working cell in the plurality of cells from a plurality of received symbols for the working cell; and
   computing the received chips for the working cell using the plurality of detected user symbols for the working cell.

36. The machine-readable medium of claim 35, wherein code for detecting the plurality of user symbols for the working cell comprises code for:
   initially detecting the plurality of user symbols for the working cell from the plurality of received symbols for the working cell;

computing multi-user interference for the working cell using the initially detected plurality of user symbols for the working cell;

canceling the computed multi-user interference for the working cell from the plurality of received symbols for the working cell; and redetecting the plurality of user symbols for the working cell from the plurality of received symbols for the working cell with the computed multi-user interference for the working cell cancelled out.

37. The machine-readable medium of claim 35, wherein the code for computing the received chips for the working cell using the plurality of detected user symbols for the working cell comprises code for:

spreading the plurality of detected user symbols for the working cell;

scrambling the spread plurality of detected user symbols for the working cell to obtain an estimate of transmitted chips for the working cell; and applying a channel estimate to the estimate of the transmitted chips for the working cell to estimate the received chips for the working cell.

38. The machine-readable medium of claim 31, wherein the instructions further comprise code for arranging the plurality of cells in an order based on signal strengths of the plurality of cells, wherein the successively computing the received chips for each of a plurality of cells is performed according to the order.

39. The machine-readable medium of claim 38, wherein the plurality of cells are arranged in order of decreasing signal strength.

40. A non-transitory machine-readable medium storing instructions for interference cancellation at a receiver in a wireless communication system, the instructions comprising code for:

providing total received chips received from a plurality of cells;

successively estimating received chips for each of the plurality of cells in a plurality of iterations, wherein for each of the plurality of iterations after a first iteration, the code for successively estimating received chips comprises code for:

canceling previously estimated received chips for one or more of the plurality of cells from the total received chips;

estimating received chips for one of the plurality of cells using the total received chips with the previously estimated received chips for the one or more of the plurality of cells cancelled out;

detecting a plurality of user symbols for a working cell in the plurality of cells from a plurality of received symbols for the working cell, wherein the code for detecting the plurality of user symbols for the working cell comprises code for:

comparing a signal strength for the working cell to a threshold;

if the signal strength for the working cell is equal to or above the threshold, then performing a hard slice on each of the plurality of received symbols for the working cell; and if the signal strength for the working cell is below the threshold, then performing a soft slice on each of the plurality of received symbols for the working cell; and computing the received chips for the working cell using the plurality of detected user symbols for the working cell.

41. An apparatus for interference cancellation at a receiver in a wireless communication system, the system receiving a set of total received chips associated with a plurality of users received from a plurality of cells, comprising: at least one processor configured to successively estimate received chips for each of the plurality of cells in a plurality of iterations, wherein for each of the plurality of iterations after a first iteration, the at least one processor is configured to remove previously estimated received chips for one or more of the plurality of cells from the set of total received chips, and to estimate received chips for one of the plurality of cells using the set of total received chips with the previously estimated received chips, for the one or more of the plurality of cells, removed.

42. The apparatus of claim 41, wherein after estimating received chips for a last cell in the plurality of cells, the at least one processor is configured to estimate received chips for a first cell in the plurality of cells using the set of total received chips with previously estimated received chips, for each of the plurality of cells, removed and previously estimated received chips, for the first cell, added back.

43. The apparatus of claim 42, wherein the at least one processor is configured to estimate received chips for a second cell in the plurality of cells using the set of total received chips with previously estimated received chips, for each of the plurality of cells, removed and previously estimated received chips, for the second cell, added back.

44. The apparatus of claim 41, wherein the at least one processor is configured to detect a plurality of user symbols for a target cell in the plurality of cells using the set of total received chips with previously estimated received chips, for each of the plurality of cells, removed and previously estimated received chips for the target cell added back.

45. The apparatus of claim 41, wherein for each of the plurality of iterations, the at least one processor is configured to detect a plurality of user symbols for a working cell in the plurality of cells from a plurality of received symbols for the working cell, and to compute the received chips for the working cell using the plurality of detected user symbols for the working cell.

46. The apparatus of claim 45, wherein the at least one processor is configured to detect the plurality of user symbols for the working cell comprises by initially detecting the plurality of user symbols for the working cell from the plurality of received symbols for the working cell, computing multi-user interference for the working cell using the initially detected plurality of user symbols for the working cell, canceling the computed multi-user interference for the working cell from the plurality of received symbols for the working cell, and redetecting the plurality of user symbols for the working cell from the plurality of received symbols for the working cell with the computed multi-user interference for the working cell cancelled out.

47. The apparatus of claim 45, wherein the at least one processor is configured to compute the received chips for the working cell using the plurality of detected user symbols for the working cell by spreading the plurality of detected user symbols for the working cell, scrambling the spread plurality of detected user symbols for the working cell to obtain an estimate of transmitted chips for the working cell, and applying a channel estimate to the estimate of the transmitted chips for the working cell to estimate the received chips for the working cell.

48. The apparatus of claim 41, wherein the at least one processor is configured to arrange the plurality of cells in an order based on signal strengths of the plurality of cells, wherein the successively computing the received chips for each of a plurality of cells is performed according to the order.

49. The apparatus of claim 48, wherein the plurality of cells are arranged in order of decreasing signal strength.

50. An apparatus for interference cancellation at a receiver in a wireless communication system, the system receiving total received chips received from a plurality of cells, comprising:

at least one processor configured to successively estimate received chips for each of the plurality of cells in a plurality of iterations, wherein for each of the plurality of iterations after a first iteration, the at least one processor is configured to cancel previously estimated received chips for one or more of the plurality of cells from the total received chips, to estimate received chips for one of the plurality of cells using the total received chips with the previously estimated received chips for the one or more of the plurality of cells cancelled out, to detect a plurality of user symbols for a working cell in the plurality of cells from a plurality of received symbols for the working cell, and to compute the received chips for the working cell using the plurality of detected user symbols for the working cell;

wherein the at least processor is configured to detect the plurality of user symbols for the working cell by comparing a signal strength for the working cell to a threshold, if the signal strength for the working cell is equal to or above the threshold, then performing a hard slice on each of the plurality of received symbols for the working cell, and if the signal strength for the working cell is below the threshold, then performing a soft slice on each of the plurality of received symbols for the working cell.

* * * * *